US008632383B2

(12) United States Patent
Munakata

(10) Patent No.: US 8,632,383 B2
(45) Date of Patent: Jan. 21, 2014

(54) GAMING MACHINE ACCEPTING SIDE BET AND CONTROL METHOD THEREOF

(75) Inventor: Hiroki Munakata, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 159 days.

(21) Appl. No.: 12/782,191

(22) Filed: May 18, 2010

(65) Prior Publication Data

US 2010/0304815 A1 Dec. 2, 2010

(30) Foreign Application Priority Data

May 28, 2009 (JP) ................................ 2009-129323

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/11; 463/12; 463/13; 463/16; 463/26; 463/40; 463/41; 463/42; 463/25; 273/274; 273/292

(58) Field of Classification Search
USPC ........... 273/292, 274; 463/11–13, 26, 40–42, 463/25
See application file for complete search history.

(56) References Cited

U.S. PATENT DOCUMENTS

| | | | | |
|---|---|---|---|---|
| 4,760,527 | A * | 7/1988 | Sidley | 463/13 |
| 5,673,917 | A * | 10/1997 | Vancura | 273/292 |
| 6,692,003 | B2 * | 2/2004 | Potter et al. | 273/274 |
| 2006/0131809 | A1 * | 6/2006 | Lancaster et al. | 273/292 |
| 2008/0146311 | A1 * | 6/2008 | Walker et al. | 463/20 |
| 2008/0227513 | A1 | 9/2008 | Yoshizawa | |
| 2008/0227539 | A1 | 9/2008 | Sato | |
| 2008/0248849 | A1 * | 10/2008 | Lutnick et al. | 463/16 |

FOREIGN PATENT DOCUMENTS

| | | |
|---|---|---|
| AU | 711529 | 10/1999 |
| AU | 764953 | 9/2003 |

OTHER PUBLICATIONS

U.S. Appl. No. 12/779,342, filed May 13, 2010, Okada.
U.S. Appl. No. 12/782,095, filed May 18, 2010, Inamura, et al.
U.S. Appl. No. 12/782,191, filed May 18, 2010, Munakata.
U.S. Appl. No. 12/782,260, filed May 18, 2010, Kitamura, et al.

* cited by examiner

*Primary Examiner* — David Lewis
*Assistant Examiner* — Adetokunbo O Torimiro
(74) *Attorney, Agent, or Firm* — KMF Patent Services, PLLC; Kenneth M. Fagin, Esq.; S. Peter Konzel, Esq.

(57) ABSTRACT

The gaming machine of the present invention provides a gaming machine that executes the processing of: determining, for each station, a normal game result based on a player card for the station; accepting via each input device an input for a side bet on a normal game in a station other than the station having this input device; determining, when a side bet is placed, a side game result according to the determined normal game result of the station as the side bet target; and offering a first payout based on the normal game result, and a second payout based on the side game result.

5 Claims, 47 Drawing Sheets

GAMING MACHINE ACCEPTING SIDE BET AND CONTROL METHOD THEREOF

CROSS-REFERENCE TO RELATED APPLICATIONS

This application is based upon and claims a priority from the prior Japanese Patent Application No. 2009-129323 filed on May 28, 2009, the entire contents of which are incorporated herein by reference.

BACKGROUND OF THE INVENTION

1. Field of the Invention

The present invention relates to a gaming machine accepting a side bet and a control method thereof.

2. Discussion of the Background

Conventionally, gaming machines capable of accepting a side bet different from a normal bet have been provided.

For example, Patent Documents 1 to 3 disclose gaming machines in which a sub game (side game) is played aside from a basic game (normal Blackjack game) on condition that a side bet has been placed.

Further, card games such as poker, Blackjack, and baccarat have been known as games in which playing cards (hereinafter also referred to simply as cards) are used. In recent years, gaming machines capable of executing such a card game have appeared. Some of those gaming machines have a plurality of terminals (for example, see Patent Document 4). In such a gaming machine, multiple players can play a card game at the respective terminals.

Patent Document 1: AU 711529

Patent Document 2: AU 764953

Patent Document 3: US 2008/0227513-A1

Patent Document 4: US 2008/0227539-A1

SUMMARY OF THE INVENTION

Gaming machines having multiple terminals as described above allow multiple players to play a card game at the same time. At this time, many players are concerned only about game results of their own, and are not interested in game results of other players playing a game in the same gaming machine.

In view of this, the present inventor has arrived at an idea that adding features to the side bet function may make a player interested in game results of other players, thereby making games more entertaining.

The present invention was made in view of the above idea and aims to provide a gaming machine capable of making a game more entertaining by making a player interested in game results of other players, and a control method thereof.

The present invention provides a gaming machine having the following configuration.

(1) That is, the gaming machine includes:

multiple stations each including a display capable of displaying multiple playing cards, and an input device capable of receiving a command on a game; and a controller, the controller programmed to execute the processing of:

(A) accepting via each input device an input for a normal bet;

(B) displaying, on the display of each station at which a normal bet has been placed in the processing (A), a player card for the station as well as a player card for another station;

(C) determining, for each station, a normal game result based on the player card displayed as a player card for the station in the processing (B);

(D) accepting via each input device an input for a side bet on a normal game in a station other than the station having this input device;

(E) determining, when a side bet is placed in the processing (D), a side game result according to the determined normal game result of the station as the side bet target; and (F) offering a first payout based on the normal game result determined in the processing (C), and a second payout based on the side game result determined in the processing (E).

According to the invention of (1), a player can play two kinds of games, namely a normal game and a side game, in one game in which the result is determined based on the playing cards distributed to the player.

Since a side game result is determined based on a normal game result of another player, it is possible to make the player interested in cards distributed to the other player. This makes the player concentrate on the game not only when cards are distributed to the player but also when cards are distributed to other players, thereby allowing the player to have a good time during the game.

Further, since a side game result is determined according to a normal game result of the station as the side bet target, the side game result of the player who has placed the side bet and the normal game result of the player on whom the side bet has been placed can be linked. Thereby, it is possible to make the players share the feelings of the joy and sadness raised during the game. As a result, a sense of unity can be created between the players playing a game in the gaming machine, whereby a game can be made more exciting.

According to the invention of (1), the display of each station displays not only the player cards for this station but also player cards for another station as a side bet target. This allows a player to see player cards for another station in the station at which he or she plays a game. Accordingly, the player can see how the normal game goes and how the side game goes, in the station at which he or she plays a game. Also, the eyes of the player can be fixed on the display of the station at which he or she plays a game. As a result, the player can be immersed in the game.

Generally, when a game starts in card games such as blackjack, a predetermined number (for example, two cards in a blackjack game) of cards (hereinafter, also referred to as player initial cards) are first distributed to each player. Then, a player may request for distribution of another card (hereinafter, also referred to as a player additional card) to add to the player initial cards or to exchange with one of the player initial cards. In a card game, each combination of cards is usually allocated with a different strength, and a player can receive a payout when his or her combination of cards is comparatively strong. Accordingly, through addition or exchange of cards, players play a game with an aim of having a combination of the player cards stronger than a combination of the dealer cards. Generally, whether or not a player can receive a payout depends on the skill of the player relating to addition or exchange of cards.

According to the invention of (1), seeing the player cards for another station, the player can guess the skill relating to addition or exchange of cards of another player who plays the game at the other station. Based on the guessed skill relating to addition or exchange of cards of the other player, the player can decide whether or not to place a side bet on the other player.

That is, the player can receive a payout (second payout) based on a side game at a higher possibility by placing a side bet on a player who has high skills and is likely to win the game. For this purpose, the player needs to appropriately guess the skills of other players, and this generally requires advanced thinking. According to the invention of (1), the player can have an opportunity to do such intellectual work, which enthralls players, who likes intellectual work, in games.

Also, since each player feels that other players guess the skill of the player, the player can play games seriously with a sense of tension. As a result, a player can be immersed in games.

Further, the present invention provides a gaming machine having the following configuration.

(2) That is, the gaming machine includes:

a display capable of displaying multiple playing cards;

multiple stations each including an input device capable of receiving a command on a game;

a memory capable of storing number-of-credits data showing the number of credits corresponding to a game media amount, for each station; and a controller, the controller programmed to execute the processing of:

(A) accepting via each input device an input for a normal bet;

(B) displaying on the display a player card for each station at which a normal bet has been placed in the processing (A);

(C) accepting via each input device an input for a special command including a command to further bet game media separately from the normal bet placed in the processing (A);

(D) determining, for each station, a normal game result based on the player card displayed in the processing (B);

(E) accepting via each input device an input for a side bet on a normal game in a station other than the station having this input device;

(F) subtracting the number of credits corresponding to a game media amount according to the special command from the number of credits shown by the number-of-credits data stored in the memory in association with the station at which a side bet is placed, when the side bet is placed in the processing (E) and then the special command is inputted via the input device provided in the station as the side bet target;

(G) determining, when a side bet is placed in the processing (E), a side game result according to the determined normal game result of the station as the side bet target; and (H) offering a first payout based on the normal game result determined in the processing (D), and a second payout based on the side game result determined in the processing (G).

According to the invention of (2), a player can play two kinds of games, namely a normal game and a side game, in one game in which the result is determined based on the playing cards distributed to the player.

Since a side game result is determined based on a normal game result of another player, it is possible to make the player interested in cards distributed to the other player. This makes the player concentrate on the game not only when cards are distributed to the player but also when cards are distributed to other players, thereby allowing the player to have a good time during the game.

Further, since a side game result is determined according to a normal game result of the station as the side bet target, the side game result of the player who has placed the side bet and the normal game result of the player on whom the side bet has been placed can be linked. Thereby, it is possible to make the players share the feelings of the joy and sadness raised during the game. As a result, a sense of unity can be created between the players playing a game in the gaming machine, whereby a game can be made more exciting.

According to the invention of (2), when a side bet is placed and then a special command is inputted via the input device provided in the station as the side bet target, the number of credits corresponding to the game media amount according to the special command is subtracted from the number of credits of the station having the input device with which the side bet has been placed. In this way, subtraction is made from the player's own credits when the other player inputs a special command, it is therefore possible to surprise the player.

Since game media are compulsorily collected from the player's own credits when the other player inputs a special command, guessing the skills of other players is more meaningful. Therefore, it is possible to make players consider the skills of other players more seriously, whereby players can be absorbed in games.

Further, the present invention preferably has the following configuration.

(3) The gaming machine of the above (2), wherein the processing (D) includes determining a normal game result of a station at which a special command has been inputted, based on the special command, on condition that the number of credits shown by the number-of-credits data stored in the memory in association with the station at which the side bet has been placed is equal to or more than the number of credits corresponding to a game media amount according to the special command, when the input of the special command has been made via the input device and the station having this input device is the side bet target.

According to the invention of (3), when a special command is inputted in one station and the one station is a side bet target, the normal game result of the one station is determined based on the special command, on condition that the number of credits of the station at which the side bet has been placed is equal to or more than the game media amount corresponding to the special command. That is, when the number of credits of the station at which the side bet has been placed is less than the game media amount corresponding to the special command, the special command is made invalid.

As above, since an input of the special command may possibly be made invalid, it is possible to surprise players.

Further, players who play games in a gaming machine generally do not wish winning of other players. In view of this, according to the invention of (3), a player can prevent another player from receiving a payout based on the special command by decreasing the player's own credits before placing a side bet on the other player so that the special command by the other player is made invalid. Therefore, it is possible to provide a game that stimulates the player's feelings of not wishing winning of other players. Meanwhile, when decreasing the credits, the player himself/herself may not be able to receive a payout based on the special command. This gives the player the conflicting feelings of preventing other players from inputting a special command, and of inputting a special command by himself/herself, thereby making the player try various options to find the best way. As a result, the player can be immersed in games.

Further, the present invention provides a control method of a gaming machine having the following configuration.

(4) That is, the gaming machine includes:

multiple stations each including a display capable of displaying multiple playing cards, and an input device capable of receiving a command on a game; and a controller.

The control method includes the steps of:

(A) the controller accepting via each input device an input for a normal bet;

(B) the controller displaying, on the display of each station at which a normal bet has been placed in the step (A), a player card for the station as well as a player card for another station;

(C) the controller determining, for each station, a normal game result based on the player card displayed as a player card for the station in the step (B);

(D) the controller accepting via each input device an input for a side bet on a normal game in a station other than the station having this input device;

(E) the controller determining, when a side bet is placed in the step (D), a side game result according to the determined normal game result of the station as the side bet target; and (F) the controller offering a first payout based on the normal game result determined in the step (C), and a second payout based on the side game result determined in the step (E).

According to the invention of (4), a player can play two kinds of games, namely a normal game and a side game, in one game in which the result is determined based on the playing cards distributed to the player.

Since a side game result is determined based on a normal game result of another player, it is possible to make the player interested in cards distributed to the other player. This makes the player concentrate on the game not only when cards are distributed to the player but also when cards are distributed to other players, thereby allowing the player to have a good time during the game.

Further, since a side game result is determined according to a normal game result of the station as the side bet target, the side game result of the player who has placed the side bet and the normal game result of the player on whom the side bet has been placed can be linked. Thereby, it is possible to make the players share the feelings of the joy and sadness raised during the game. As a result, a sense of unity can be created between the players playing a game in the gaming machine, whereby a game can be made more exciting.

According to the invention of (4), the display of each station displays not only the player cards for this station but also player cards for another station as a side bet target. This allows a player to see player cards for another station in the station at which he or she plays a game. Accordingly, the player can see how the normal game goes and how the side game goes, in the station at which he or she plays a game. Also, the eyes of the player can be fixed on the display of the station at which he or she plays a game. As a result, the player can be immersed in the game.

Generally, when a game starts in card games such as blackjack, a predetermined number (for example, two cards in a blackjack game) of cards (hereinafter, also referred to as player initial cards) are first distributed to each player. Then, a player may request for distribution of another card (hereinafter, also referred to as a player additional card) to add to the player initial cards or to exchange with one of the player initial cards. In a card game, each combination of cards is usually allocated with a different strength, and a player can receive a payout when his or her combination of cards is comparatively strong. Accordingly, through addition or exchange of cards, players play a game with an aim of having a combination of the player cards stronger than a combination of the dealer cards. Generally, whether or not a player can receive a payout depends on the skill of the player relating to addition or exchange of cards.

According to the invention of (4), seeing the player cards for another station, the player can guess the skill relating to addition or exchange of cards of another player who plays the game at the other station. Based on the skill relating to addition or exchange of cards of the other player, the player can decide whether or not to place a side bet on the other player.

That is, the player can receive a payout (second payout) based on a side game at a higher possibility by placing a side bet on a player who has high skills and is likely to win the game. For this purpose, the player needs to appropriately guess the skills of other players, and this generally requires advanced thinking. According to the invention of (4), the player can have an opportunity to do such intellectual work, which enthralls players, who likes intellectual work, in games.

Also, since each player feels that other players guess the skill of the player, the player can play games seriously with a sense of tension. As a result, a player can be immersed in games.

The present invention can provide a gaming machine capable of making a game more entertaining by making a player interested in game results of other players, and a control method thereof.

BRIEF DESCRIPTION OF THE DRAWINGS

FIG. 1I is a view illustrating an exemplary image displayed on the liquid crystal display in the gaming machine according to one embodiment of the present invention;

DESCRIPTION OF THE EMBODIMENTS

Figure 1A:
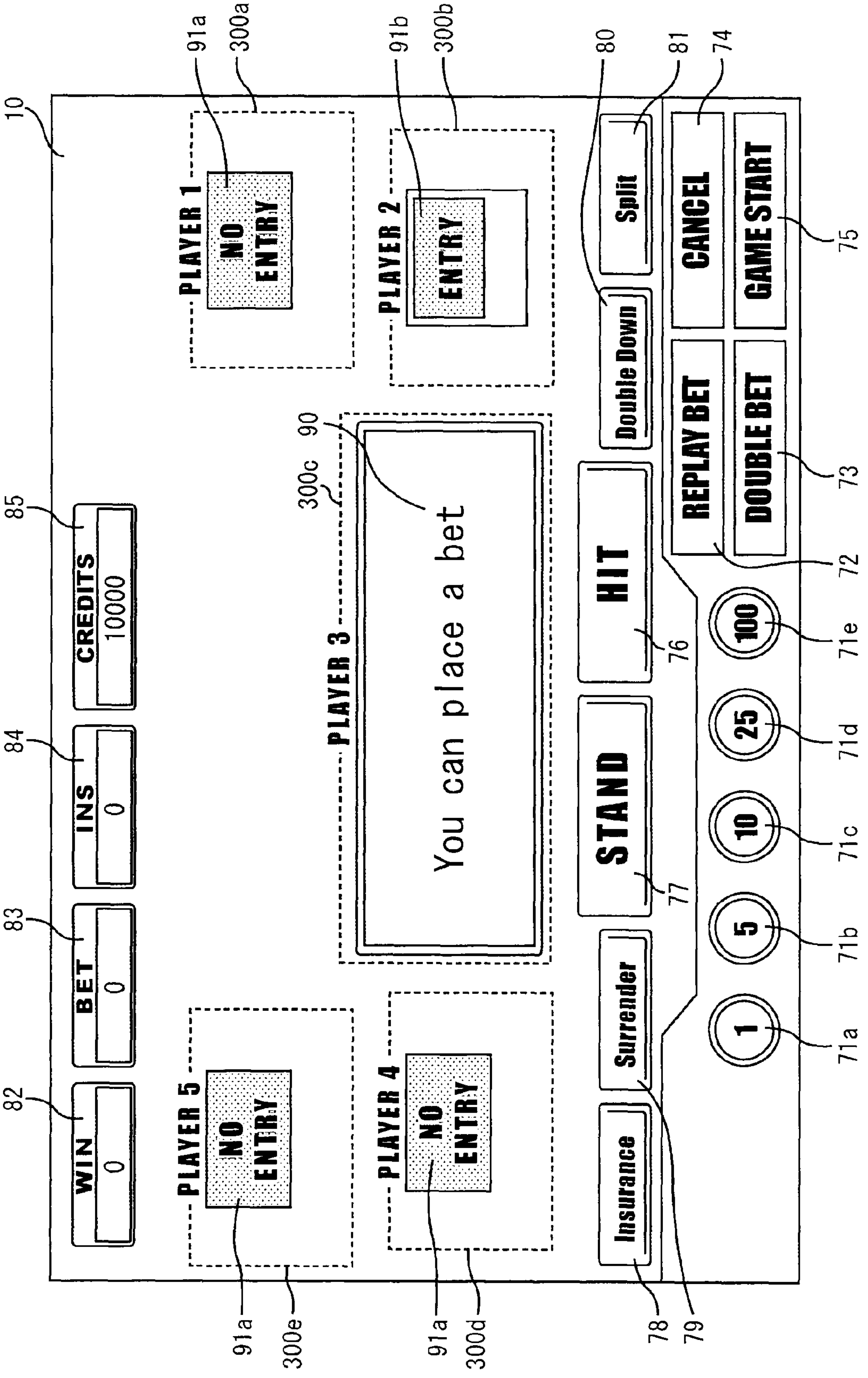
FIG. 1A is a view illustrating an exemplary image displayed on a liquid crystal display in a gaming machine according to one embodiment of the present invention.

Hereinafter, embodiments (first embodiment to second embodiment) of the present invention will be described.

A gaming machine 1 according to the embodiments of the present invention executes a Blackjack game.

First, a Blackjack game will be described. It is to be noted the Blackjack game described here corresponds to the normal game of the present invention.

In a Blackjack game, six decks or eight decks of playing cards (52 cards in one deck) are used. One or more players play a game against a dealer.

Each card has one number and one suit drawn thereon. The number drawn on each card is one of "2", "3", "4", "5", "6", "7", "8", "9", "10", "J", "Q", "K", and "A". The suit drawn on each card is one of "Spades", "Hearts", "Diamonds", and "Clubs". Note that, in the present description, symbols "J", "Q", "K", and "A" are also called numbers.

The card totals are compared between the cards distributed to the player (player cards) and the cards distributed to the dealer (dealer cards) to determine the result of a game. It is to be noted that one who has the card total (total of the numbers drawn on cards) larger than 21 loses the game. Accordingly, the player plays a game to get a higher card total without going over 21. In the Blackjack game, the card total is calculated as follows. Namely, "A" values 1 or 11, a face card ("J", "Q", and "K") values 10, and other cards with a number 2 to 10 value as that value.

Specifically, a Blackjack game is played as follows.

First, two cards are respectively distributed to players having placed normal bets and to a dealer. The two cards distributed to each player are referred to as player initial cards in the present description.

After receiving the cards, each player selects one of options including "hit", "stand", "split", "double down", "insurance", and "surrender".

Selecting "hit" corresponds to a request for another card.

Selecting "stand" corresponds to requesting no more cards.

"Split" can be selected when the player receives two cards of the same value. The player splits these two cards and receives a new card to pair with each split card so as to play two separate hands.

Selecting "double down" corresponds to doubling the normal bet amount in exchange for requesting only one more card.

"Insurance" can be selected to take the normal bet credits back by further placing a bet of half the amount of the normal bet when a combination of the two cards distributed to the dealer forms a so-called "Blackjack" (the two cards are an "A" card and a card valuing 10).

Selecting "surrender" corresponds to taking the normal bet credits back by further placing a bet of half the amount of the normal bet and giving up the game.

"Sprit", "double down", "insurance", and "surrender" constitute a special command of the present invention.

A card to be distributed in "hit" or "double down" is referred to as a player additional card in the present description.

After hands of all the players playing the game are fixed, the dealer hits the card until the dealer has the card total of 17 or more. Then, the card total of the dealer and the card total of the player are compared to determine the result of the game. In the case of player's winning, the player gets a profit corresponding to the amount of the normal bet. In the case of dealer's winning, on the other hand, the player loses the amount of the normal bet.

In a case where initially received cards are an "A" card and a card valuing 10 (Blackjack hand is established), the two-card total of 21 is higher as a hand than the three-or-more-card total of 21. In the case where the player has a Blackjack hand, the player can get a profit corresponding to 1.5 times of the normal bet.

There has been described a Blackjack game.

In a gaming machine 1 according to the embodiments of the present invention, a side game is played aside from a Blackjack game.

In the following, the side game is described with reference to drawings.

First Embodiment

First, an outline of the first embodiment is described with reference to FIG. 1 (FIG. 1A to FIG. 1I).

FIGS. 1A to 1I are views each illustrating an exemplary image displayed on a liquid crystal display in a gaming machine according to one embodiment of the present invention.

Figure 2:
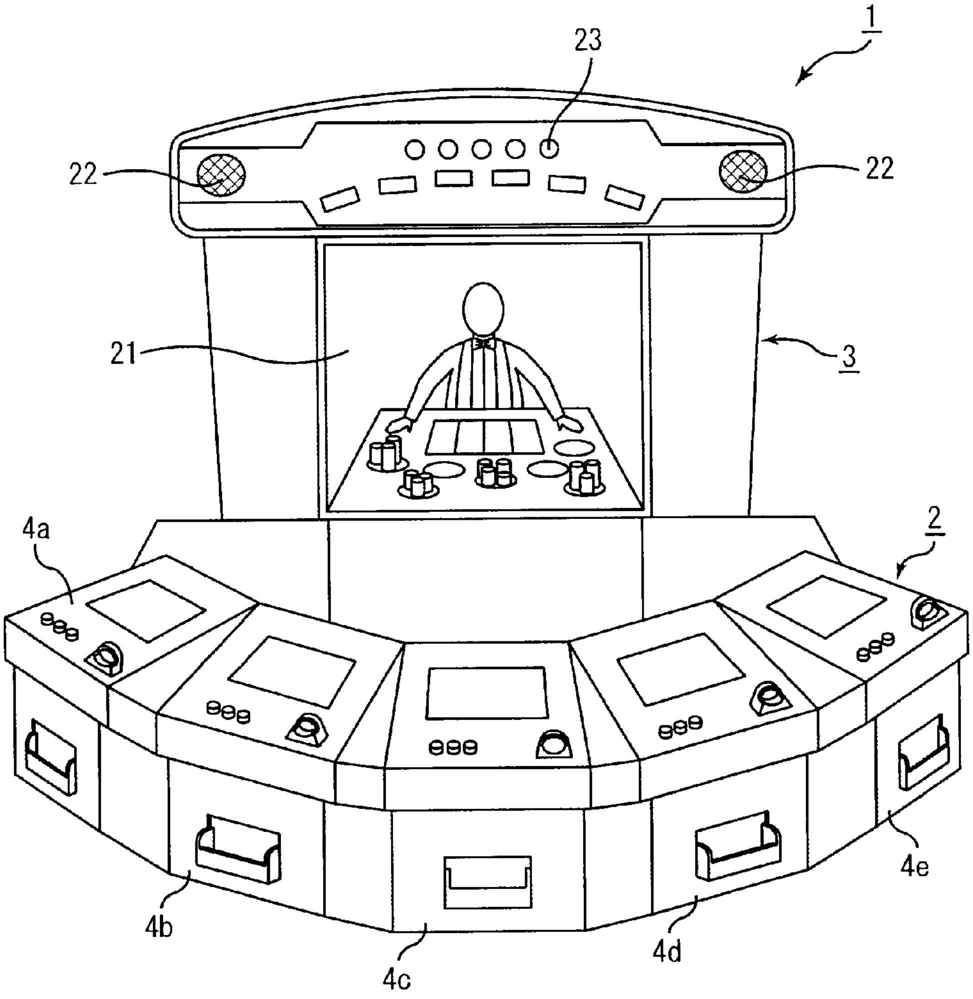
FIG. 2 is an outline view of the gaming machine according to one embodiment of the present invention.

The gaming machine 1 according to the present embodiment is provided with player terminals 4 (player terminal 4*a*, player terminal 4*b*, player terminal 4*c*, player terminal 4*d*, player terminal 4*e*) (see FIG. 2). Players playing a game on the respective player terminal 4*a*, player terminal 4*b*, player terminal 4*c*, player terminal 4*d*, and player terminal 4*e* are called "PLAYER 1", "PLAYER 2", "PLAYER 3", "PLAYER 4", and "PLAYER 5" herein. These five players can play a game in the gaming machine 1. The player terminals 4 correspond to the stations in the present invention.

The images illustrated in FIG. 1 are images displayed on a liquid crystal display 10 (see FIG. 3) provided in the player terminal 4*c*. As illustrated in FIG. 1A, the liquid crystal display 10 has a game information display area 300*c*. The game information display area 300*c* displays information on the game in the player terminal 4*c*.

The liquid crystal display 10 has game information display areas 300 (300*a*, 300*b*, 300*d*, and 300*e*).

The game information display area 300*a* displays information on the game in the player terminal 4*a*. The game information display area 300*b* displays information on the game in the player terminal 4*b*. The game information display area 300*d* displays information on the game in the player terminal 4*d*. The game information display area 300*e* displays information on the game in the player terminal 4*e*.

As above, since information on the games in the player terminals 4 other than the player terminal 4*c* is displayed, PLAYER 3 playing the game on the player terminal 4*c* can grasp the information on the games in the other player terminals 4.

FIG. 1A illustrates a situation in which a normal bet acceptance character image 90 is displayed on the game information display area 300*c*.

PLAYER 3 playing a game in the player terminal 4*c* can place a normal bet (bet on a blackjack game) by touching a position on a touch panel 11 corresponding to the normal bet acceptance character image 90.

Hereinafter, the normal bet acceptance character image 90 is also referred to as a normal bet button image.

The touch panel 11 is provided on the front face of the liquid crystal display 10.

Note that the button images such as the normal bet button image are also referred to simply as buttons herein.

Touching a position on the touch panel 11 corresponding to any of the button images is also referred to as "pressing (turning on) a button". For example, touching a position on the touch panel 11 corresponding to the normal bet button image is also referred to as "pressing (turning on) the normal bet button".

Further, touching a position on the touch panel 11 corresponding to any of the button images is also referred to as "touching a button" or "operating a button".

Figure 1B:
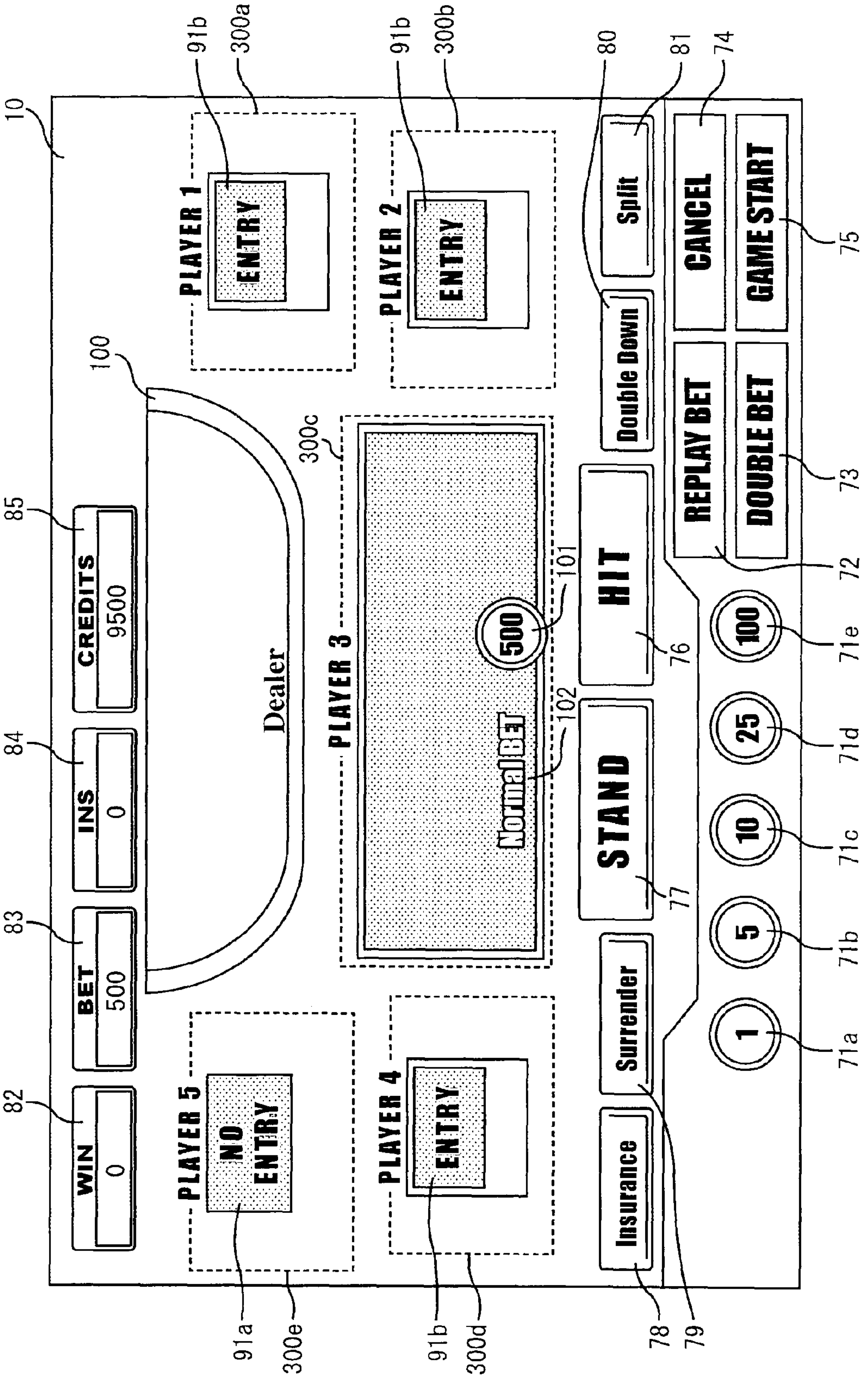
FIG. 1B is a view illustrating an exemplary image displayed on the liquid crystal display in the gaming machine according to one embodiment of the present invention.

FIG. 1B illustrates a character image 102 and a coin image 101 which are displayed upon operation of the normal bet button illustrated in FIG. 1A.

The character image 102 shows that a normal bet is placed. The coin image 101 shows 500 as the number of credits of the normal bet (normal bet amount).

The normal bet of 500 credits has caused a decrease in the number of credits shown in a number-of-credits display area 85 from 10000 (see FIG. 1A) to 9500 (FIG. 1B).

FIG. 1A and FIG. 1B illustrate a NO ENTRY image 91*a* or an ENTRY image 91*b* in the game information display areas 300 corresponding to the respective player terminals 4 other than the player terminal 4*c*. The NO ENTRY image 91*a* indicates that a normal bet is not placed in the player terminal 4 corresponding to the game information display area 300. The ENTRY image 91*b* indicates that a normal bet is placed in the player terminal 4 corresponding to the game information display area 300.

A player can place a side bet (bet on a side game) by touching a position on the touch panel 11 corresponding to the ENTRY image 91*b*.

Hereinafter, the ENTRY image 91*b* is also referred to as a side bet button image.

Figure 1C:
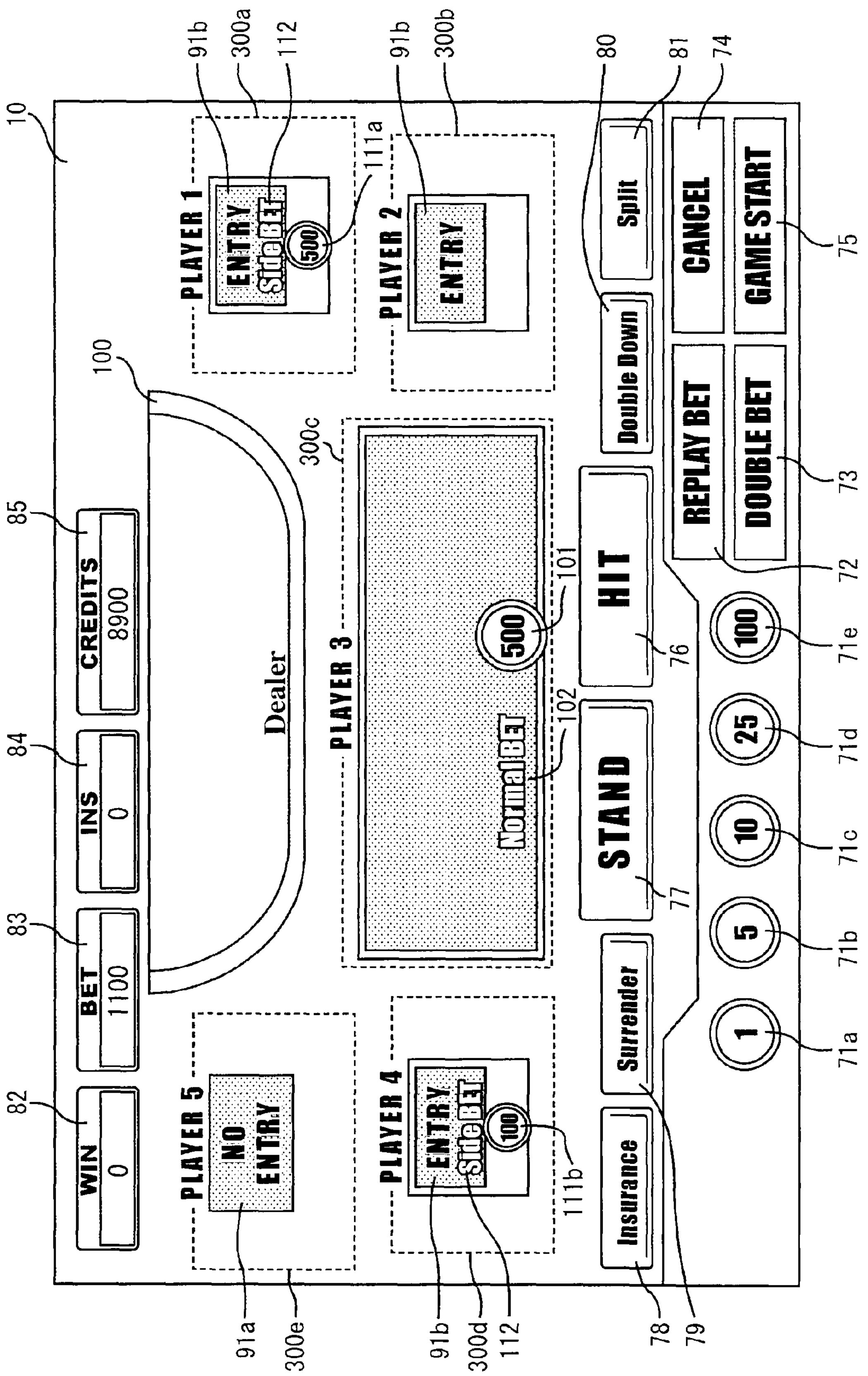
FIG. 1C is a view illustrating an exemplary image displayed on the liquid crystal display in the gaming machine according to one embodiment of the present invention.

FIG. 1C illustrates a situation in which a side bet is placed on the player terminal 4*a* upon operation of the side bet button in the game information display area 300*a*, and a side bet is also placed on the player terminal 4*d* upon operation of the side bet button in the game information display area 300*d*. These side bets are indicated by character images 112.

A coin image 111*a* shows 500 as the number of credits of the side bet (side bet amount). A coin image 111*b* shows 100 as the number of credits of the side bet (side bet amount). That is, 600 credits in total are placed as the side bet. This has decreased the number of credits shown in the number-of-credits display area 85 from 9500 (see FIG. 1B) to 8900 (FIG. 1C).

Upon termination of a bet period, player initial cards are distributed to player terminals 4 at which a normal bet is placed.

In the present embodiment, the liquid crystal display 10 in the player terminal 4 at which a normal bet has been placed displays player cards for this player terminal 4 and player cards for a player terminal 4 on which a side bet has been placed from this player terminal 4.

Figure 1D:
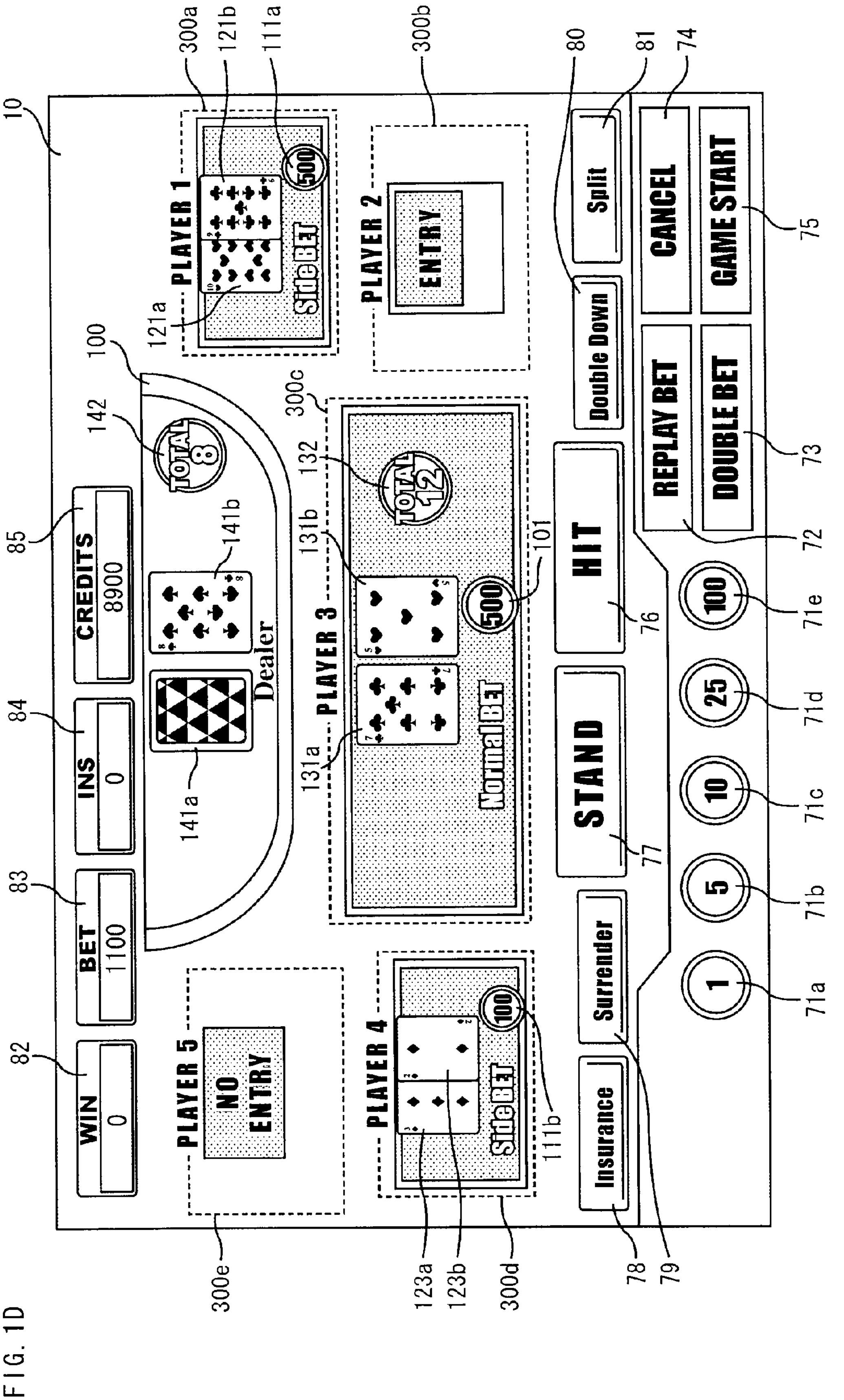
FIG. 1D is a view illustrating an exemplary image displayed on the liquid crystal display in the gaming machine according to one embodiment of the present invention.

In the example in FIG. 1D, player initial cards 131 (131*a*, 131*b*) for the player terminal 4*c*, player initial cards 121 (121*a*, 121*b*) for the player terminal 4*a* and player initial cards 123 (123*a*, 123*b*) for the player terminal 4*d*, which are the side bet targets, are displayed. PLAYER 3 can see the player cards distributed to PLAYER 1 and the player cards distributed to PLAYER 4.

As illustrated in FIG. 1, the liquid crystal display 10 displays a HIT button image 76 and a STAND button image 77. The player can select HIT by touching a position on the touch panel 11 corresponding to the HIT button image 76. The player can select STAND by touching a position on the touch panel 11 corresponding to the STAND button image 77.

Figure 1E:
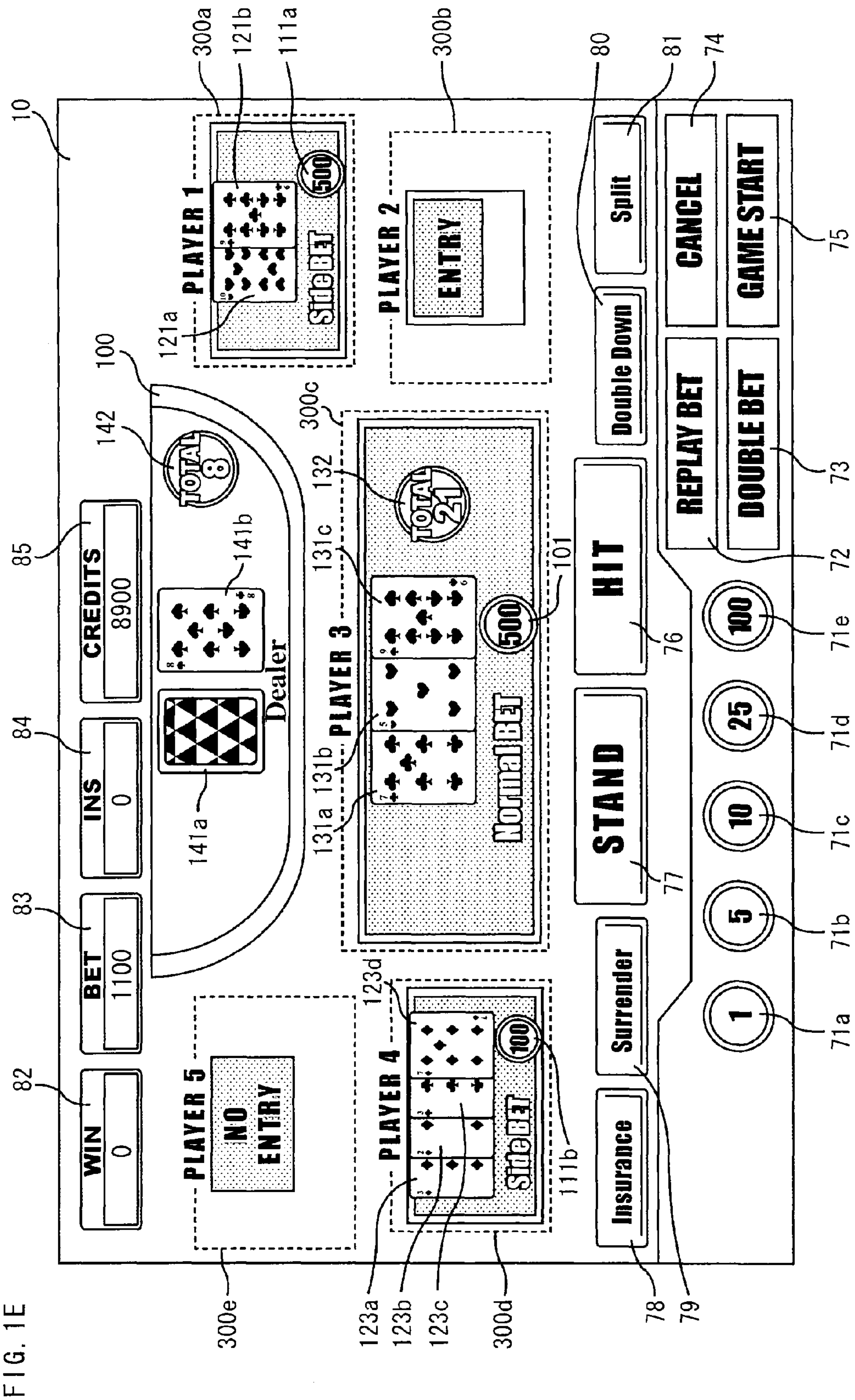
FIG. 1E is a view illustrating an exemplary image displayed on the liquid crystal display in the gaming machine according to one embodiment of the present invention.

Suppose that PLAYER 3 selects HIT and PLAYER 1 selects STAND in the state illustrated in FIG. 1D. Then, a player additional card 131*c* is distributed to PLAYER 3, and no player additional card is distributed to PLAYER 1 as illustrated in FIG. 1E.

Then, winning/losing is determined between each player and the dealer according to the above blackjack rules.

Figure 1F:
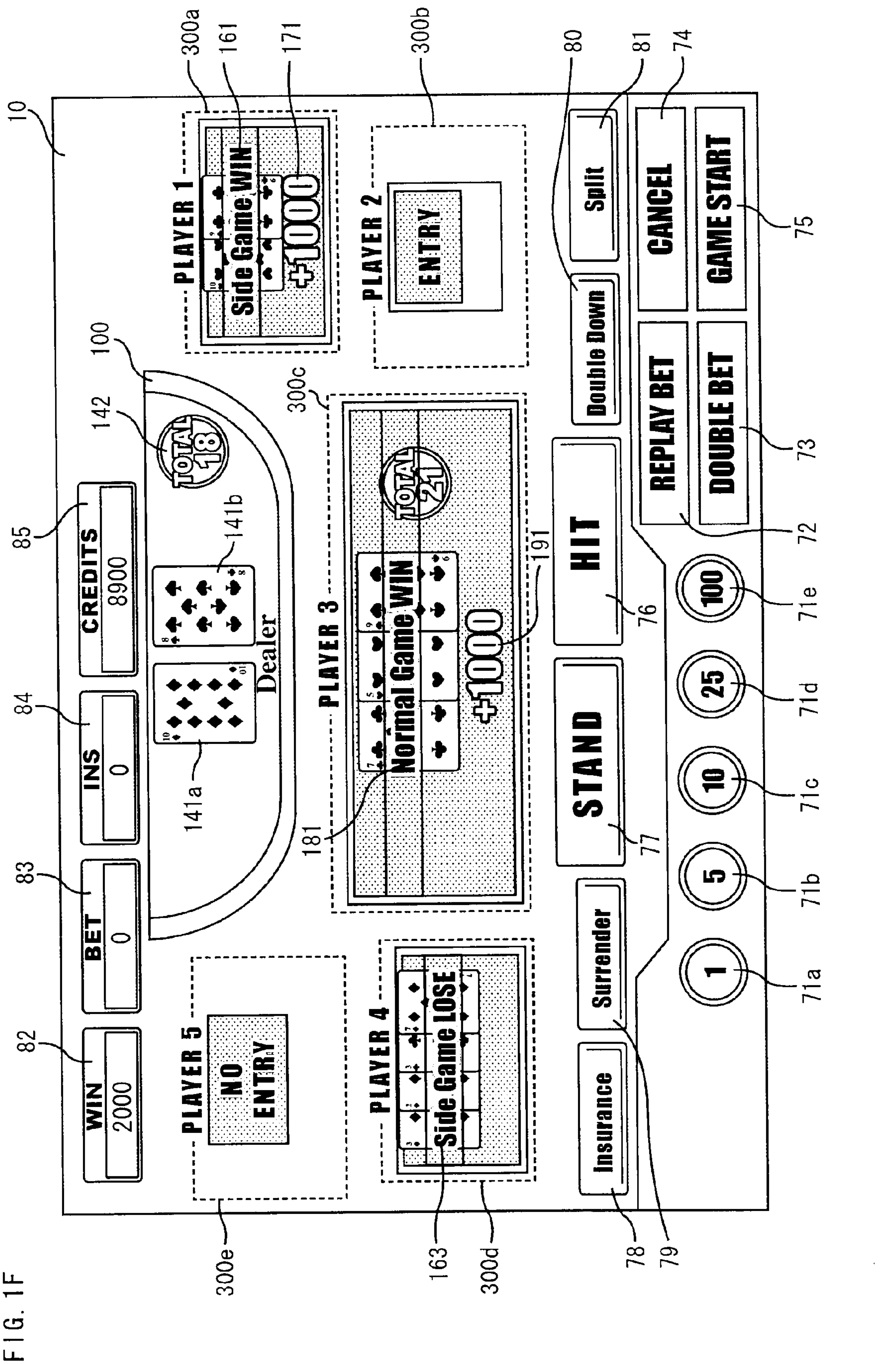
FIG. 1F is a view illustrating an exemplary image displayed on the liquid crystal display in the gaming machine according to one embodiment of the present invention.

In the example of FIG. 1F, a character image 181 is displayed in the game information display area 300*c*, a character image 161 is displayed in the game information display area 300*a*, and a character image 163 is displayed in the game information display area 300*d*.

The character image 181 shows that the normal game in the player terminal 4*c* has resulted in winning of the player. The character image 161 shows that the normal game in the player terminal 4*a* has resulted in winning of the player and thus the side game in the player terminal 4*c* has resulted in winning of the player. The character image 163 shows that the normal game in the player terminal 4*d* has resulted in losing of the player and thus the side game in the player terminal 4*c* has resulted in losing of the player.

In the example of FIG. 1F, a normal payout image 191 and a side payout image 171 are displayed. The normal payout image 191 shows 1000 as the number of credits to be paid out (the number of normal payout credits) in the normal game. The side payout image 171 shows 1000 as the number of credits to be paid out (the number of side payout credits) in the side game.

Figure 1G:
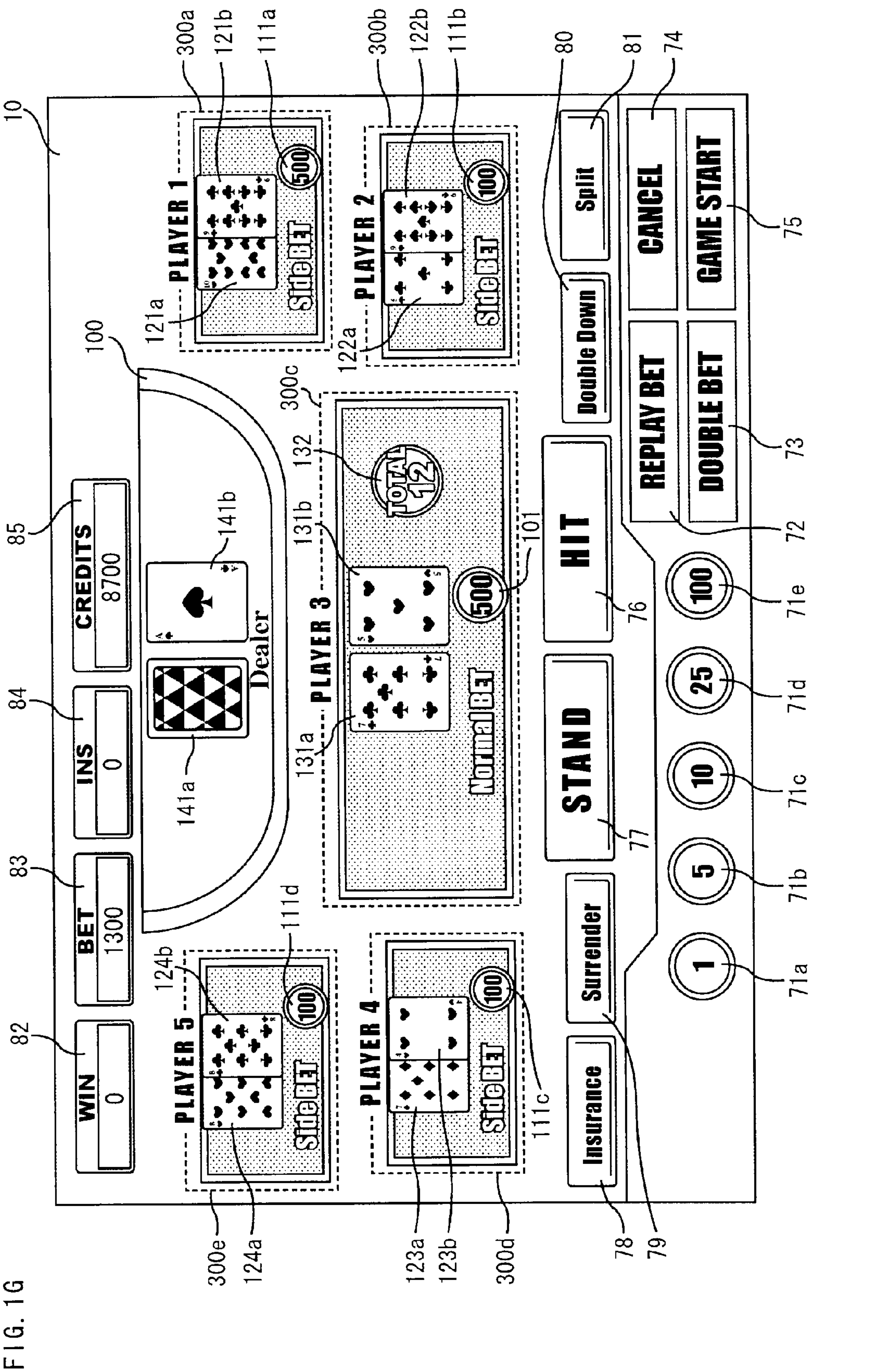
FIG. 1G is a view illustrating an exemplary image displayed on the liquid crystal display in the gaming machine according to one embodiment of the present invention.
Figure 1H:
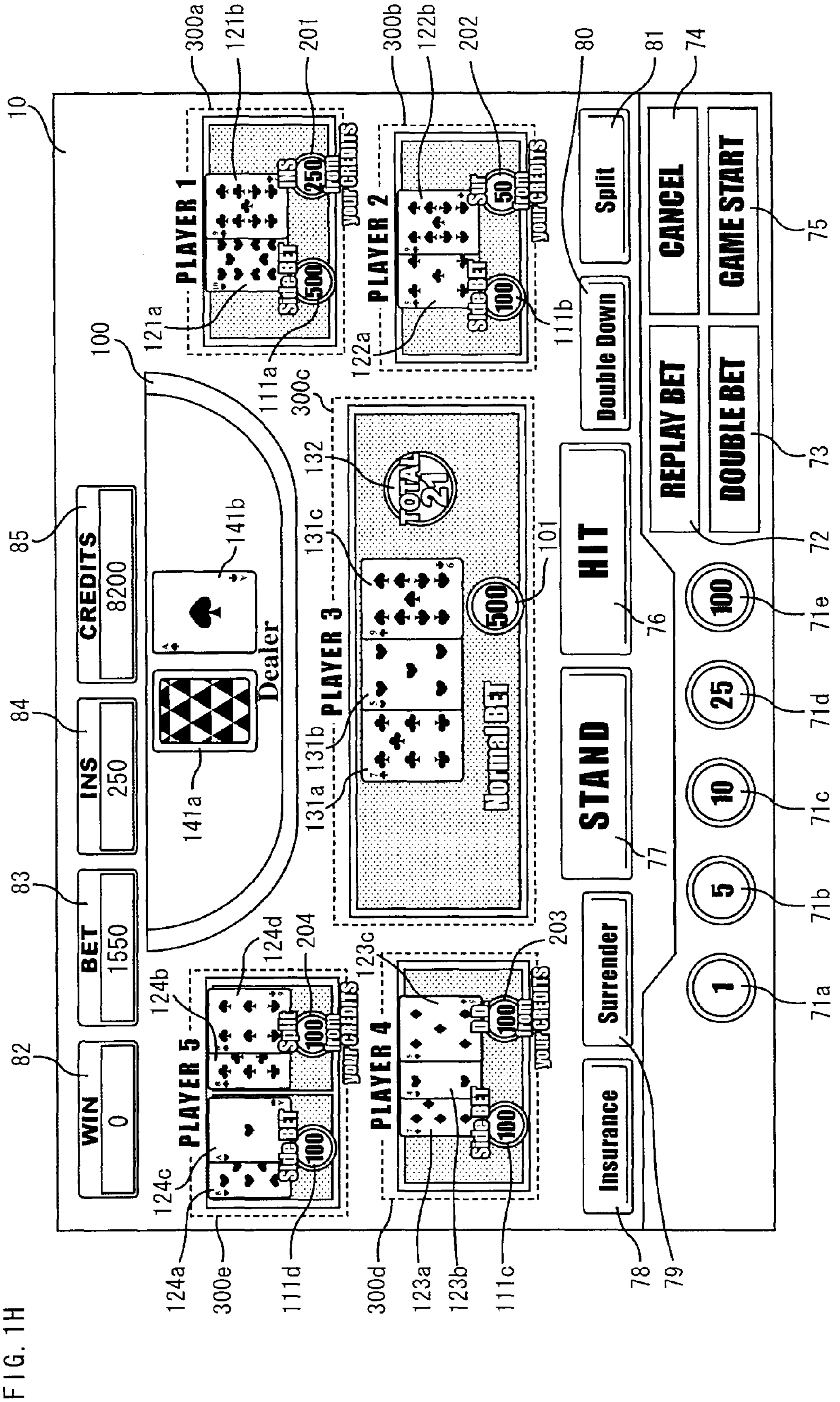
FIG. 1H is a view illustrating an exemplary image displayed on the liquid crystal display in the gaming machine according to one embodiment of the present invention.

FIG. 1G to FIG. 1I each illustrate an image displayed in a game different from the game shown in FIG. 1A to FIG. 1F.

The example shown in FIG. 1G shows a situation in which a side bet is placed on the player terminal 4*a*, the player terminal 4*b*, the player terminal 4*d*, and the player terminal 4*e*.

FIG. 1H illustrates an image displayed when PLAYER 1 has selected INSURANCE, PLAYER 2 has selected SURRENDER, PLAYER 4 has selected Double Down, and PLAYER 5 has selected SPLIT.

In the present embodiment, when SPLIT, Double Down, INSURANCE, or SURRENDER is selected in a player terminal 4 as a side bet target, the number of credits corresponding to SPLIT, Double Down, INSURANCE, or SURRENDER is subtracted from the number of credits in the player terminal 4 at which a side bet has been placed.

The example in FIG. 1H shows that PLAYER 1 has selected INSURANCE as indicated by a coin image 201, and therefore the number of credits (250) corresponding to half the side bet amount (500) on the player terminal 4*a* is compulsorily collected from the credits owned by PLAYER 3.

PLAYER 2 has selected SURRENDER as indicated by a coin image 202, and therefore the number of credits (50) corresponding to half the side bet amount (100) on the player terminal 4*b* is compulsorily collected from the credits owned by PLAYER 3.

PLAYER 4 has selected Double Down as indicated by a coin image 203, and therefore the number of credits (100) corresponding to the side bet amount (100) on the player terminal 4*d* is compulsorily collected from the credits owned by PLAYER 3.

PLAYER 5 has selected SPLIT as indicated by a coin image 204, and therefore the number of credits (100) corresponding to the side bet amount (100) on the player terminal 4*e* is compulsorily collected from the credits owned by PLAYER 3.

This has caused a decrease in the number of credits shown in the number-of-credits display area 85 from 8700 (see FIG. 1G) to 8200 (FIG. 1H).

The player can select INSURANCE by touching a position on the touch panel corresponding to an INSURANCE button image 78. The player can select SURRENDER by touching a position on the touch panel corresponding to a SURRENDER button image 79. The player can select Double Down by touching a position on the touch panel corresponding to a Double Down button image 80. The player can select SPLIT by touching a position on the touch panel corresponding to a SPLIT button image 81.

FIG. 1I illustrates a state in which the normal game result and the side game results are determined, and then images are displayed which show the normal game result, the side game results, the number of normal payout credits, the number of side payout credits, and the like.

As above, there has been described the outline of the first embodiment with reference to FIG. 1.

Hereinafter, the first embodiment will be further described in detail.

In the following, an outline of the gaming machine 1 according to the present embodiment will be described in detail with reference to the accompanying drawings. The gaming machine 1 according to the present embodiment is a kind of multiplayer participation gaming machine. Accordingly, the gaming machine 1 is provided with a plurality of player terminals 4 (see FIG. 2). In the gaming machine 1, Blackjack, one of card games, is executed.

First, a general structure of the gaming machine 1 according to the present embodiment will be described in detail with reference to accompanying drawings.

FIG. 2 is an outline view of the gaming machine 1 according to one embodiment of the present invention.

The gaming machine 1 according to the present embodiment is basically provided with a table portion 2 and a panel portion 3. The table portion 2 is a portion enabling players to play a game by taking a seat, and has the plurality of player terminals 4 described above. The panel portion 3 is set up in a front direction of the players taking a seat at the table portion 2. This panel portion 3 is provided with a front display 21, as described later. The front display 21 displays an animation image of a dealer or the like in accordance with the progress of a game.

Next, the table portion 2 constituting the gaming machine 1 will be described in detail with reference to the accompanying drawings. As shown in FIG. 2, the table portion 2 has the plurality of (five in FIG. 2) player terminals 4 arranged in a general fan shape.

In this context, the structure of one player terminal 4 that constitutes the table portion 2 will be described in detail with reference to an accompanying drawing.

Figure 3:
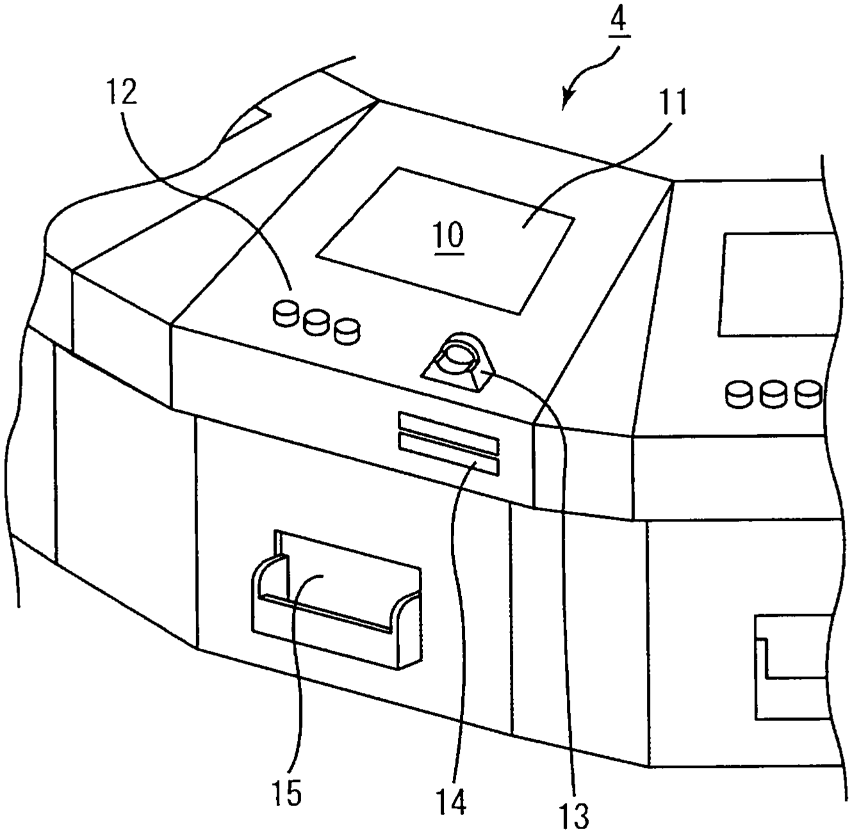
FIG. 3 is an outline view of a player terminal in one embodiment of the present invention.

FIG. 3 is an outline view illustrating one player terminal 4 according to one embodiment of the present embodiment.

Each of the player terminals 4 constituting the table portion 2 has the same structure.

As shown in FIG. 3, one player terminal 4 includes the liquid crystal display 10, the touch panel 11, operation buttons 12, a coin insertion slot 13, a bill insertion slot 14, and a coin exit 15. The liquid crystal display 10 is a display device that displays a game screen (see FIG. 1 and FIG. 6), the results of the game or the like described later. The touch panel 11 is arranged on the front face of the liquid crystal display 10. The touch panel 11 is used to select a bet target or to set a bet amount with a game screen 70 displayed on the liquid crystal display 10. That is, the touch panel 11 functions as an operating unit for selecting the bet target or setting the bet amount. The operation buttons 12 are operating units for making operations such as a payout operation in the gaming machine 1. The coin insertion slot 13 is a portion for a player to insert coins or medals. The bill insertion slot 14 is a portion for a player to insert bills. Further, the coin exit 15 is a portion for paying out coins or medals corresponding to accumulated credits when a player makes a payout operation.

The panel portion 3 constituting the gaming machine 1 includes a front display 21, speakers 22, and LEDs 23. The front display 21 is a display device that displays an image in accordance with the progress of the game. Specifically, the front display 21 displays images such as an image of a dealer distributing cards or exchanging chips. The front display 21 also displays the fronts of distributed cards. The speakers 22 output music and/or sound effects in accordance with the progress of the game. These speakers 22 are set up at the upper portion of the front display 21. The LEDs 23 are a light emitting device that is lit at the time of various effects, and enhances the sense of reality of the game by emitting light in various modes for the effects.

Next, the structure according to a control system of the gaming machine 1 will be described in detail with reference to an accompanying drawing.

Figure 4:
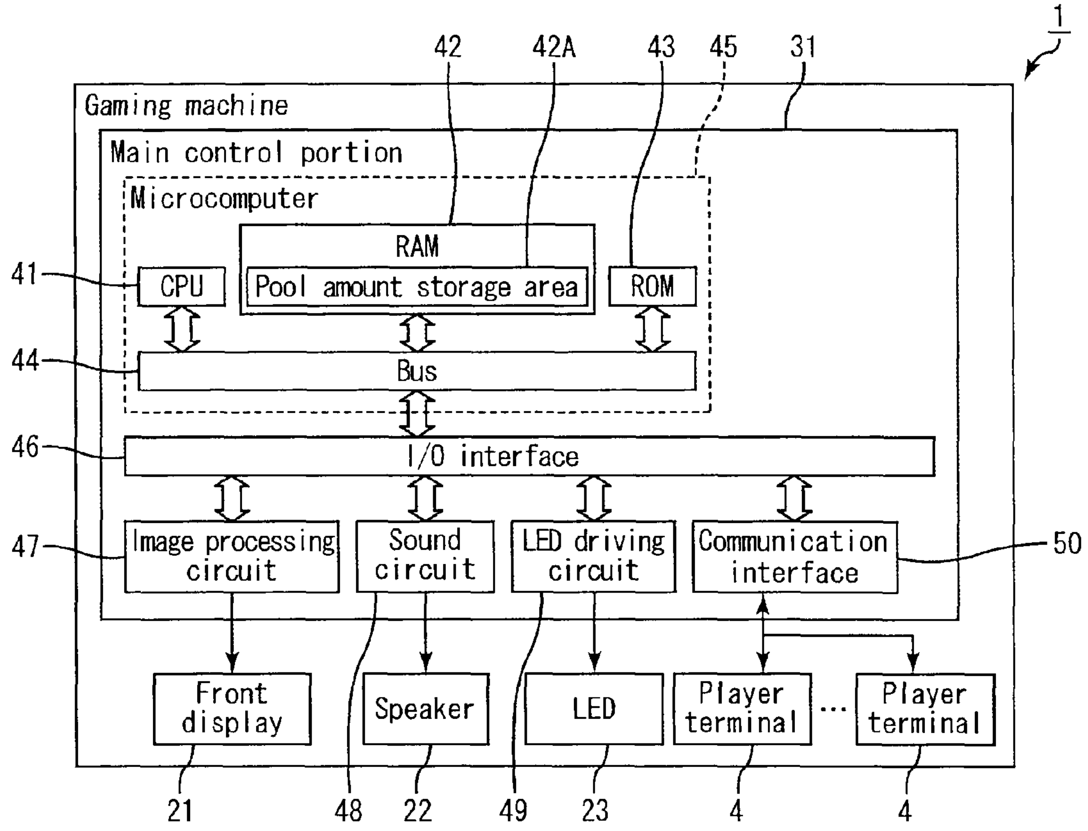
FIG. 4 is a block diagram schematically illustrating a control system of the gaming machine according to one embodiment of the present invention.

FIG. 4 is a block diagram schematically illustrating a control system of the gaming machine according to one embodiment of the present invention.

As illustrated in FIG. 4, the gaming machine 1 includes a main control portion 31, the plurality of player terminals 4 connected to the main control portion 31, and a variety of peripheral devices.

The main control portion 31 basically includes a microcomputer 45 as a core. This microcomputer 45 includes a CPU 41, a RAM 42, a ROM 43, and a bus 44 for transmitting data among the CPU 41, the RAM 42 and the ROM 43. The ROM 43 stores various programs necessary for executing processing to control the gaming machine 1, and data tables. The CPU 41 is a calculating unit that executes various control programs. The CPU 41 is primarily responsible in control of the respective driving circuits by the microcomputer 45. The RAM 42 is a memory for temporarily storing a variety of data calculated by the CPU 41. The ROM 43 stores image data of the fronts and the backs of cards used as the player cards and the dealer cards.

The ROM 43 also stores a blackjack game program for controlling the progress of a blackjack game and determining the result of the black jack game, based on the above blackjack game rules.

The CPU 41 is also connected through an I/O interface 46 to an image processing circuit 47, a sound circuit 48, an LED driving circuit 49, and a communication interface 50. The image processing circuit 47 is a circuit for controlling a display mode of the front display 21, based on control by the CPU 41. Therefore, performing a display control of the front display 21 through the image processing circuit 47 displays images such as a dealer image 102 on the front display 21 (see FIG. 6). The sound circuit 48 is a circuit for performing a drive control of the speakers 22, based on control by the CPU 41. In other words, controlling the speakers 22 through the sound circuit 48 outputs the music and sound effects according to the progress of the game. The LED driving circuit 49 is a circuit for controlling illumination modes of the LEDs 23. Therefore, controlling the illumination modes of the LEDs 23 through the LED driving circuit 49 enables production of effects corresponding to the progress of the game.

The communication interface 50 is an interface that allows each player terminal 4 to transmit and receive various data to and from a main control portion 31. Therefore, a variety of information such as betting operation information from each player terminal 4 is transmitted and received to and from the main control portion 31 through the communication interface 50.

Next, the control system of the player terminals 4 according to the present embodiment will be described in detail with reference to an accompanying drawing.

Figure 5:
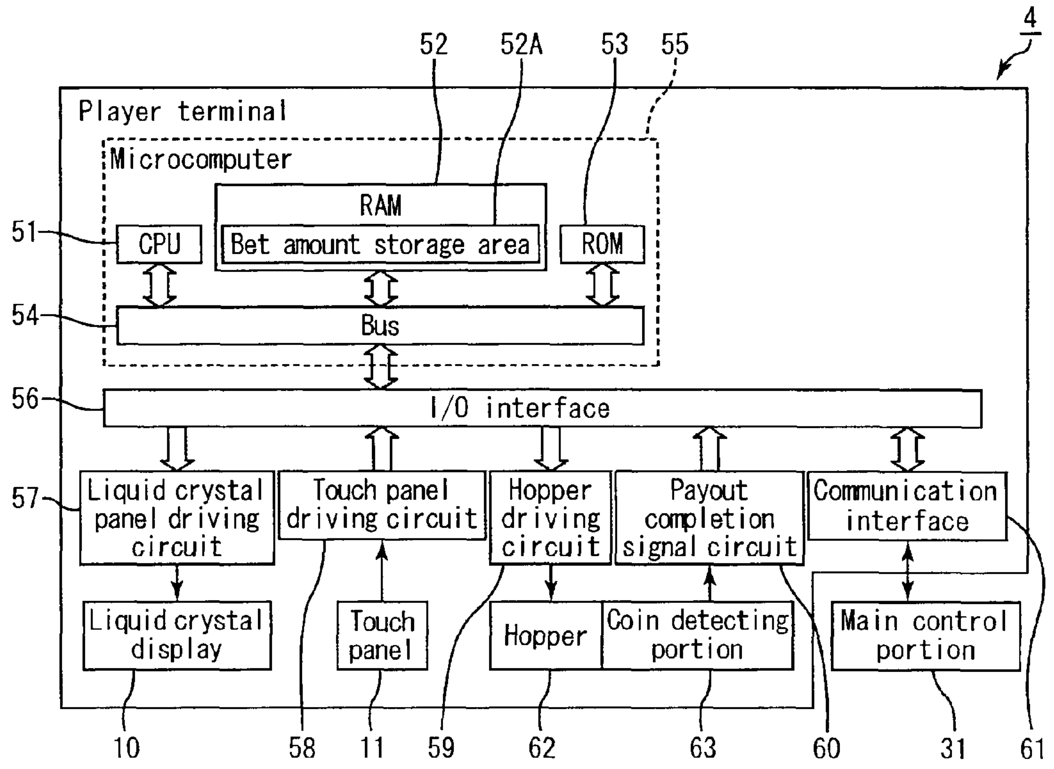
FIG. 5 is a block diagram schematically illustrating a control system of each player terminal according to one embodiment of the present invention.

FIG. 5 is a block diagram schematically illustrating the control system of each player terminal 4 according to one embodiment of the present invention.

As illustrated in FIG. 5, each player terminal 4 according to the present embodiment includes a microcomputer 55 as a core. The microcomputer 55 includes a CPU 51, a RAM 52, a ROM 53, and a bus 54 for transmitting data among the CPU 51, the RAM 52, and the ROM 53. The ROM 53 stores various programs necessary for executing processing to control the player terminal 4, and data tables.

The CPU 51 is a calculating unit that executes a variety of control programs stored in the ROM 53. The CPU 51 is primarily responsible in control of the respective driving circuit by the microcomputer 55. The RAM 52 is a memory for temporarily storing a variety of data calculated by the CPU 51. The RAM 52 has a bet amount storage area 52A provided therein. The bet amount storage area 52A stores a credit amount currently accumulated in the player terminal 4, a bet target betted by a player (i.e., normal bet or side bet), and the bet amount (credit amount) betted on the bet target.

The CPU 51 is connected through an I/O interface 56 to a liquid crystal panel driving circuit 57, a touch panel driving circuit 58, a hopper driving circuit 59, a payout completion signal circuit 60, and a communication interface 61. The liquid crystal panel driving circuit 57 is connected to the liquid crystal display 10, and is used for controlling display modes of the liquid crystal display 10. The touch panel driving circuit 58 is connected to the touch panel 11, detects the operation of the touch panel 11 by a player, and is used for providing control that corresponds to the operation. The hopper driving circuit 59 is connected to a hopper 62, and is used for controlling the hopper 62 at the time of paying out coins to the coin exit 15. The payout completion signal circuit 60 is connected to a coin detecting portion 63. Upon payout of a predetermined number of coins to the coin exit 15, the payout completion signal circuit 60 transmits a payout completion signal indicating that payout has completed.

The communication interface 61 is an interface that allows the player terminal 4 to transmit and receive a variety of information to and from the main control portion 31. For example, betting information based on operation information outputted from the touch panel 11 is transmitted to the main control portion 31 through the communication interface 61.

Next, with reference to the accompanying drawings, a detailed description will be given with respect to a main screen 101 displayed on the front display 21 when a Blackjack game is executed in the gaming machine 1 according to the present embodiment.

Figure 6:
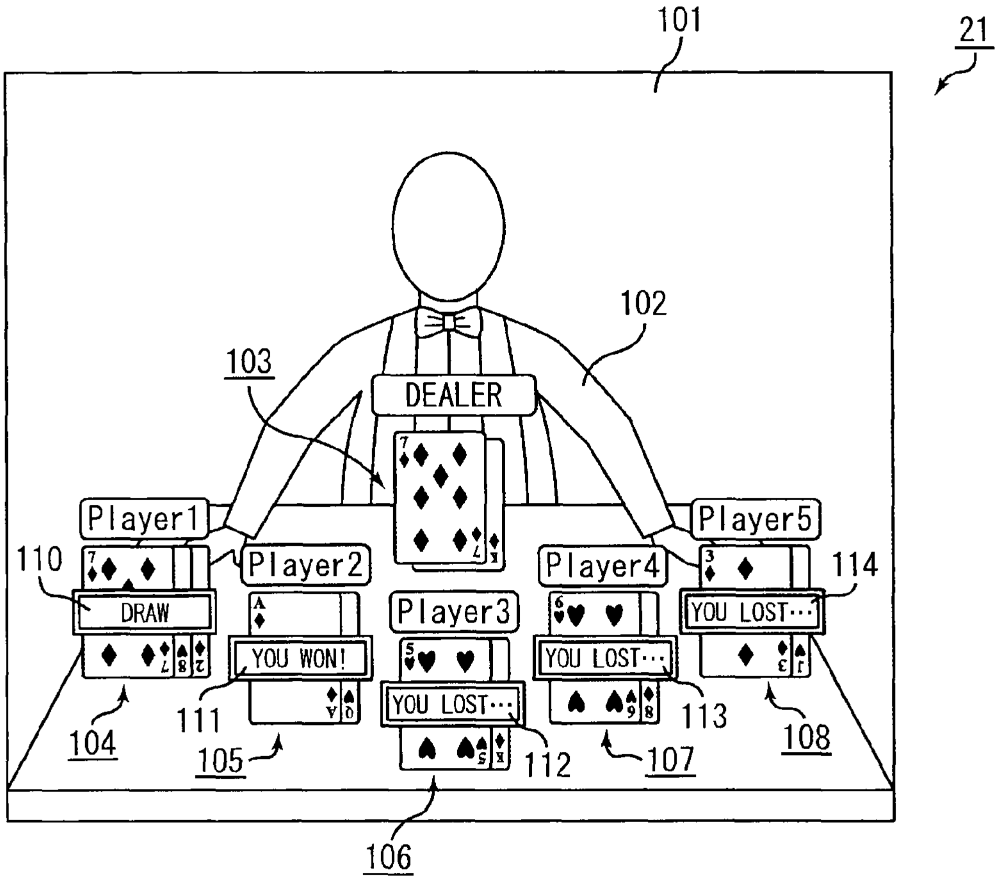
FIG. 6 is an explanatory view of a main screen displayed on a front display.

FIG. 6 is an explanatory view illustrating a main screen displayed on the front display.

In this context, in the gaming machine 1 according to the present embodiment, various images are displayed on the main screen 101, according to the progress of the game. More specifically, animation images of the dealer image 102 performing distribution of cards or the like are displayed on the main screen 101. The gaming machine 1 enhances the player's sense of reality of the game by such display on the main screen 101.

In addition, on the substantially center portion of the main screen 101, dealer cards 103 are displayed. The dealer cards 103 indicate the dealer cards distributed to the dealer. Further, on the lower portion of the main screen 101, player cards 104 to 108 of respective players (a maximum of 5 players) who play the game at the player terminals 4 and winning and losing result images 110 to 114 indicating winning and losing between each of the players and the dealer are displayed.

Next, with reference to the accompanying drawings, a detailed description will be given with respect to a game processing program executed by the CPU 41 of the main control portion 31, and a game processing program at the player terminal side executed by the CPU 51 of the player terminal 4 in the gaming machine 1 having the above construction according to the present embodiment.

First, with reference to FIG. 7 to FIG. 8, the game processing program executed by the main control portion 31 will be described.

When the main control portion 31 starts the game processing program, the CPU 41 first transmits a bet period start command to each player terminal 4 (step S1). This bet period start command is a command for starting acceptance of a bet operation by the player at each player terminal 4.

Next, the CPU 41 executes normal bet signal reception processing (step S2).

Here, normal bet signal reception processing is described with reference to FIG. 9.

Figure 9:
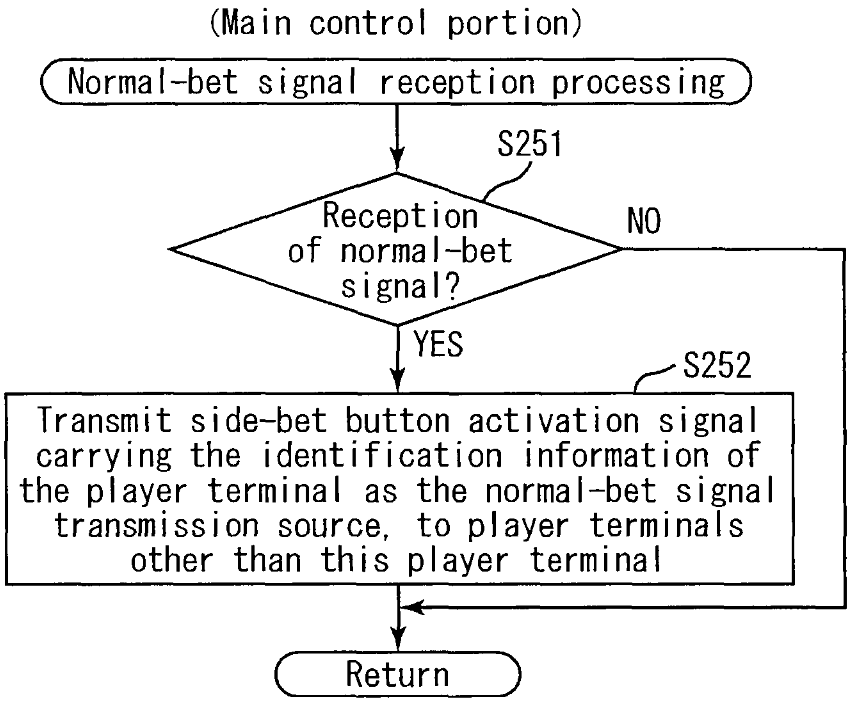
FIG. 9 is a flowchart illustrating a subroutine of normal bet signal reception processing executed in a main control portion.

FIG. 9 is a flowchart illustrating a subroutine of the normal bet signal reception processing executed in the main control portion.

First, the CPU 41 determines whether or not it has received a normal bet signal from any of the player terminals 4 (step S251). A normal bet signal is a signal transmitted from any of the player terminals 4 when a normal bet has been placed at this player terminal 4 (see step S205 of FIG. 10). A normal bet signal includes identification information of the player terminal 4 as the transmission source of the signal.

When the CPU 41 determines that the CPU 41 has received the normal bet signal, the CPU 41 transmits a side bet button activation signal to the player terminals 4 other than the player terminal 4 as the normal bet signal transmission source (step S252). The side bet button activation signal includes identification information of the player terminal 4 as the normal bet signal transmission source.

Upon reception of the side bet button activation signal, the player terminals 4 are enabled to place a side bet on the player terminal 4 as the normal bet signal transmission source.

When determining in step S251 that the CPU 41 has not received the normal bet signal, or after executing the processing of step S252, the CPU 41 ends the present subroutine.

In the above, the normal bet signal reception processing (see step S2 of FIG. 7) has been described with reference to FIG. 9.

Now, refer back to FIG. 7.

After that, when the current step proceeds to step S3, the CPU 41 receives bet information transmitted from each player terminal 4. In this context, the bet information includes information relating to the bet target and the bet amount. Upon the reception of the bet information, the CPU 41 stores the bet information in the RAM 42 in association with each player terminal 4, and then, shifts the processing to step S4.

After that, the CPU 41 carries out player initial card lottery processing (step S4). The player initial card lottery processing (step S4) is a processing for determining cards associated with each player and dealer by means of lottery. In Blackjack games, six decks or eight decks of playing cards are used. One deck has 52 cards each of which is assigned with one of the numbers and one of the suits described above. Therefore, in the player initial card lottery processing (step S4), the CPU 41 randomly associates any of numbers from 1 to N (distribution order) with N cards (for example, N=312 in the case where six decks of cards are used) used in one game. The CPU 41 associates cards with the dealer and each player based on the thus-determined distribution order (in other words, the dealer cards are distributed to the dealer and the player initial cards or the player additional card are distributed to each player).

Following the player initial card lottery processing (step S4), in step S5, the CPU 41 transmits player initial card information to the player terminal 4 that has transmitted the normal bet information, based on a lottery result of the player initial card lottery processing (step S4). In this context, the player initial card information is information relating to two cards to be first distributed to each player who participates in the Blackjack game. Namely, the player initial card information includes information indicating numbers and suits of two cards to be first distributed (such as "7 of Hearts", "A of Spades", for example).

After the player initial card information has been transmitted to the player terminal 4 at which the normal bet has been placed, the CPU 41 executes dealer's image effect processing (step S6). Specifically, the CPU 41 controls the front display 21 and carries out an effect of displaying an image of the dealer who distributes two cards respectively to the player and the dealer on the main screen 101 (refer to FIG. 6). The number and suit of the second card distributed to the dealer are not displayed at the time when the card is distributed.

Next, the CPU 41 executes selection-information reception processing (step S7). The selection-information reception processing is specifically described later with reference to FIG. 17.

Next, the CPU 41 determines whether or not the total of the numbers displayed on the cards distributed to the dealer is "17" or greater (step S8).

When determining the total of the numbers is smaller than "17", the CPU 41 determines a card to be distributed to the dealer and displays the determined card on the front display 21 (step S9). Then, the CPU 41 shifts the processing to step S8.

When determining the total of the numbers is "17" or greater, the CPU 41 executes normal game result determination processing (step S10). In the processing, the CPU 41 compares the cards distributed to the dealer (dealer cards) with the cards distributed to each player (player cards), and judges winning and losing (normal game result) between each player and the dealer. Specifically, the total of the numbers displayed on the dealer cards and the total of the numbers displayed on the player cards are calculated, and the one having the cards with the total of numbers closer to "21" without exceeding "21" is determined to be a winner. In the case where the total of numbers of the player cards and the total of numbers of the dealer cards are the same, the CPU 41 judges the game to be a draw.

When the SPLIT button is turned on at any of the player terminals 4, the CPU 41 determines the normal game result of this player terminal 4 for each pair of the split player cards. The CPU 41 determines whether or not a SPLIT selection flag is set so as to determine whether or not the SPLIT button is turned on at the player terminal 4. The CPU 41 sets a SPLIT selection flag upon receiving a SPLIT selection signal from any of the player terminals 4, in association with the player terminal 4 as the transmission source of the SPLIT selection signal (see step S426 of FIG. 19).

When a player playing a game at any of the player terminals 4 has turned the Double Down button on and wins, the CPU 41 includes payout of credits double the normal bet amount to the player in the normal game result of this player terminal 4. The CPU 41 determines whether or not a Double Down selection flag is set so as to determine whether or not the Double Down button is turned on at the player terminal 4. The CPU 41 sets a Double Down selection flag upon receiving a Double Down selection signal from any of the player terminals 4, in association with the player terminal 4 as the transmission source of the Double Down selection signal (see step S446 of FIG. 21).

When a player at any of the player terminals 4 has turned the INSURANCE button on and the two dealer cards form "blackjack" (when the two cards are an "A" card and a card valuing 10), the CPU 41 includes a refund of the normal bet credits, in the normal game result of the player terminal 4. The CPU 41 determines whether or not an INSURANCE selection flag is set so as to determine whether or not the INSURANCE button is turned on at the player terminal 4. The CPU 41 sets an INSURANCE selection flag upon receiving an INSURANCE selection signal from any of the player terminals 4, in association with the player terminal 4 as the transmission source of the INSURANCE selection signal (see step S466 of FIG. 23).

When the player has turned the SURRENDER button on at any of the player terminals 4, the CPU 41 includes a refund of the normal bet credits to the player regardless of what the dealer cards are, in the normal game result at the player terminal 4. The CPU 41 determines whether or not a SURRENDER selection flag is set so as to determine whether or not the SURRENDER button is turned on at the player terminal 4. The CPU 41 sets a SURRENDER selection flag upon receiving a SURRENDER selection signal from any of the player terminals 4, in association with the player terminal 4 as the transmission source of the SURRENDER selection signal (see step S486 of FIG. 25).

Next, the CPU 41 executes side game result determination processing (step S11).

In the processing, the CPU 41 determines the side game result based on side bet information included in the bet information received in step S3 and the normal game result determined in step S10. In the processing, the CPU 41 determines the side game result for each player terminal 4. The CPU 41 determines the side game result of each player terminal 4 as the side bet target, based on the normal game result 4 of this player terminal 4. That is, when the normal game result of the player terminal 4 as the side bet target is winning of the player, the CPU 41 includes payout of side bet credits to the player, in the side game result of the player terminal 4 at which the side bet has been placed.

When a SPLIT permission flag (see step S425 of FIG. 19) is set for any of the player terminals 4, the CPU 41 determines the side game result corresponding to the normal game result of this player terminal 4 for which the SPLIT selection flag is set. Specifically, the CPU 41 determines the side game result of the player terminal 4 for which the SPLIT permission flag is set, for the respective pairs of the split player cards of this player terminal 4 for which the SPLIT selection flag is set.

When a Double Down permission flag (see step S445 of FIG. 21) is set for any of the player terminals 4, the CPU 41 determines the side game result corresponding to the normal game result of the player terminal 4 for which the Double Down selection flag is set. Specifically, when the normal game result of the player terminal 4 having the Double Down selection flag set therefor is winning of the player, the CPU 41 includes payout of credits double the side bet amount to the player, in the side game result of the player terminal 4 for which the Double Down permission flag is set.

When an INSURANCE permission flag (see step S465 of FIG. 23) is set for any of the player terminals 4, the CPU 41 determines the side game result corresponding to the normal game result of the player terminal 4 for which the INSURANCE selection flag is set. Specifically, when the two dealer cards form "blackjack" (when the two cards are an "A" and a card valuing 10), the CPU 41 includes a refund of credits corresponding to the side bet amount to the player, in the normal game result of the player terminal 4 for which the INSURANCE permission flag is set.

When a SURRENDER permission flag (see step S485 of FIG. 25) is set for any of the player terminals 4, the CPU 41 determines the side game result corresponding to the normal game result of the player terminal 4 for which the SURRENDER selection flag is set. Specifically, regardless of what the dealer cards are, the CPU 41 includes a refund of credits corresponding to the side bet amount to the player, in the side game result of the player terminal 4 for which the SURRENDER permission flag (see step S485 of FIG. 25) is set.

Subsequently, in step S12, the CPU 41 transmits the normal game result information showing the normal game result determined in step S10 and the side game result information showing the side game result determined in step S11, to each player terminal 4.

The CPU 41 also calculates the number of credits (the number of normal payout credits) to be paid out as a normal game payout in each player terminal 4, based on the normal game result of the player terminal 4 determined in step S10 and the normal bet amount of the player terminal 4. Then, the CPU 41 transmits information showing the calculated number of normal payout credits (number-of-normal-payout-credits information) to each player terminal 4.

The CPU 41 also calculates the number of credits (the number of side payout credits) to be paid out as a side game payout in each player terminal 4, based on the side game result of the player terminal 4 determined in step S11 and the side bet amount at the player terminal 4. Then, the CPU 41 transmits information showing the calculated number of side payout credits (number-of-side-payout-credits information) to each player terminal 4.

Then, as shown in FIG. 6, the CPU 41 displays winning and losing result images 110 to 114 indicating the result of winning and losing judgment of each player terminal 4 on the main screen 101 of the front display 21 (step S13). After displaying the result of the winning and losing judgment processing (step S13), the CPU 41 completes the game processing program in the main control portion 31.

Next, the game processing program executed at the side of the player terminal 4 will be described with reference to FIG. 7 and FIG. 8.

When execution of the game processing program is started, in step S101, the CPU 51 receives a bet period start command from the main control portion 31.

Thereafter, in step S102, the CPU 51 executes bet input acceptance processing.

Here, the bet input acceptance processing is described with reference to FIG. 10.

Figure 10:
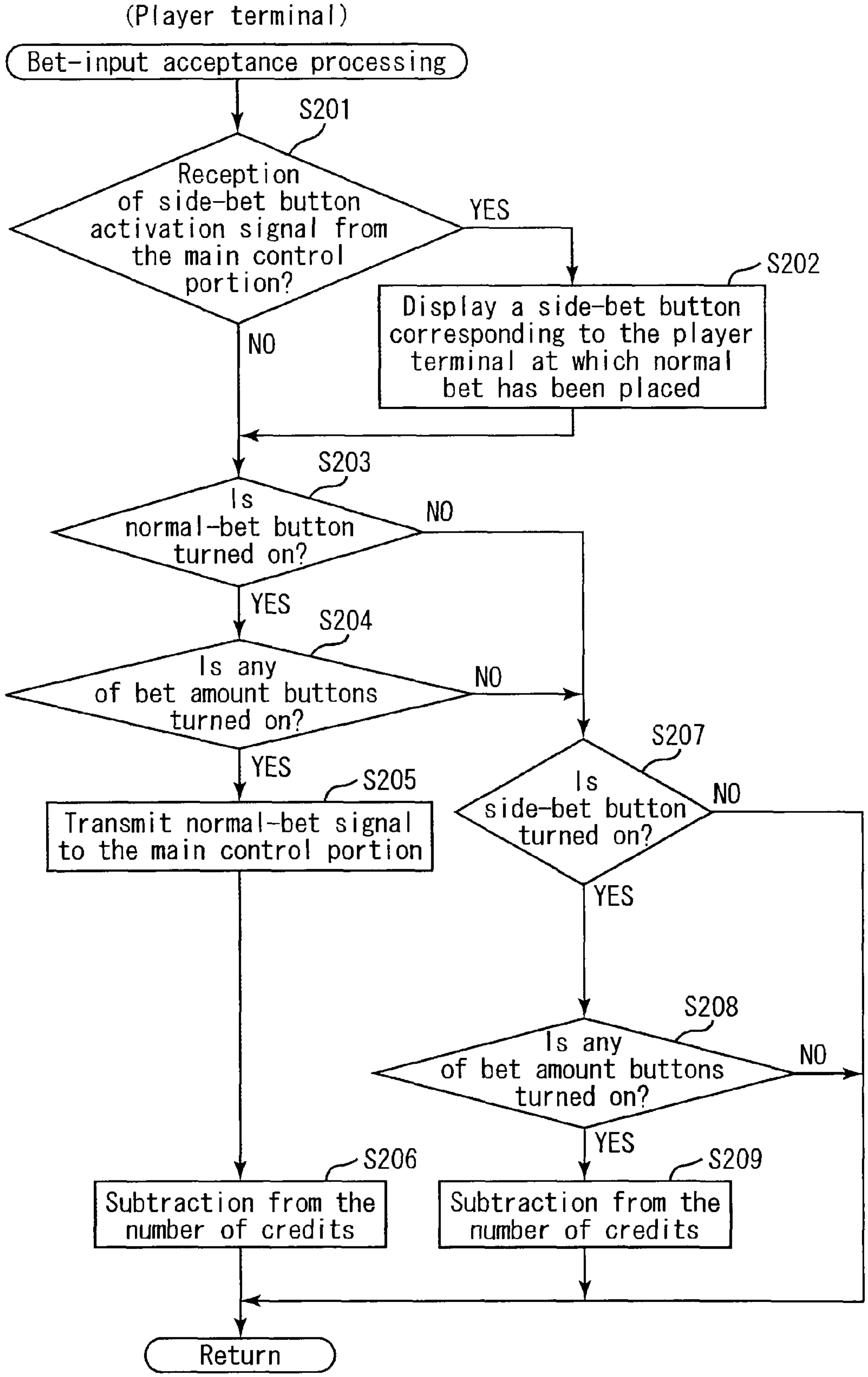
FIG. 10 is a flowchart illustrating a subroutine of bet-input acceptance processing executed in each player terminal.
Figure 11:
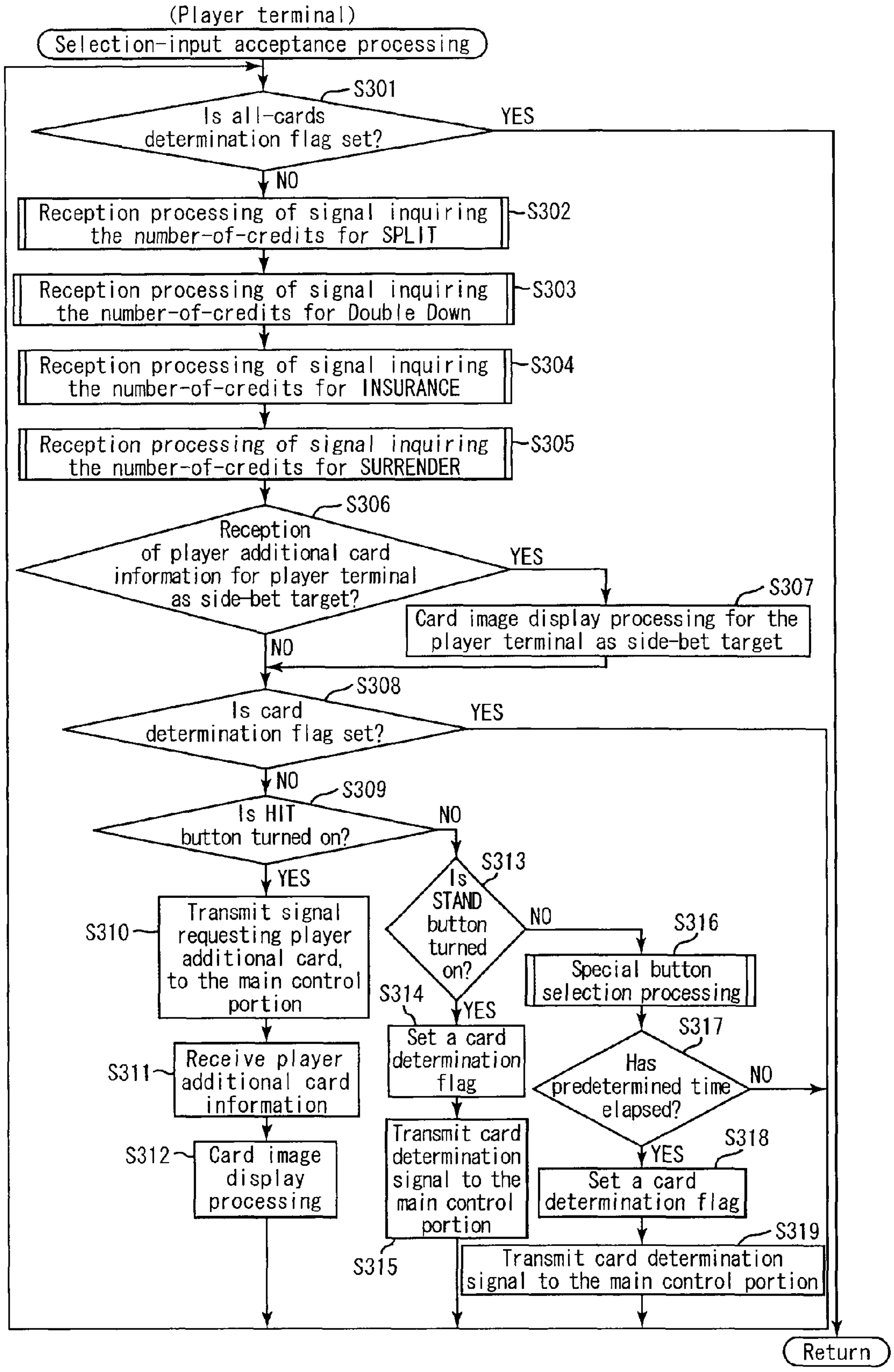

FIG. 10 is a flowchart illustrating a subroutine of the bet input acceptance processing executed in each player terminal.

First, the CPU 51 determines whether or not it has received the side bet button activation signal (see step S252 of FIG. 9) from the main control portion 31 (step S201).

When the CPU 51 determines that it has received the side bet button activation signal, the CPU 51 displays an ENTRY image 91*b* (side bet button) in any of the game information display areas 300 corresponding to the player terminal 4 at which a normal bet is placed, based on the identification information carried by the signal (see FIG. 1).

When the CPU 51 determines in step S201 that it has not received the side bet button activation signal, or after executing the processing of step S202, the CPU 51 determines whether or not the normal bet button is turned on (step S203). In the processing, the CPU 51 determines whether or not it has received a signal to be transmitted from the touch panel 11 when a player touches a position on the touch panel 11 corresponding to the normal bet acceptance character image 90 (normal bet button).

When determining that the normal bet button has been turned on, the CPU 51 determines whether or not any bet amount button has been turned on (step S204). In the processing, the CPU 51 determines whether or not it has received a signal to be transmitted from the touch panel 11 when the player touches a position on the touch panel 11 corresponding to a “1 credit” button image 71*a*, a “5 credits” button image 71*b*, a “10 credits” button image 71*c*, a “25 credits” button image 71*d*, or a “100 credits” button image 71*e*.

When determining that any one of the bet amount buttons has been turned on, the CPU 51 transmits a normal bet signal to the main control portion 31 (step S205).

Next, the CPU 51 subtracts the number of credits corresponding to the bet amount button turned on, from the number of credits stored in the RAM 52, and stores the normal bet amount into the RAM 52 (step S206).

When determining in step S203 that the normal bet button has not been turned on, or when determining in step S204 that no bet amount button has been turned on, the CPU 51 determines whether or not the side bet button has been turned on (step S207). In the processing, the CPU 51 determines whether or not it has received a signal to be transmitted from the touch panel 11 when a player touches a position on the touch panel 11 corresponding to the ENTRY image 91*b* (side bet button).

When determining that the side bet button has been turned on, the CPU 51 identifies the player terminal 4 as the side bet target, based on the position on the touch panel 11 of the player terminal 4 of the transmission source of the signal, and then stores information showing the identified player terminal 4 into the RAM 52.

The CPU 51 determines whether or not any of the bet amount buttons has been turned on (step S208). In the processing, the CPU 51 determines whether or not it has received a signal to be transmitted from the touch panel 11 when a player touches a position on the touch panel 11 corresponding to the “1 credit” button image 71*a*, the “5 credits” button image 71*b*, the “10 credits” button image 71*c*, the “25 credits” button image 71*d*, or the “100 credits” button image 71*e*.

When determining that any one of the bet amount buttons has been turned on, the CPU 51 subtracts the number of credits corresponding to the bet amount button turned on, from the number of credits stored in the RAM 52, and stores the side bet amount into the RAM 52 in association with the player terminal 4 as the side bet target (step S209).

When determining in step S207 that no side bet button has been turned on, when determining in step S208 that no bet amount button has been turned on, or after executing the processing of step S206 or step S209, the CPU 51 ends the present subroutine.

In the above, the bet input acceptance processing (see step S102 of FIG. 7) has been described with reference to FIG. 10.

Now, refer back to FIG. 7.

In step S103, the CPU 51 determines whether or not a bet period has terminated. Specifically, the CPU 51 determines whether or not a predetermined given time (20 seconds, for example) has been passed after starting acceptance of the normal bet operation (i.e., reception of the bet period start command). In the case where the normal bet period has terminated (step S103: YES), the CPU 51 shifts the processing to step S104. On the other hand, in the case where the betting period has not terminated yet (step S103: NO), the CPU 51 continuously accepts the betting operation.

When the current step proceeds to step S104, the CPU 51 stores the current normal bet information in the RAM 52, and transmits the normal bet information to the main control portion 31. The bet information includes normal bet information showing the normal bet amount (credit amount) betted by the player. Further, in the case that a side bet has been placed, the bet information also includes side bet information. The side bet information includes information showing the player terminal 4 as the side bet target and information showing the side bet amount on the player terminal 4.

In step S105, the CPU 51 receives the player initial card information. The player initial card information here is information to be transmitted from the main control portion 31 to the player terminal 4 in step S5 and is about two cards associated with the player who plays the game at the player terminal 4. Therefore, the player initial card information includes information on numbers and suits of two player initial cards (such as “7 of Hearts”, “A of Spades”, for example).

Upon the reception of the player initial card information, the CPU 51 displays the player initial cards in one of the game information display areas 300, based on the player initial card information (step S106).

In the processing, the CPU 51 displays the player initial cards for the player terminal 4 having the concerned CPU 51 provided therein on one of the game information display areas

300 corresponding to the concerned player terminal 4. Also, in any of the game information display areas 300 corresponding to the player terminal 4 as a side bet target, the CPU 51 also displays the player initial cards for the concerned player terminal 4 (see FIG. 1D).

Then, the CPU 51 executes selection-input acceptance processing (step S107). The selection-input acceptance processing is specifically described later with reference to FIG. 11.

Next, in step S108, the CPU 51 receives the game result information (normal game result information and side game result information) and number-of-payout-credits information (the number-of-normal-payout-credits information and the number-of-side-payout-credits information) which have been transmitted in step S12 from the main control portion 31.

The CPU 51 then displays an image showing the normal game result (for example, a character image 181 of "Normal Game WIN"; see FIG. 1F) in the game information display area 300, based on the received normal game result information. Further, the CPU 51 displays an image showing the side game result (for example, a character image 161 of "Side Game WIN", and a character image 163 of "Side Game LOSE"; see FIG. 1F) in the game information display area 300, based on the received side game result information.

Thereafter, the CPU 51 executes normal game payout processing (step S110). In the normal game payout processing (step S113), the CPU 51 executes addition of the credits or payout of coins, based on the number-of-normal-payout-credits information.

Next, the CPU 51 executes side game payout processing (step S111). In the processing, the CPU 51 executes addition of the credits or payout of coins, based on the number-of-side-payout-credits information.

Subsequently, the selection-input acceptance processing (see step S107 of FIG. 8) is described with reference to FIGS. 11 to 16.

Figure 11:
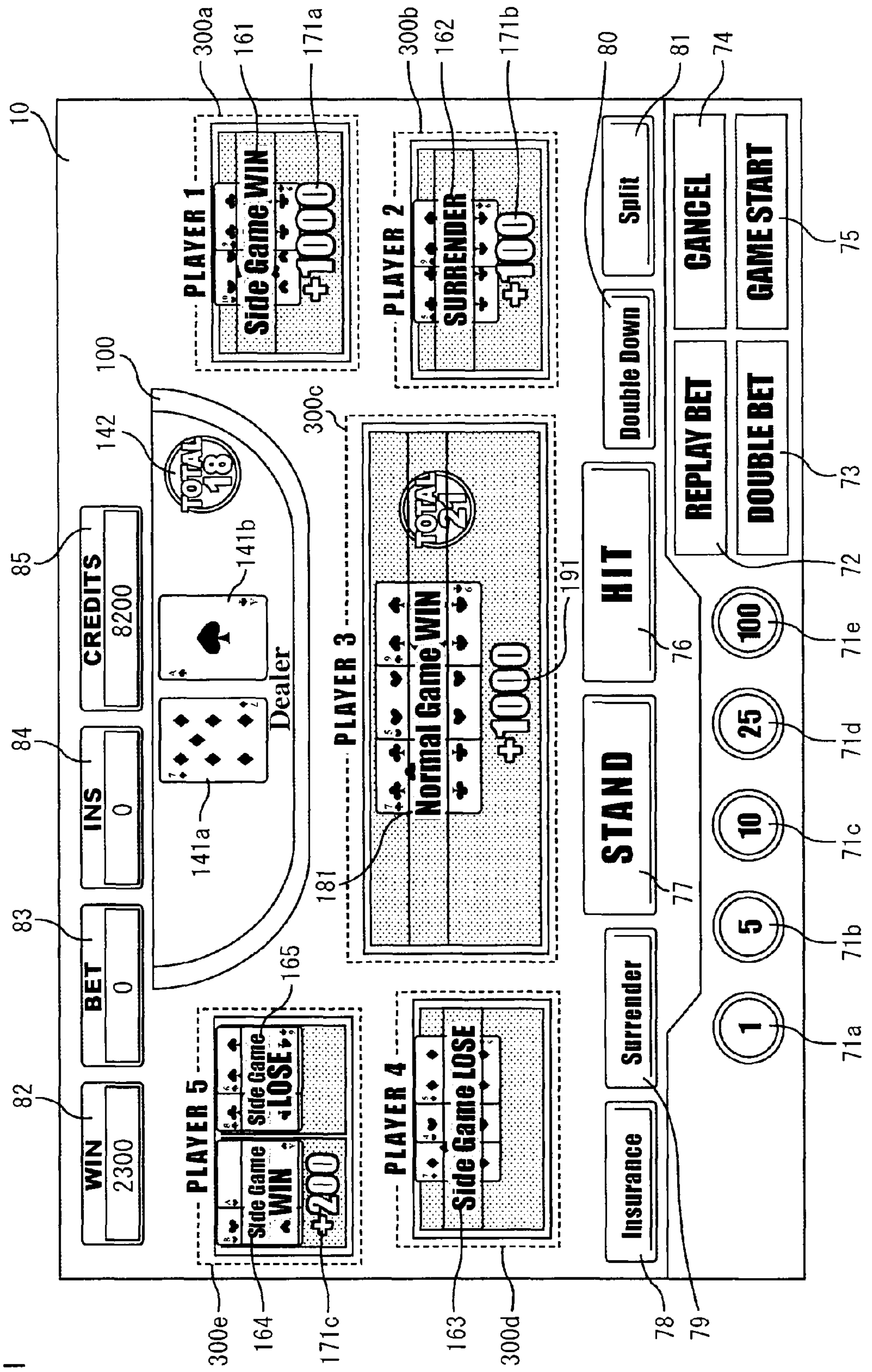
FIG. 11 is a flowchart illustrating a subroutine of selection-input acceptance processing executed in each player terminal.

FIG. 11 is a flowchart illustrating a subroutine of the selection-input acceptance processing executed in each player terminal.

First, the CPU 51 determines whether or not an all-cards determination flag is set in the RAM 52 (step S301). The all-cards determination flag is a flag that is set when the CPU 51 receives an all-cards determination signal from the main control portion 31 (see step S408 of FIG. 17). The all-cards determination signal is a signal showing that the player cards have been determined in all the player terminals 4 at which the normal bet has been placed.

When determining that the all-cards determination flag is set, the CPU 51 ends the present subroutine.

On the other hand, when determining that all-cards determination flag is not set, the CPU 51 executes reception processing of signal inquiring the number-of-credits for SPLIT (step S302). The reception processing of signal inquiring the number-of-credits for SPLIT will be described later with reference to FIG. 20.

Next, the CPU 51 executes the reception processing of signal inquiring the number-of-credits for Double Down (step S303). The reception processing of signal inquiring the number-of-credits for Double Down will be described later with reference to FIG. 22.

The CPU 51 executes reception processing of signal inquiring the number-of-credits for INSURANCE (step S304). The reception processing of signal inquiring the number-of-credits for INSURANCE will be described later with reference to FIG. 24.

Next, the CPU 51 executes reception processing of signal inquiring the number-of-credits for SURRENDER (step S305). The reception processing of signal inquiring the number-of-credits for SURRENDER will be described later with reference to FIG. 26.

Next, the CPU 51 determines whether or not it has received player additional card information for the player terminal 4 as a side bet target (see step S903 of FIG. 27) (step S306).

When the CPU 51 determines that it has received player additional card information for the player terminal 4 as a side bet target, the CPU 51 displays a player additional card for the player terminal 4 as a side bet target, on the game information display area 300 corresponding to the player terminal 4 (step S307).

When the CPU 51 determines in step S306 that it has not received player additional card information for the player terminal 4 as a side bet target, or after executing the processing of step S307, the CPU 51 determines whether or not a card determination flag is set in the RAM 52 (step S308).

Figure 14:
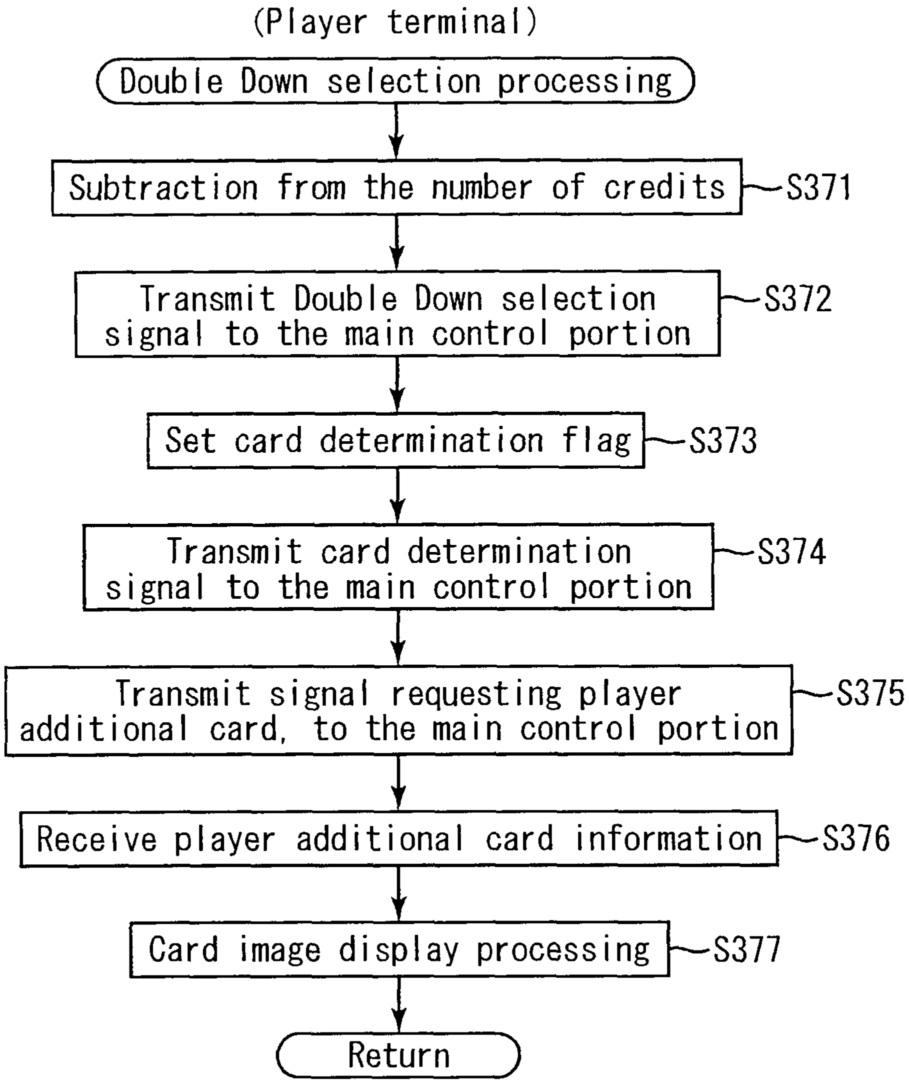
FIG. 14 is a flowchart illustrating a subroutine of Double Down selection processing executed in each player terminal according to the first embodiment.
Figure 16:
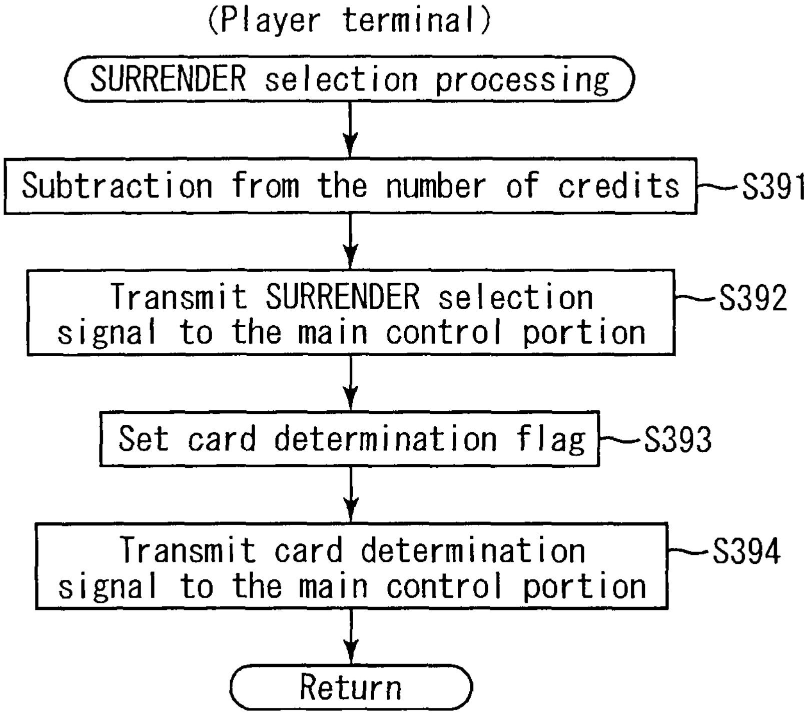
FIG. 16 is a flowchart illustrating a subroutine of SURRENDER selection processing executed in each player terminal according to the first embodiment.

The card determination flag is a flag that is set when the STAND button 77, the SURRENDER button 79, or the Double Down button 80 is turned on (see step S314 of FIG. 11, step S373 of FIG. 14, and step S393 of FIG. 16). The card determination flag is cleared when the game concerned is completed (after the processing of step S111 of FIG. 8 has been executed).

When determining that the card determination flag is set, the CPU 51 returns the processing to step S301.

On the other hand, when determining that the card determination flag is not set, the CPU 51 determines whether or not the HIT button has been turned on (step S309). In this processing, the CPU 51 determines whether or not it has received a signal to be transmitted from the touch panel 11 when the position on the touch panel 11 corresponding to the HIT button image 76 is touched.

When determining that the HIT button is turned on, the CPU 51 transmits a player additional card request signal to the main control portion 31 (step S310). Upon the reception of the player additional card request signal, the main control portion 31 determines a player additional card (see FIG. 27).

Next, the CPU 51 receives player additional card information from the main control portion 31 (step S311). The player additional card information indicates the player additional card.

Then, the CPU 51 executes card image display processing (step S312). In this processing, the CPU 51 displays the player additional card indicated by the received player additional card information in the game information display area 300 corresponding to the player terminal 4 having this CPU 51.

After the processing of step S312, the CPU 51 shifts the processing to step S301.

When determining in step S309 that the HIT button is not turned on, the CPU 51 determines whether or not the STAND button is turned on (step S313). In this processing, the CPU 51 determines whether or not it has received a signal to be transmitted from the touch panel 11 when the position on the touch panel 11 corresponding to the STAND button image 77 has been touched.

When determining the STAND button is turned on, the CPU 51 sets the card determination flag in the RAM 52 (step S314).

The CPU 51 then transmits the card determination signal to the main control portion 31 (step S315).

Thereafter, the CPU 51 shifts the processing to step S301.

When determining in step S313 that the STAND button is not turned on, the CPU 51 executes special button selection processing (step S316). The special button selection processing will be described later with reference to FIG. 12.

The CPU 51 then determines whether or not a predetermined time has passed after the card image display processing (see step S106 of FIG. 7) is executed (step S317).

When determining that the predetermined time has passed, the CPU 51 sets the card determination flag in the RAM 52 (step S318).

The CPU 51 transmits the card determination signal to the main control portion 31 (step S319).

When determining in step S317 that the predetermined time has not passed yet or after the processing of step S319, the CPU 51 shifts the processing to step S301.

As above, the selection-input acceptance processing (see step S107 of FIG. 8) has been described with reference to FIG. 11.

Subsequently, the special button selection processing (see step S316 of FIG. 11) is described with reference to FIG. 12.

Figure 12:
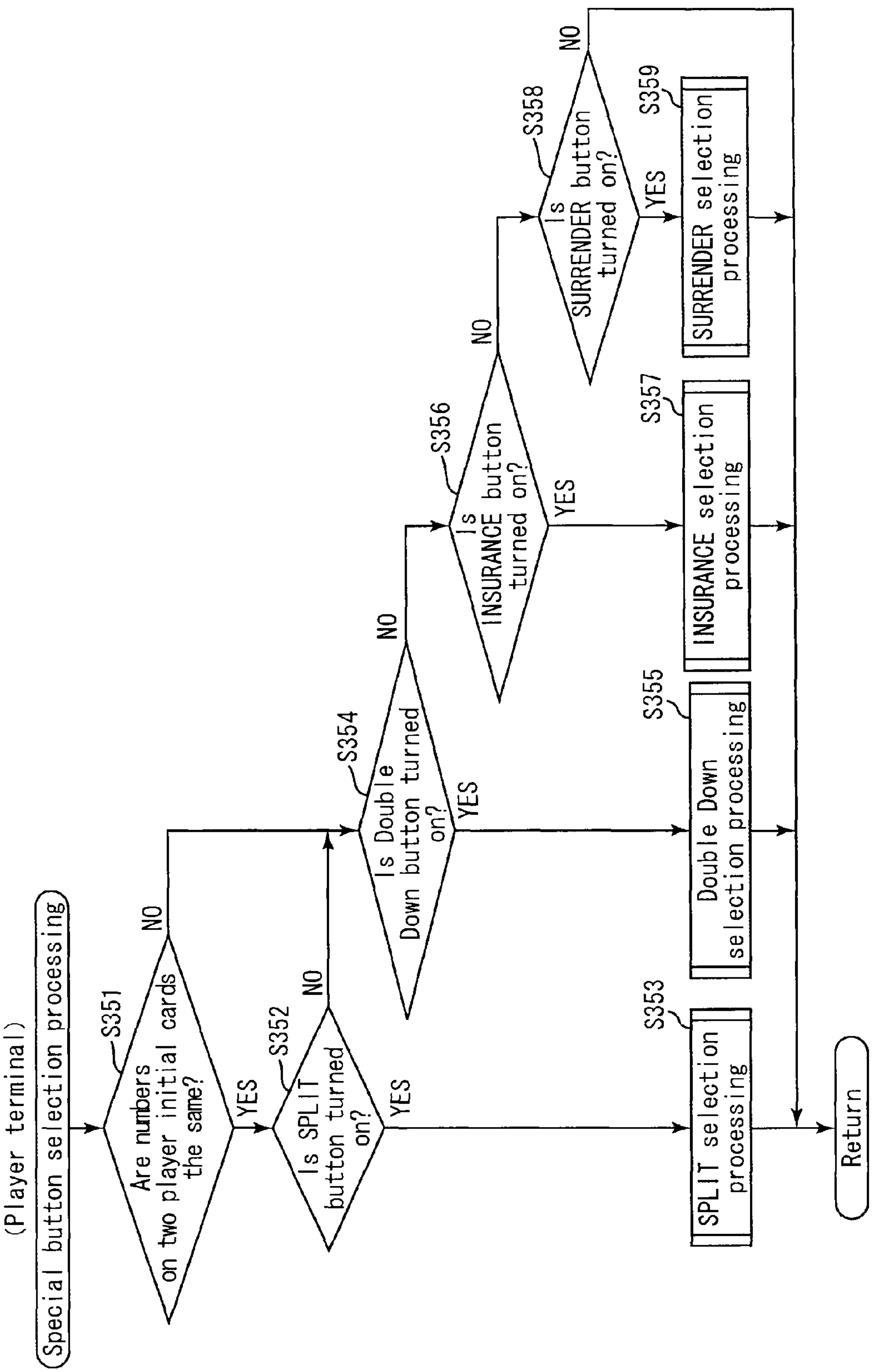
FIG. 12 is a flowchart illustrating a subroutine of special button selection processing executed in each player terminal.

FIG. 12 is a flowchart illustrating a subroutine of the special button selection processing executed in each player terminal.

Figure 7:
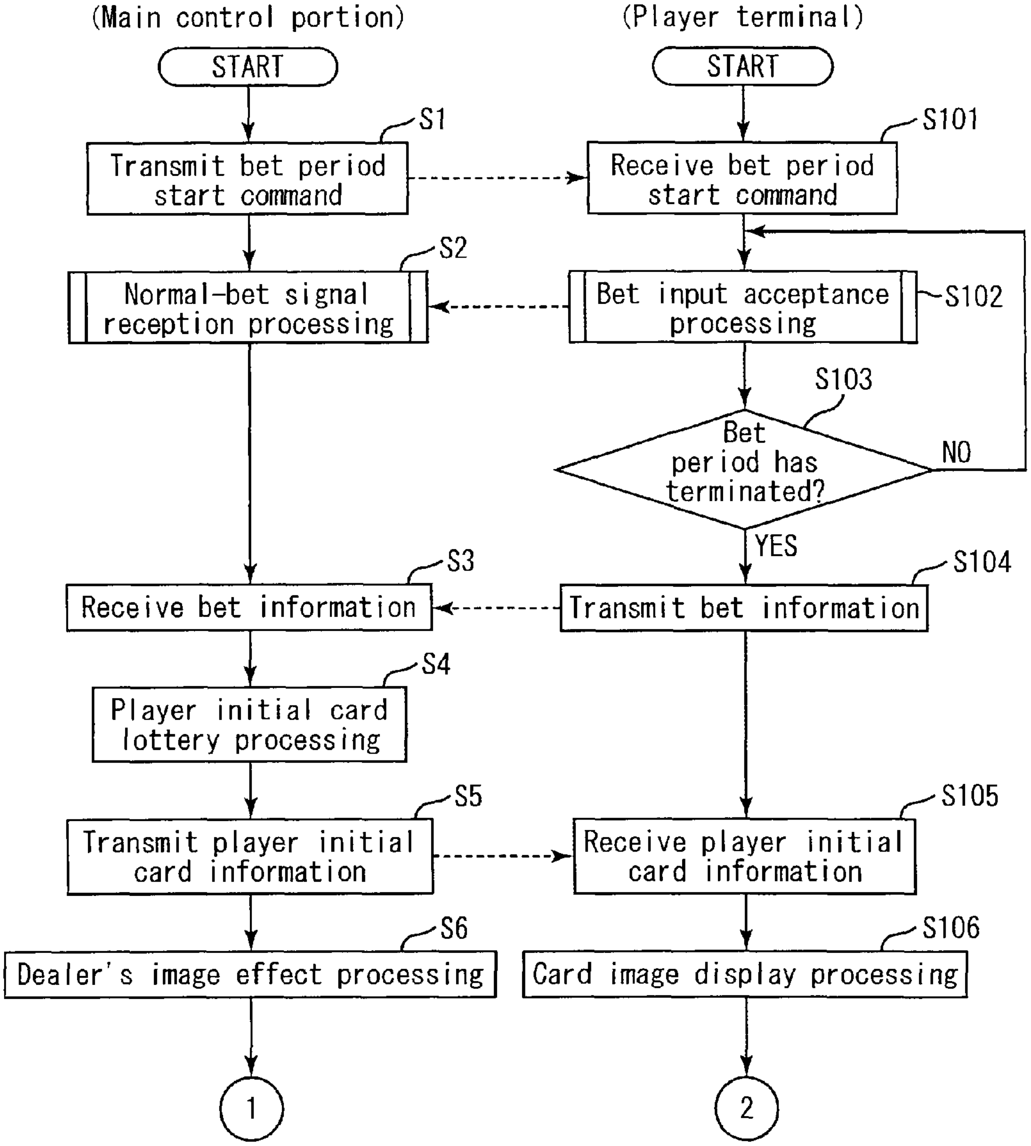
FIG. 7 is a flowchart of a game processing program of the gaming machine.
Figure 8:
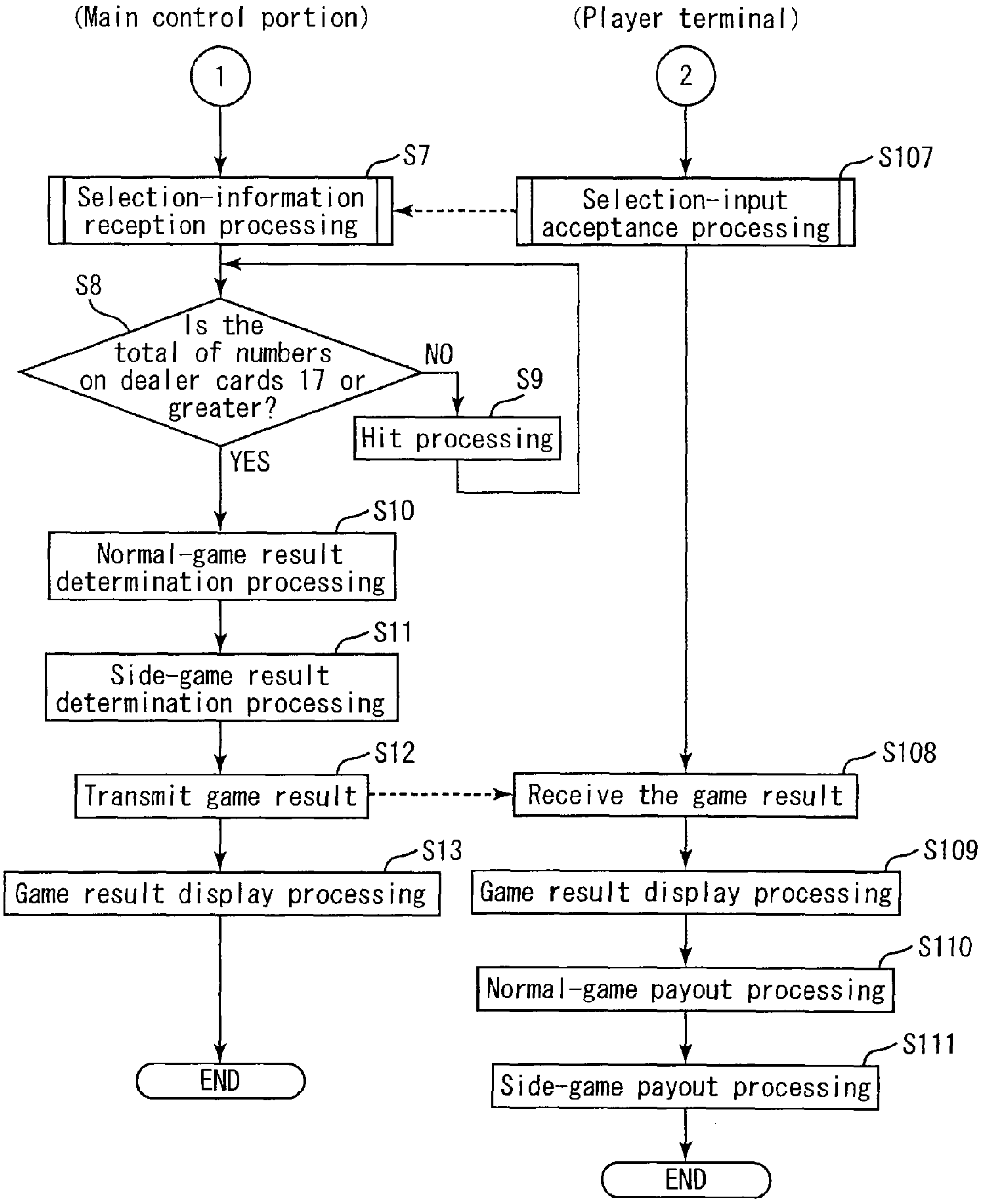
FIG. 8 is another flowchart of the game processing program of the gaming machine.

First, the CPU 51 determines whether or not the numbers on the two respective player initial cards are the same, based on the player initial card information received in step S105 of FIG. 7 (step S351).

When determining that the numbers on the two respective player initial cards are the same, the CPU 51 determines whether or not the SPLIT button is turned on (step S352).

In this processing, the CPU 51 determines whether or not it has received a signal to be transmitted from the touch panel 11 when a player touches the position on the touch panel 11 corresponding to the SPLIT button image 81.

When determining that the SPLIT button is turned on, the CPU 51 executes SPLIT selection processing (step S353). The SPLIT selection processing will be described later in detail with reference to FIG. 13.

After executing the processing of step S353, the CPU 51 ends the present subroutine.

When determining in step S351 that the numbers on the two respective player initial cards are not the same, or when determining in step S352 that the SPLIT button is not turned on, the CPU 51 determines whether or not the Double Down button is turned on (step S354). In this processing, the CPU 51 determines whether or not it has received a signal to be transmitted from the touch panel 11 when a player touches the position on the touch panel 11 corresponding to the Double Down button image 80.

When determining that the Double Down button is turned on, the CPU 51 executes Double Down selection processing (step S355). The Double Down selection processing will be described later in detail with reference to FIG. 14.

After executing the processing of step S355, the CPU 51 ends the present subroutine.

When determining in step S354 that the Double Down button is not turned on, the CPU 51 determines whether or not the INSURANCE button is turned on (step S356). In this processing, the CPU 51 determines whether or not it has received a signal to be transmitted from the touch panel 11 when a player touches the position on the touch panel 11 corresponding to the INSURANCE button image 78.

When determining that the INSURANCE button is turned on, the CPU 51 executes INSURANCE selection processing (step S357). The INSURANCE selection processing will be described later in detail with reference to FIG. 15.

After executing the processing of step S357, the CPU 51 ends the present subroutine.

When determining in step S356 that the INSURANCE button is not turned on, the CPU 51 determines whether or not the SURRENDER button is turned on (step S358). In this processing, the CPU 51 determines whether or not it has received a signal to be transmitted from the touch panel 11 when a player touches the position on the touch panel 11 corresponding to the SURRENDER button image 79.

When determining that the SURRENDER button is turned on, the CPU 51 executes SURRENDER selection processing (step S359). The SURRENDER selection processing will be described later in detail with reference to FIG. 16.

When the CPU 51 determines in step S358 that the SURRENDER button is not turned on, or after executing the processing of step S359, the CPU 51 ends the present subroutine.

The SPLIT selection processing (see step S353 of FIG. 12) is described with reference to FIG. 13.

Figure 13:
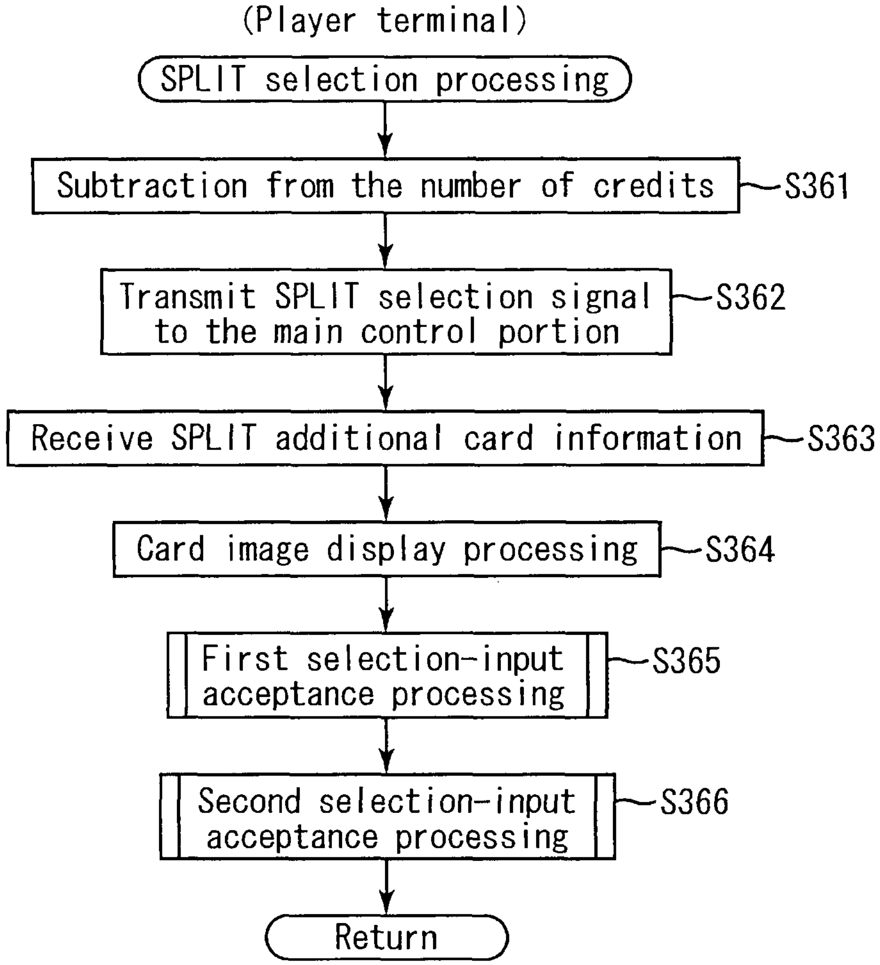
FIG. 13 is a flowchart illustrating a subroutine of SPLIT selection processing executed in each player terminal according to a first embodiment.

FIG. 13 is a flowchart illustrating a subroutine of the SPLIT selection processing executed in each player terminal.

First, the CPU 51 subtracts the number of credits corresponding to the normal bet amount stored in the RAM 52, from the number of credits stored in the RAM 52 (step S361).

Next, the CPU 51 transmits a SPLIT selection signal to the main control portion 31 (step S362). Upon reception of the SPLIT selection signal, the main control portion 31 determines a SPLIT additional card (see FIG. 19).

Next, the CPU 51 receives SPLIT additional card information showing the SPLIT additional card from the main control portion 31 (step S363). The SPLIT additional card is a card to be paired with each of the split player initial cards. The respective split player cards are also referred to as a first player card and a second player card.

Next, the CPU 51 executes card image display processing (step S364). In this processing, the CPU 51 displays the SPLIT additional card shown by the received SPLIT additional card information in the game information display area 300 corresponding to the player terminal 4 provided with this CPU 51.

The CPU 51 executes first selection-input acceptance processing for the first player card (step S365). Since the first selection-input acceptance processing is the same as the selection-input acceptance processing shown in FIG. 11, the descriptions thereof are omitted here.

The CPU 51 executes second selection-input acceptance processing for the second player card (step S366). Since the second selection-input acceptance processing is the same as the selection-input acceptance processing shown in FIG. 11, the descriptions thereof are omitted here.

Thereafter, the CPU 51 ends the present subroutine.

The Double Down selection processing (see step S355 of FIG. 12) is described with reference to FIG. 14.

FIG. 14 is a flowchart illustrating a subroutine of the Double Down selection processing executed in each player terminal.

First, the CPU 51 subtracts the number of credits corresponding to the normal bet amount stored in the RAM 52, from the number of credits stored in the RAM 52 (step S371).

Next, the CPU 51 transmits a Double Down selection signal to the main control portion 31 (step S372).

Next, the CPU 51 sets a card determination flag in the RAM 52 (step S373).

Next, the CPU 51 transmits a card determination signal to the main control portion 31 (step S374).

The CPU 51 then executes the processing of step S375 to step S377. The processing is the same as the processing of step S310 to step S312 of FIG. 11, and thus the descriptions thereof are omitted here.

After executing the processing of step S377, the CPU 51 ends the present subroutine.

The INSURANCE selection processing (see step S357 of FIG. 12) is described with reference to FIG. 15.

Figure 15:
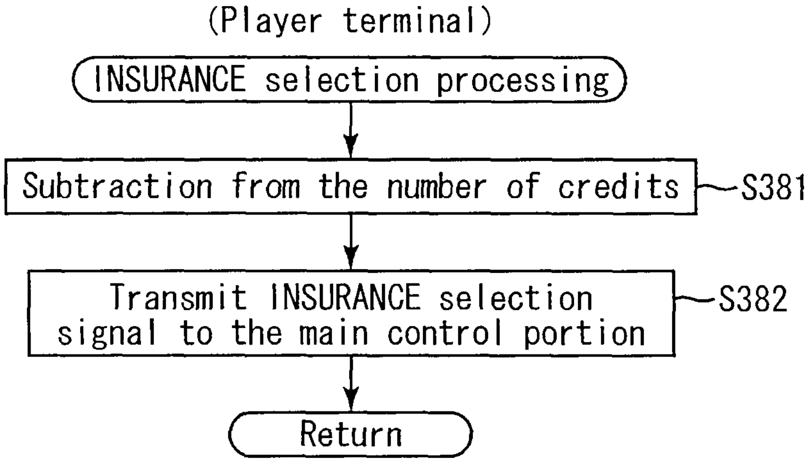
FIG. 15 is a flowchart illustrating a subroutine of INSURANCE selection processing executed in each player terminal according to the first embodiment.

FIG. 15 is a flowchart illustrating a subroutine of the INSURANCE selection processing executed in each player terminal.

First, the CPU 51 subtracts the number of credits half the normal bet amount stored in the RAM 52, from the number of credits stored in the RAM 52 (step S381).

Next, the CPU 51 transmits an INSURANCE selection signal to the main control portion 31 (step S382).

Thereafter, the CPU 51 ends the present subroutine.

The SURRENDER selection processing (see step S359 of FIG. 12) is described with reference to FIG. 16.

FIG. 16 is a flowchart illustrating a subroutine of the SURRENDER selection processing executed in each player terminal.

First, the CPU 51 subtracts the number of credits half the normal bet amount stored in the RAM 52, from the number of credits stored in the RAM 52 (step S391).

Next, the CPU 51 transmits a SURRENDER selection signal to the main control portion 31 (step S392).

The CPU 51 sets a card determination flag in the RAM 52 (step S393).

Next, the CPU 51 transmits a card determination signal to the main control portion 31 (step S394).

The CPU 51 then ends the present subroutine.

In the above, the selection-input acceptance processing (see step S107 of FIG. 8) has been described with reference to FIGS. 11 to 16.

The selection-information reception processing (see step S7 of FIG. 8) is described with reference to FIGS. 17 to 27.

Figure 17:
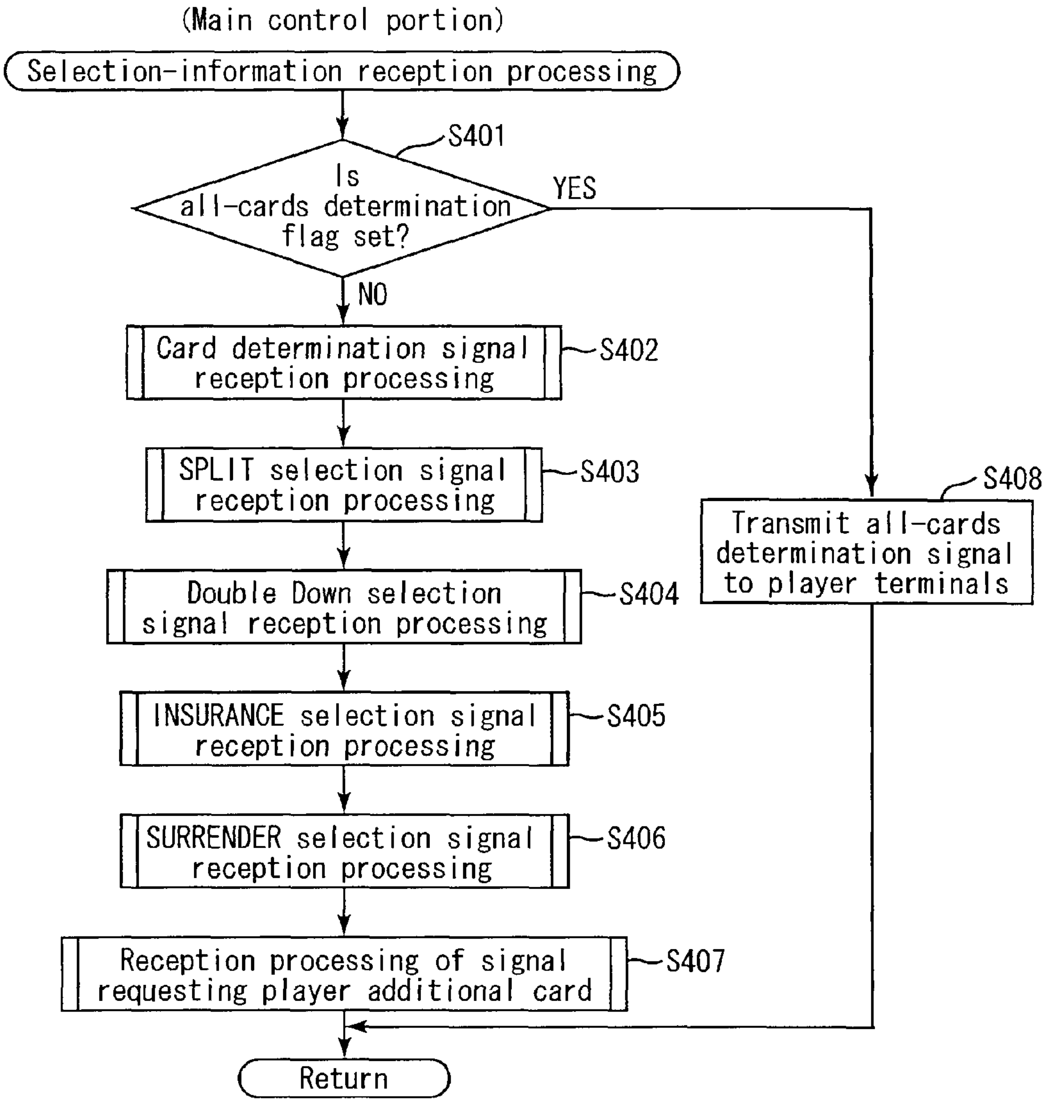
FIG. 17 is a flowchart illustrating a subroutine of selection-information reception processing executed in the main control portion.

FIG. 17 is a flowchart illustrating a subroutine of the selection-information reception processing executed in the main control portion.

First, the CPU 41 determines whether or not the all-cards determination flag is set in the RAM 42 (step S401).

Figure 18:
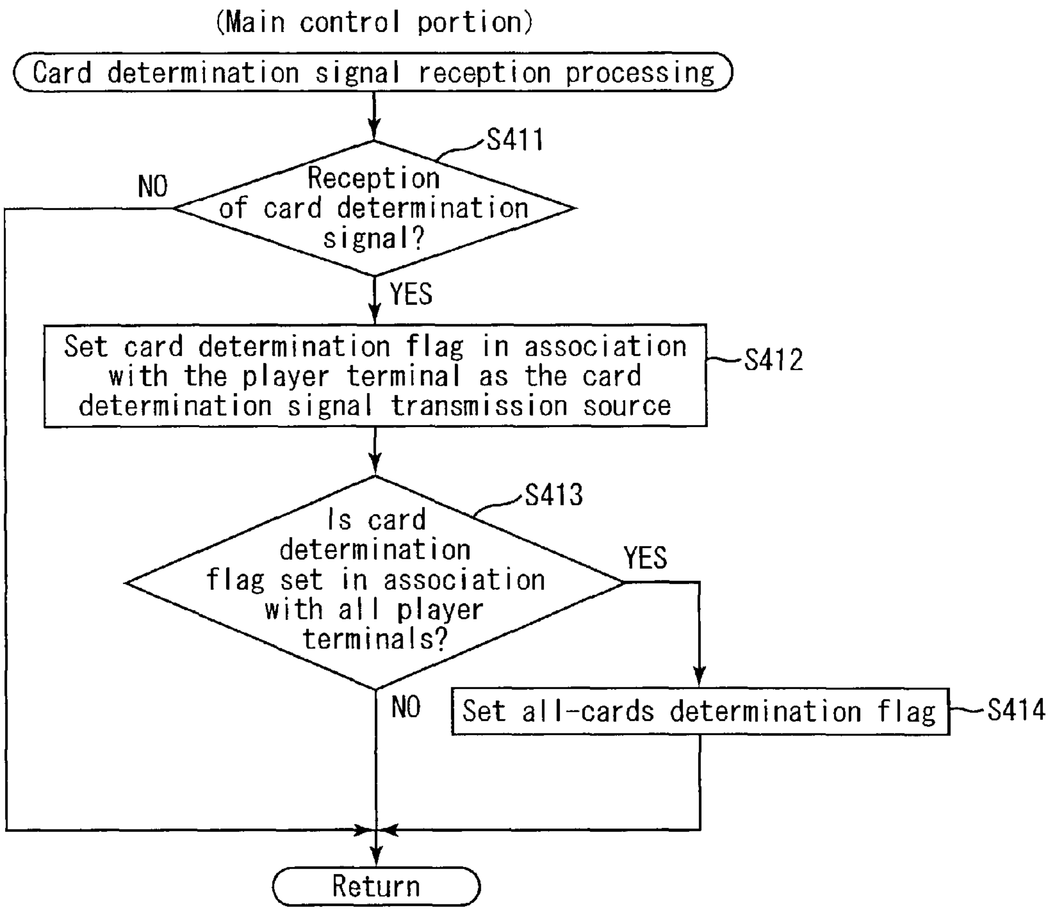
FIG. 18 is a flowchart illustrating a subroutine of card determination signal reception processing executed in the main control portion.

The all-cards determination flag is a flag that is set when the player cards are determined for all the player terminals 4 at which a normal bet has been placed (see step S414 of FIG. 18).

When determining that the all-cards determination flag is set, the CPU 41 transmits an all-cards determination signal to each player terminal 4 (step S408). The CPU 41 then ends the present subroutine.

When determining that the all-cards determination flag is not set, the CPU 41 executes card determination signal reception processing (step S402). The card determination signal reception processing will be described later in detail with reference to FIG. 18.

Next, the CPU 41 executes SPLIT selection signal reception processing (step S403). The SPLIT selection signal reception processing will be described later in detail with reference to FIG. 19.

The CPU 41 then executes the Double Down selection signal reception processing (step S404). The Double Down selection reception processing will be described later in detail with reference to FIG. 21.

The CPU 41 executes INSURANCE selection signal reception processing (step S405). The INSURANCE selection signal reception processing will be described later in detail with reference to FIG. 23.

The CPU 41 executes SURRENDER selection signal reception processing (step S406). The SURRENDER selection signal reception processing will be described later in detail with reference to FIG. 25.

Next, the CPU 41 executes reception processing of a signal requesting a player additional card (step S407). The reception processing of a signal requesting a player additional card will be described later in detail with reference to FIG. 27.

The CPU 41 then ends the present subroutine.

The card determination signal reception processing (step S402 of FIG. 17) is described with reference to FIG. 18.

FIG. 18 is a flowchart illustrating a subroutine of the card determination signal reception processing executed in the main control portion.

First, the CPU 41 determines whether or not it has received the card determination signal (step S315 and step S319 of FIG. 11, step S374 of FIG. 14, and step S394 of FIG. 16) (step S411).

When the CPU 41 determines that it has not received the card determination signal, the CPU 41 ends the present subroutine.

On the other hand, when the CPU 41 determines that it has received a card determination signal, the CPU 41 sets a card determination flag in association with the player terminal 4 as transmission source of the card determination signal (step S412).

Next, the CPU 41 determines whether or not the card determination flag is set in association with all the player terminals 4 at which a normal bet has been placed (step S413).

When determining that the card determination flag is set in association with all the player terminals 4 at which a normal bet has been placed, the CPU 41 sets an all-cards determination flag in the RAM 42 (step S414).

When determining in step S413 that the card determination flag is not set in any of the player terminals 4 at which a normal bet has been placed, or after executing the processing of step S414, the CPU 41 ends the present subroutine.

The SPLIT selection signal reception processing (see step S403 of FIG. 17) is described with reference to FIG. 19.

Figure 19:
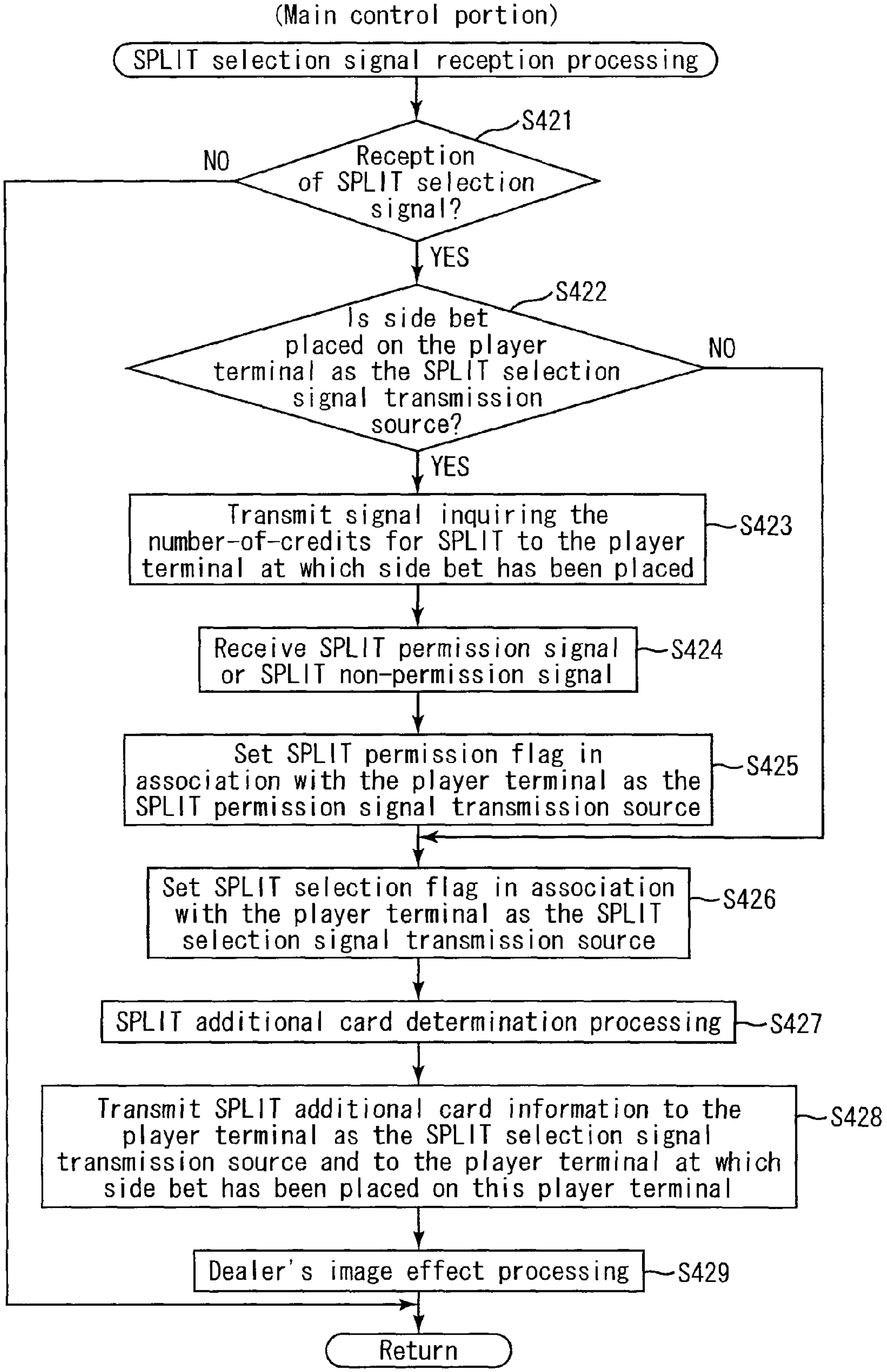
FIG. 19 is a flowchart illustrating a subroutine of SPLIT selection signal reception processing executed in a main control portion according to the first embodiment.

FIG. 19 is a flowchart illustrating a subroutine of the SPLIT selection signal reception processing executed in the main control portion.

First, the CPU 41 determines whether or not it has received the SPLIT selection signal (see step S362 of FIG. 13) from any of the player terminals 4 (step S421).

When the CPU 41 determines that it has not received the SPLIT selection signal, the CPU 41 ends the present subroutine.

On the other hand, when the CPU 41 determines that it has received the SPLIT selection signal, the CPU 41 determines whether or not the player terminal 4 as the transmission source of the SPLIT selection signal is the side bet target, based on the bet information received in step S3 of FIG. 7 (step S422).

When determining that the player terminal 4 as the transmission source of the SPLIT selection signal is the side bet target, the CPU 41 transmits a signal inquiring the number-of-credits for SPLIT to the player terminal 4 at which the side bet has been placed on the player terminal 4 as the transmission source of the SPLIT selection signal (step S423). The signal inquiring the number-of-credits for SPLIT includes identification information showing the player terminal 4 as the transmission source of the SPLIT selection signal.

Here, the reception processing of a signal inquiring the number-of-credits for SPLIT is described with reference to FIG. 20.

Figure 20:
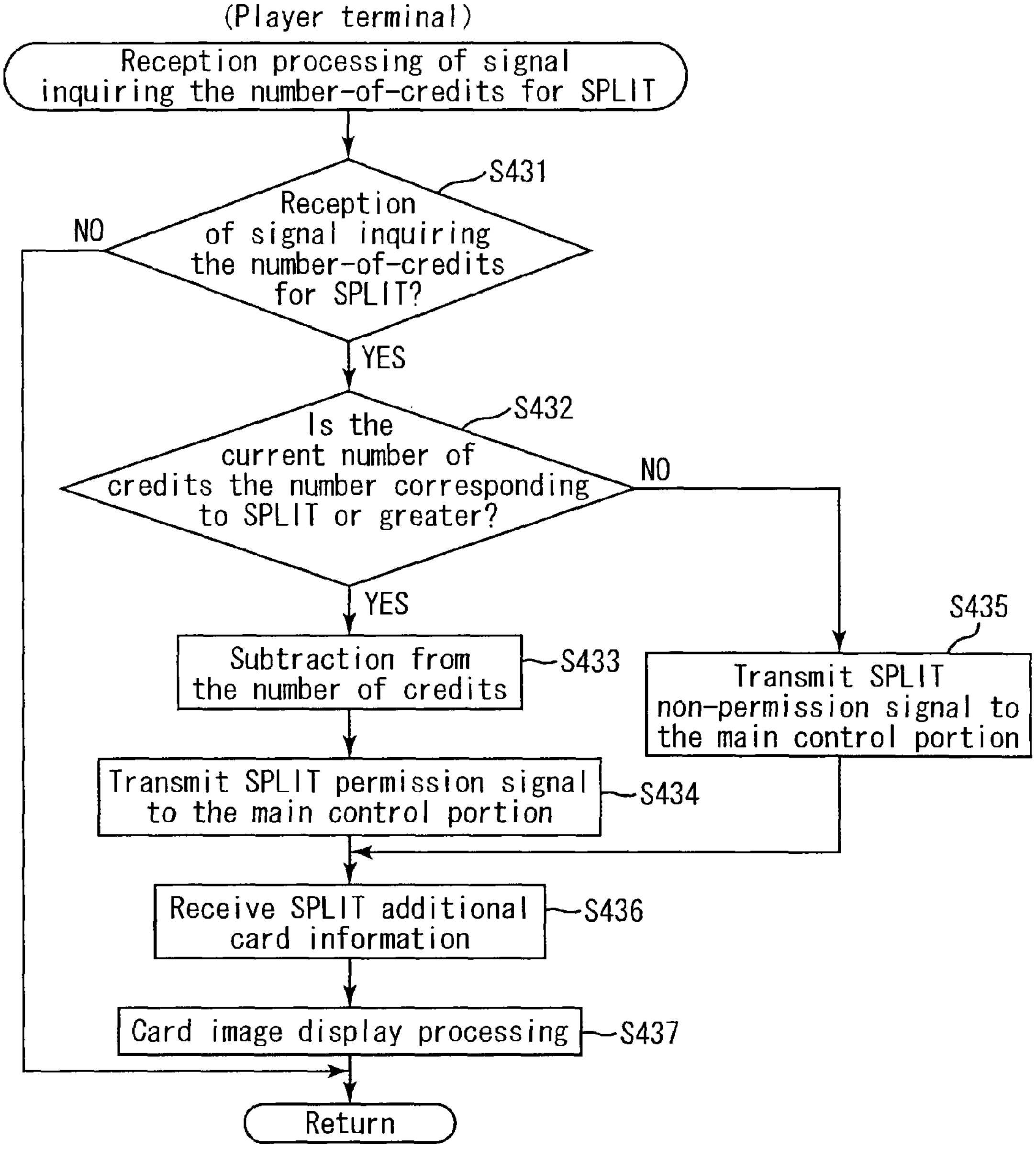
FIG. 20 is a flowchart illustrating a subroutine of reception processing of a signal inquiring the number of credits for SPLIT, executed in each player terminal according to the first embodiment.

FIG. 20 is a flowchart illustrating a subroutine of the reception processing of a signal inquiring the number-of-credits for SPLIT.

First, the CPU 51 determines whether or not it has received the signal inquiring the number-of-credits for SPLIT (step S431).

When the CPU 51 determines that it has not received the signal inquiring the number-of-credits for SPLIT, the CPU 51 ends the present subroutine.

When the CPU 51 determines that it has received the signal inquiring the number-of-credits for SPLIT, the CPU 51 determines whether or not the number of credits stored in the RAM 52 is equal to or more than the number of credits corresponding to the side bet amount on the player terminal 4 shown by the identification information carried by the signal inquiring the number-of-credits for SPLIT (step S432).

When determining that the number of credits is equal to or more than the number of credits corresponding to the side bet amount on the player terminal 4, the CPU 51 subtracts the number of credits corresponding to the side bet amount on this player terminal 4 from the number of credits stored in the RAM 52 (step S433).

The CPU 51 then transmits a SPLIT permission signal to the main control portion 31 (step S434).

On the other hand, when determining that the number of credits is less than the number of credits corresponding to the side bet amount on the player terminal 4, the CPU 51 transmits a SPLIT non-permission signal to the main control portion 31 (step S435).

After executing the processing of step S434 or step S435, the CPU 51 receives the SPLIT additional card information (see step S428 of FIG. 19) (step S436).

The CPU 51 displays the SPLIT additional card in the game information display area 300 corresponding to the player terminal 4 that is shown by the identification information carried by the signal inquiring the number-of-credits for SPLIT (step S437).

The CPU 51 then ends the present subroutine.

In the above, the reception processing of a signal inquiring the number-of-credits for SPLIT has been described with reference to FIG. 20.

Now, refer back to FIG. 19.

After transmitting in step S423 the signal inquiring the number-of-credits for SPLIT to the player terminal 4, the CPU 41 receives a SPLIT permission signal or a SPLIT non-permission signal from the player terminal 4 (step S424).

Next, the CPU 41 sets the SPLIT permission flag in association with the player terminal 4 as the transmission source of the SPLIT permission signal (step S425).

When determining in step S422 that the player terminal 4 as the transmission source of the SPLIT selection signal is not the side bet target, or after executing the processing of step S425, the CPU 41 sets the SPLIT selection flag in association with the player terminal 4 as the transmission source of the SPLIT selection signal (step S426).

Next, the CPU 41 determines the SPLIT additional card, based on the distribution order determined in step S4 of FIG. 7 (step S427).

The CPU 41 transmits the SPLIT additional card information to the player terminal 4 as the transmission source of the SPLIT selection signal and to the player terminal 4 at which the side bet has been placed on this player terminal 4 as the transmission source of the SPLIT selection signal (step S428). The SPLIT additional card information is information showing the SPLIT additional card.

Thereafter, the CPU 41 executes dealer's image effect processing (see step S6 of FIG. 7), and ends the present subroutine.

The Double Down selection signal reception processing (step S404 of FIG. 17) is described with reference to FIG. 21.

Figure 21:
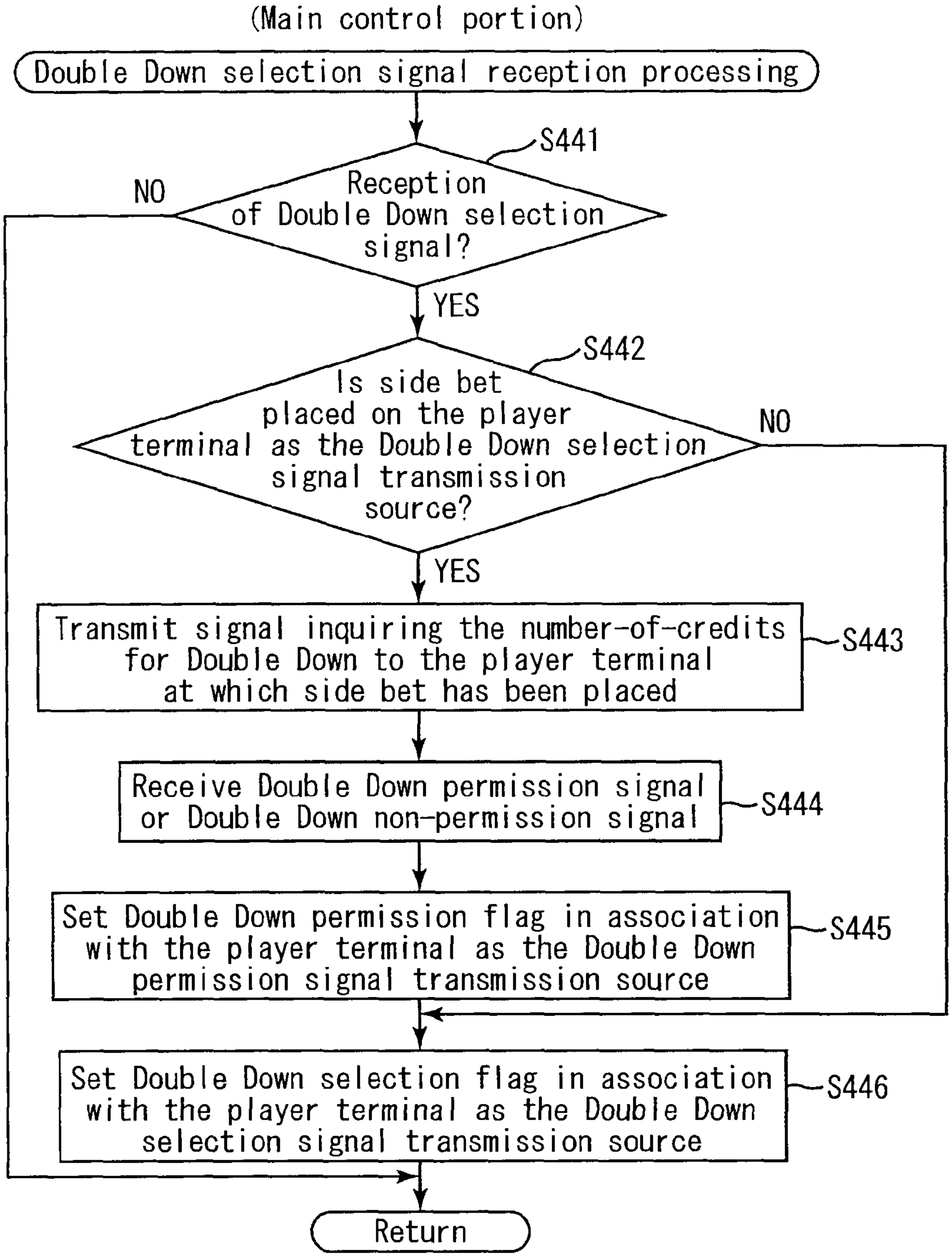
FIG. 21 is a flowchart illustrating a subroutine of Double Down selection signal reception processing executed in the main control portion according to the first embodiment.

FIG. 21 is a flowchart illustrating a subroutine of the Double Down selection signal reception processing executed in the main control portion.

First, the CPU 41 determines whether or not it has received the Double Down selection signal (see step S372 of FIG. 14) from any of the player terminals 4 (step S441).

When the CPU 41 determines that it has not received the Double Down selection signal, the CPU 41 ends the present subroutine.

On the other hand, when the CPU 41 determines that it has received the Double Down selection signal, the CPU 41 determines whether or not the player terminal 4 as the transmission source of the Double Down selection signal is the side bet target, based on the bet information received in step S3 of FIG. 7 (step S442).

When determining that the player terminal 4 as the Double Down selection signal transmission source is the side bet target, the CPU 41 transmits a signal inquiring the number-of-credits for Double Down to the player terminal 4 at which the side bet has been placed on the player terminal 4 as the transmission source of the Double Down selection signal (step S443). The signal inquiring the number-of-credits for Double Down includes identification information showing the player terminal 4 as the transmission source of the Double Down selection signal.

Here, the reception processing of a signal inquiring the number-of-credits for Double Down is described with reference to FIG. 22.

Figure 22:
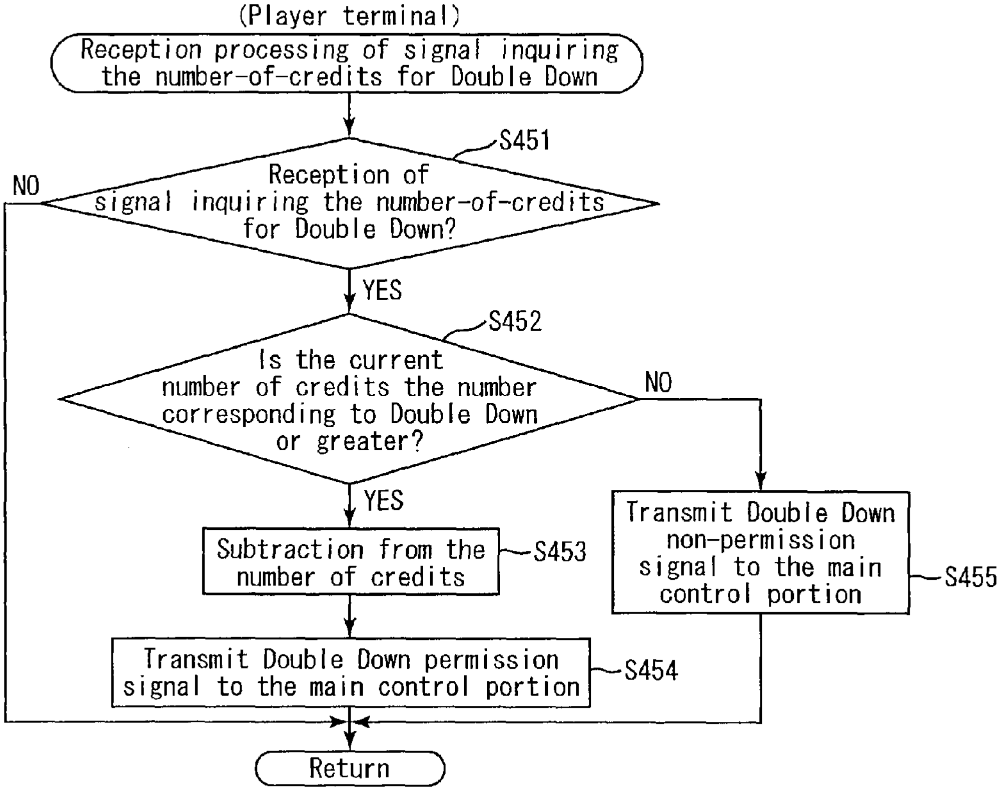
FIG. 22 is a flowchart illustrating a subroutine of reception processing of a signal inquiring the number of credits for Double Down, executed in each player terminal according to the first embodiment.

FIG. 22 is a flowchart illustrating a subroutine of the reception processing of a signal inquiring the number-of-credits for Double Down.

First, the CPU 51 determines whether or not it has received the signal inquiring the number-of-credits for Double Down (step S451).

When the CPU 51 determines that it has not received the signal inquiring the number-of-credits for Double Down, the CPU 51 ends the present subroutine.

When the CPU 51 determines that it has received the signal inquiring the number-of-credits for Double Down, the CPU 51 determines whether or not the number of credits stored in the RAM 52 is equal to or more than the number of credits corresponding to the side bet amount on the player terminal 4 that is shown by the identification information carried by the signal inquiring the number-of-credits for Double Down (step S452).

When determining that the number of credits is equal to or more than the number of credits corresponding to the side bet amount on the above player terminal 4, the CPU 51 subtracts the number of credits corresponding to the side bet amount on the above player terminal 4, from the number of credits stored in the RAM 52 (step S453).

The CPU 51 then transmits a Double Down permission signal to the main control portion 31 (step S454).

On the other hand, when determining that the number of credits is less than the number of credits corresponding to the side bet amount on the player terminal 4, the CPU 51 transmits a Double Down non-permission signal to the main control portion 31 (step S455).

After executing the processing of step S454 or step S455, the CPU 51 ends the present subroutine.

In the above, the reception processing of a signal inquiring the number-of-credits for Double Down has been described with reference to FIG. 22.

Now, refer back to FIG. 21.

After transmitting in step S443 the signal inquiring the number-of-credits for Double Down to the player terminal 4, the CPU 41 receives a Double Down permission signal or a Double Down non-permission signal from the player terminal 4 (step S444).

Next, the CPU 41 sets the Double Down permission flag in association with the player terminal 4 as the transmission source of the Double Down permission signal (step S445).

When determining in step S442 that the player terminal 4 as the transmission source of the Double Down selection signal is not the side bet target, or after executing the processing step S445, the CPU 41 sets the Double Down selection flag in association with the player terminal 4 as the transmission source of the Double Down selection signal (step S446).

The CPU 41 then ends the present subroutine.

The INSURANCE selection signal reception processing (step S405 of FIG. 17) is described with reference to FIG. 23.

Figure 23:
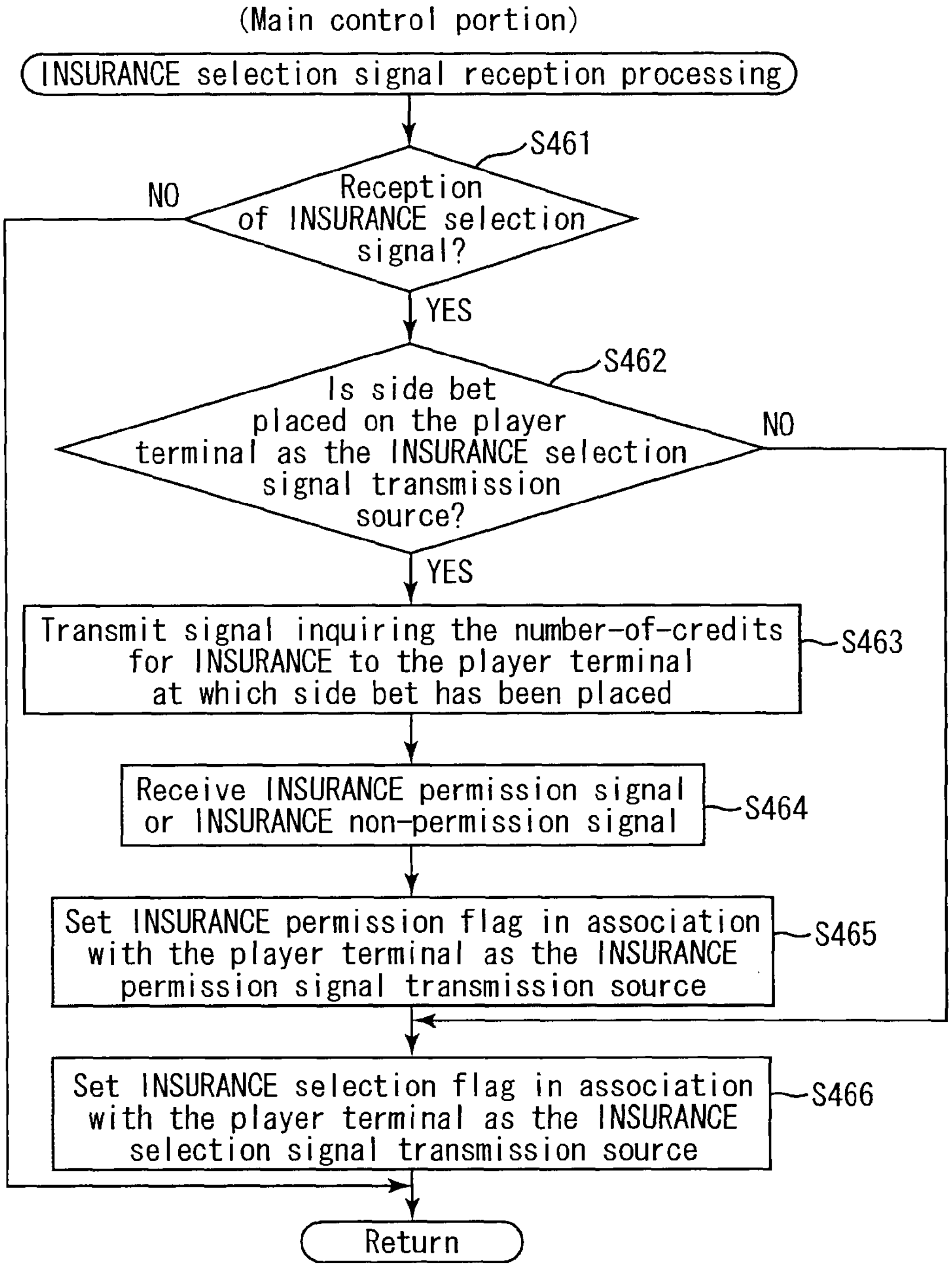
FIG. 23 is a flowchart illustrating a subroutine of INSURANCE selection signal reception processing executed in the main control portion according to the first embodiment.

FIG. 23 is a flowchart illustrating a subroutine of the INSURANCE selection signal reception processing executed in the main control portion.

First, the CPU 41 determines whether or not it has received the INSURANCE selection signal (see step S382 of FIG. 15) from any of the player terminals 4 (step S461).

When the CPU 41 determines that it has not received the INSURANCE selection signal, the CPU 41 ends the present subroutine.

On the other hand, when the CPU 41 determines that it has received the INSURANCE selection signal, the CPU 41 determines whether or not the player terminal 4 as the transmission source of the INSURANCE selection signal is the side bet target, based on the bet information received in step S3 of FIG. 7 (step S462).

When determining that the player terminal 4 as the transmission source of the INSURANCE selection signal is the side bet target, the CPU 41 transmits a signal inquiring the number-of-credits for INSURANCE to the player terminal 4 at which the side bet has been placed on the player terminal 4 as the transmission source of the INSURANCE selection signal (step S463). The signal inquiring the number-of-credits for INSURANCE includes identification information showing the player terminal 4 as the transmission source of the INSURANCE selection signal.

Here, the reception processing of a signal inquiring the number-of-credits for INSURANCE is described with reference to FIG. 24.

Figure 24:
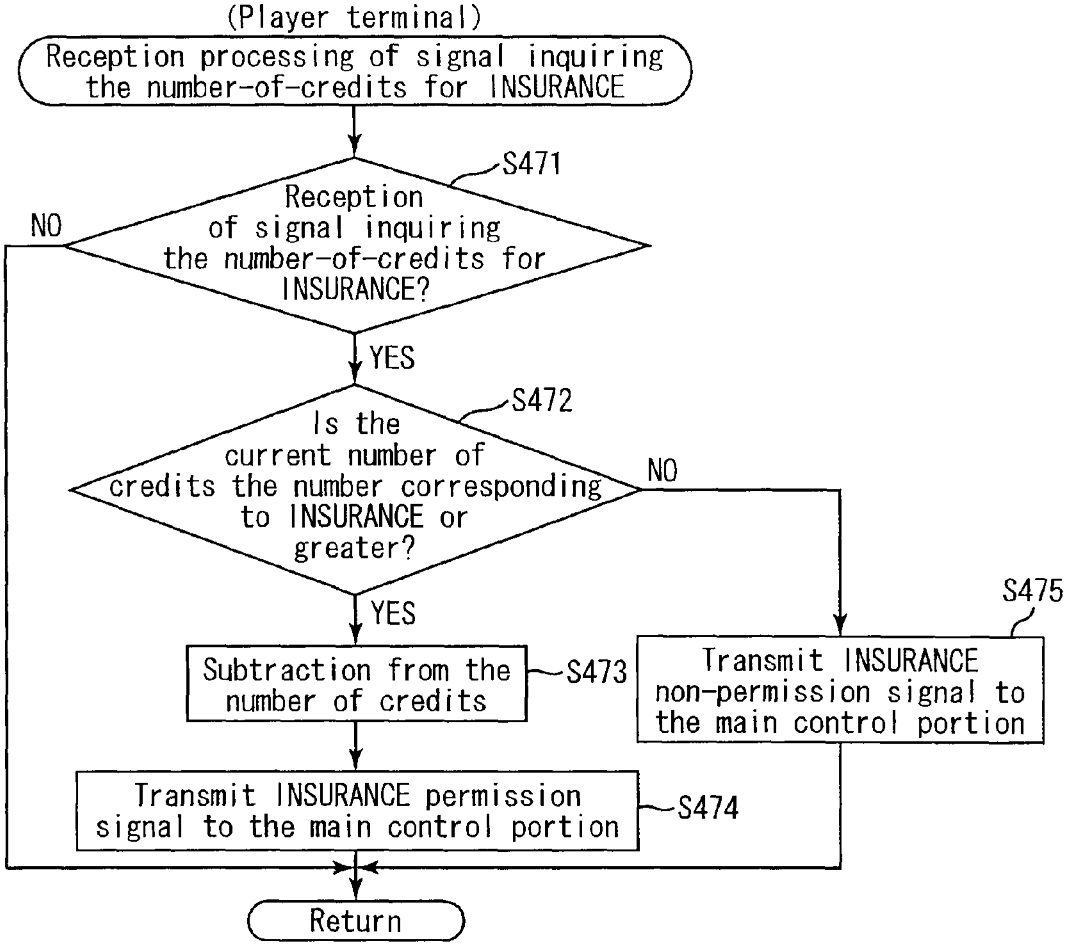
FIG. 24 is a flowchart illustrating a subroutine of reception processing for the number of credits for INSURANCE, executed in each player terminal according to the first embodiment.

FIG. 24 is a flowchart illustrating a subroutine of the reception processing of a signal inquiring the number-of-credits for INSURANCE.

First, the CPU 51 determines whether or not it has received the signal inquiring the number-of-credits for INSURANCE (step S471).

When the CPU 51 determines that it has not received the signal inquiring the number-of-credits for INSURANCE, the CPU 51 ends the present subroutine.

When the CPU 51 determines that it has received the signal inquiring the number-of-credits for INSURANCE, the CPU 51 determines whether or not the number of credits stored in the RAM 52 is equal to or more than the number of credits corresponding to the amount half the side bet amount on the player terminal 4 that is shown by the identification information carried by the signal inquiring the number-of-credits for INSURANCE (step S472).

When determining that the number of credits is equal to or more than the number of credits corresponding to the amount half the side bet amount on the above player terminal 4, the CPU 51 subtracts the number of credits corresponding to the amount half the side bet amount on the above player terminal 4, from the number of credits stored in the RAM 52 (step S473). The CPU 51 then transmits an INSURANCE permission signal to the main control portion 31 (step S474).

On the other hand, when determining that the number of credits is less than the number of credits corresponding to the amount half the side bet amount on the above player terminal 4, the CPU 51 transmits an INSURANCE non-permission signal to the main control portion 31 (step S475).

After executing the processing of step S474 or step S475, the CPU 51 ends the present subroutine.

In the above, the reception processing of a signal inquiring the number-of-credits for INSURANCE has been described with reference to FIG. 24.

Now, refer back to FIG. 23.

After transmitting in step S463 the signal inquiring the number-of-credits for INSURANCE to the player terminal 4, the CPU 41 receives an INSURANCE permission signal or an INSURANCE non-permission signal from the player terminal 4 (step S464).

Next, the CPU 41 sets the INSURANCE permission flag in association with the player terminal 4 as the transmission source of the INSURANCE permission signal (step S465).

When determining in step S462 that the player terminal 4 as the transmission source of the INSURANCE selection signal is not the side bet target, or after executing the processing of step S465, the CPU 41 sets the INSURANCE selection flag in association with the player terminal 4 as the transmission source of the SPLIT selection signal (step S466).

The CPU 41 then ends the present subroutine.

The SURRENDER selection signal reception processing (step S406 of FIG. 17) is described with reference to FIG. 25.

Figure 25:
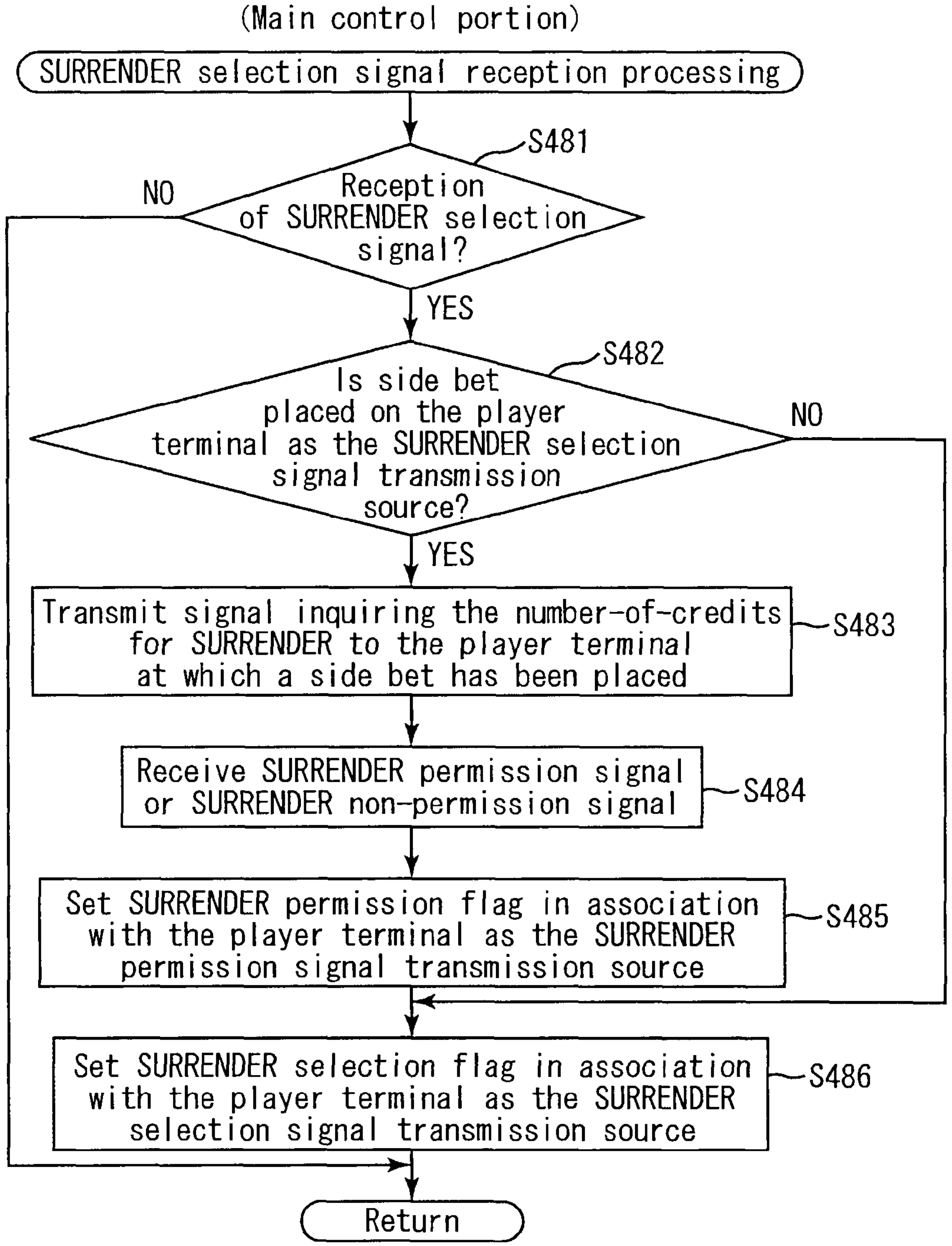
FIG. 25 is a flowchart illustrating a subroutine of SURRENDER selection signal reception processing executed in the main control portion according to the first embodiment.

FIG. 25 is a flowchart illustrating a subroutine of the SURRENDER selection signal reception processing executed in the main control portion.

First, the CPU 41 determines whether or not it has received the SURRENDER selection signal (see step S392 of FIG. 16) from any of the player terminals 4 (step S481).

When the CPU 41 determines that it has not received the SURRENDER selection signal, the CPU 41 ends the present subroutine.

On the other hand, when the CPU 41 determines that it has received the SURRENDER selection signal, the CPU 41 determines whether or not the player terminal 4 as the transmission source of the SURRENDER selection signal is the side bet target, based on the bet information received in step S3 of FIG. 7 (step S482).

When determining that the player terminal 4 as the transmission source of the SURRENDER selection signal is the side bet target, the CPU 41 transmits a signal inquiring the number-of-credits for SURRENDER to the player terminal 4 at which the side bet has been placed on the player terminal 4 as the transmission source of the SPLIT selection signal (step S483). The signal inquiring the number-of-credits for SURRENDER includes identification information showing the player terminal 4 as the transmission source of the SURRENDER selection signal.

Here, the reception processing of a signal inquiring the number-of-credits for SURRENDER is described with reference to FIG. 26.

Figure 26:
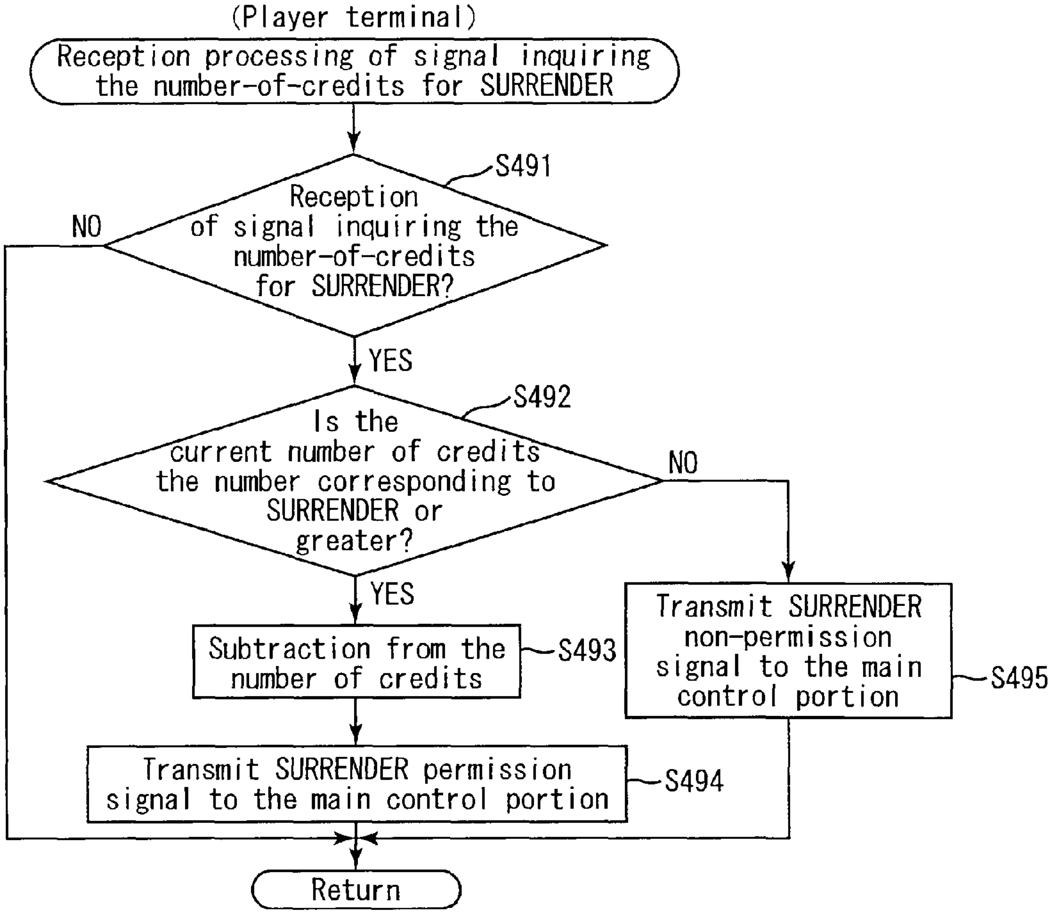
FIG. 26 is a flowchart illustrating a subroutine of reception processing of a signal inquiring the number of credits for SURRENDER, executed in each player terminal according to the first embodiment.

FIG. 26 is a flowchart illustrating a subroutine of the reception processing of a signal inquiring the number-of-credits for SURRENDER.

First, the CPU 51 determines whether or not it has received the signal inquiring the number-of-credits for SURRENDER (step S491).

When the CPU 51 determines that it has not received the signal inquiring the number-of-credits for SURRENDER, the CPU 51 ends the present subroutine.

When the CPU 51 determines that it has received the signal inquiring the number-of-credits for SURRENDER, the CPU 51 determines whether or not the number of credits stored in the RAM 52 is equal to or more than the number of credits corresponding to the amount half the side bet amount on the player terminal 4 that is shown by the identification information carried by the signal inquiring the number-of-credits for SURRENDER (step S492).

When determining that the number of credits is equal to or more than the number of credits corresponding to the amount half the side bet amount on the above player terminal 4, the CPU 51 subtracts the number corresponding to the amount half the side bet amount on the above player terminal 4 from the number of credits stored in the RAM 52 (step S493). Next, the CPU 51 transmits a SURRENDER permission signal to the main control portion 31 (step S494).

On the other hand, when determining that the number of credits is less than the number of credits corresponding to the amount half the side bet amount on the above player terminal 4, the CPU 51 transmits a SURRENDER non-permission signal to the main control portion 31 (step S495).

After executing the processing of step S494 or step S495, the CPU 51 ends the present subroutine.

In the above, the reception processing of a signal inquiring the number-of-credits for SURRENDER has been described with reference to FIG. 26.

Now, refer back to FIG. 25.

After transmitting in step S483 the signal inquiring the number-of-credits for SURRENDER to the player terminal 4, the CPU 41 receives a SURRENDER permission signal or a SURRENDER non-permission signal from the player terminal 4 (step S484).

Next, the CPU 41 sets the SURRENDER permission flag in association with the player terminal 4 as the SURRENDER permission signal transmission source (step S485).

When determining in step S482 that the player terminal 4 as the transmission source of the SURRENDER selection signal is not the side bet target, or after executing the processing of step S485, the CPU 41 sets the SURRENDER selection flag in association with the player terminal 4 as the transmission source of the SURRENDER selection signal (step S486).

The CPU 41 then ends the present subroutine.

The reception processing of a signal requesting a player additional card (step S407 of FIG. 17) is described with reference to FIG. 27.

Figure 27:
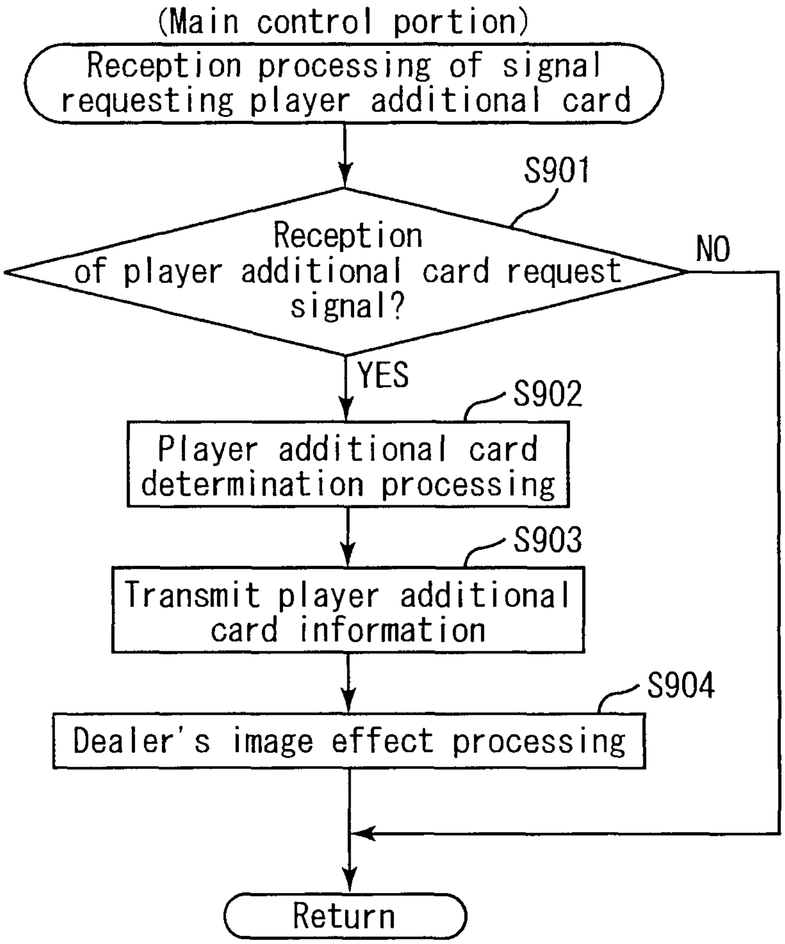
FIG. 27 is a flowchart illustrating a subroutine of reception processing of a signal requesting player additional card, executed in the main control portion.

FIG. 27 is a flowchart illustrating a subroutine of the reception processing of a signal requesting a player additional card in the main control portion.

First, the CPU 41 determines whether or not it has received the player additional card request signal (see step S310 of FIG. 11 and step S375 of FIG. 14) from the player terminal 4 (step S901).

When the CPU 41 determines that it has not received the player additional card request signal, the CPU 41 ends the present subroutine.

On the other hand, when the CPU 41 determines that it has received the player additional card request signal, the CPU 41 determines the player additional card, based on the distribution order determined in step S4 of FIG. 7 (step S902).

Next, the CPU 41 transmits information showing the determined player additional card (player additional card information) to the player terminal 4 as the transmission source of the player additional card request signal that the CPU 41 has received in step S901, and to the player terminal 4 at which the side bet has been placed on the above player terminal 4 (step S903).

Thereafter, the CPU 41 executes dealer's image effect processing (see step S6 of FIG. 7), and ends the present subroutine.

In the above, the first embodiment has been described with reference to FIG. 1 to FIG. 27.

The gaming machine 1 according to the first embodiment and the control method thereof makes it possible to let a player enjoy two kinds of games, namely a normal game and a side game, in a game in which the result is determined based on the cards distributed to the player.

Since a side game result is determined based on a normal game of another player, it is possible to make the player interested in cards distributed to the other player. This makes a player concentrate on the game not only when cards are distributed to the player but also when cards are distributed to other players, thereby allowing the player to have a good time during the game.

Further, since a side game result is determined according to a normal game result of the player terminal 4 as the side bet target, the side game result of the player who has placed the side bet and the normal game result of the player on whom the side bet has been placed can be linked. Thereby, it is possible to make the players share the feelings of the joy and sadness raised in the game. As a result, a sense of unity can be created between the players playing a game in the gaming machine 1, whereby a game can be made more exciting.

According to the gaming machine 1 relating to the first embodiment and the control method thereof, the liquid crystal display 10 of each player terminal 4 displays not only the player cards for this player terminal 4 but also the player cards for another player terminal 4 as a side bet target. This allows a player to see player cards for another player terminal 4 in the player terminal 4 at which he or she plays a game. Accordingly, the player can see how the normal game goes and how the side game goes, in the player terminal 4 at which he or she plays a game. Also, the eyes of the player can be fixed on the liquid crystal display 10 of the player terminal 4 at which he or she plays a game. As a result, the player can be immersed in the game.

Generally, whether or not a player can receive a payout in blackjack depends on the skill of the player relating to the HIT operation or the STAND operation.

According to the gaming machine 1 relating to the first embodiment and the control method thereof, seeing the player cards for another player terminal 4, the player can guess the skill relating the HIT operation or STAND operation of another player who plays the game at the other player terminal 4. Based on the guessed skill relating to the HIT operation or STAND operation of the other player, the player can decide whether or not to place a side bet on the other player.

That is, the player can receive a payout (second payout) based on a side game at a higher possibility by placing a side bet on a player who has skills and is likely to win the game. For this purpose, the player needs to appropriately guess the skill of other players, and this generally requires advanced thinking. According to the gaming machine 1 relating to the first embodiment and the control method thereof, the player can have an opportunity to do such intellectual work, which enthralls players, who likes intellectual work, in games.

Also, since each player feels that other players guess the skill of the player, the player can play games seriously with a sense of tension. As a result, a player can be immersed in games.

According to the gaming machine 1 relating to the first embodiment and the control method thereof, when a side bet has been placed and then SPLIT, Double Down, INSURANCE, or SURRENDER is selected at the player terminal 4 as the side bet target, the number of credits corresponding to SPLIT, Double Down, INSURANCE, or SURRENDER is subtracted from the number of credits of the player terminal 4 at which the side bet has been placed. In this way, subtraction is made from the player's own credits when the other player selects SPLIT, Double Down, INSURANCE, or SURRENDER, it is therefore possible to surprise the player.

Since game media are compulsorily collected from the player's own credits when the other player selects SPLIT, Double Down, INSURANCE, or SURRENDER, guessing the skills of other players is more meaningful. Therefore, it is possible to make players consider the skills of other players more seriously, whereby players can be absorbed in games.

Second Embodiment

Descriptions have been given in which, when SPLIT, Double Down, INSURANCE, or SURRENDER is selected at one player terminal 4 as a side bet target and the number of credits of a player terminal 4 at which the side bet has been placed is less than the number of credits corresponding to SPLIT, Double Down, INSURANCE, or SURRENDER, the following situations occur. That is, selection of SPLIT, Double Down, INSURANCE, or SURRENDER is not reflected in the side game result of the player terminal 4 at which the side bet has been placed. Meanwhile, selection of SPLIT, Double Down, INSURANCE, or SURRENDER is reflected in the normal game result of the player terminal 4 as the side bet target.

When the same case occurs in the second embodiment, selection of SPLIT, Double Down, INSURANCE, or SURRENDER is not reflected in the normal game result of the player terminal 4 as the side bet target.

That is, when the number of credits of the player terminal 4 at which the side bet has been placed is insufficient in the second embodiment, selection of SPLIT, Double Down, INSURANCE, or SURRENDER in the player terminal 4 at which the side bet has been placed is made invalid.

In the following, the same reference numerals are given to the components identical to the components of the gaming machine 1 according to the first embodiment.

Descriptions are omitted for parts in the second embodiment to which descriptions in the first embodiment are applicable.

First, SPLIT according to the second embodiment is described with reference to FIG. 28 to FIG. 30.

Figure 28:
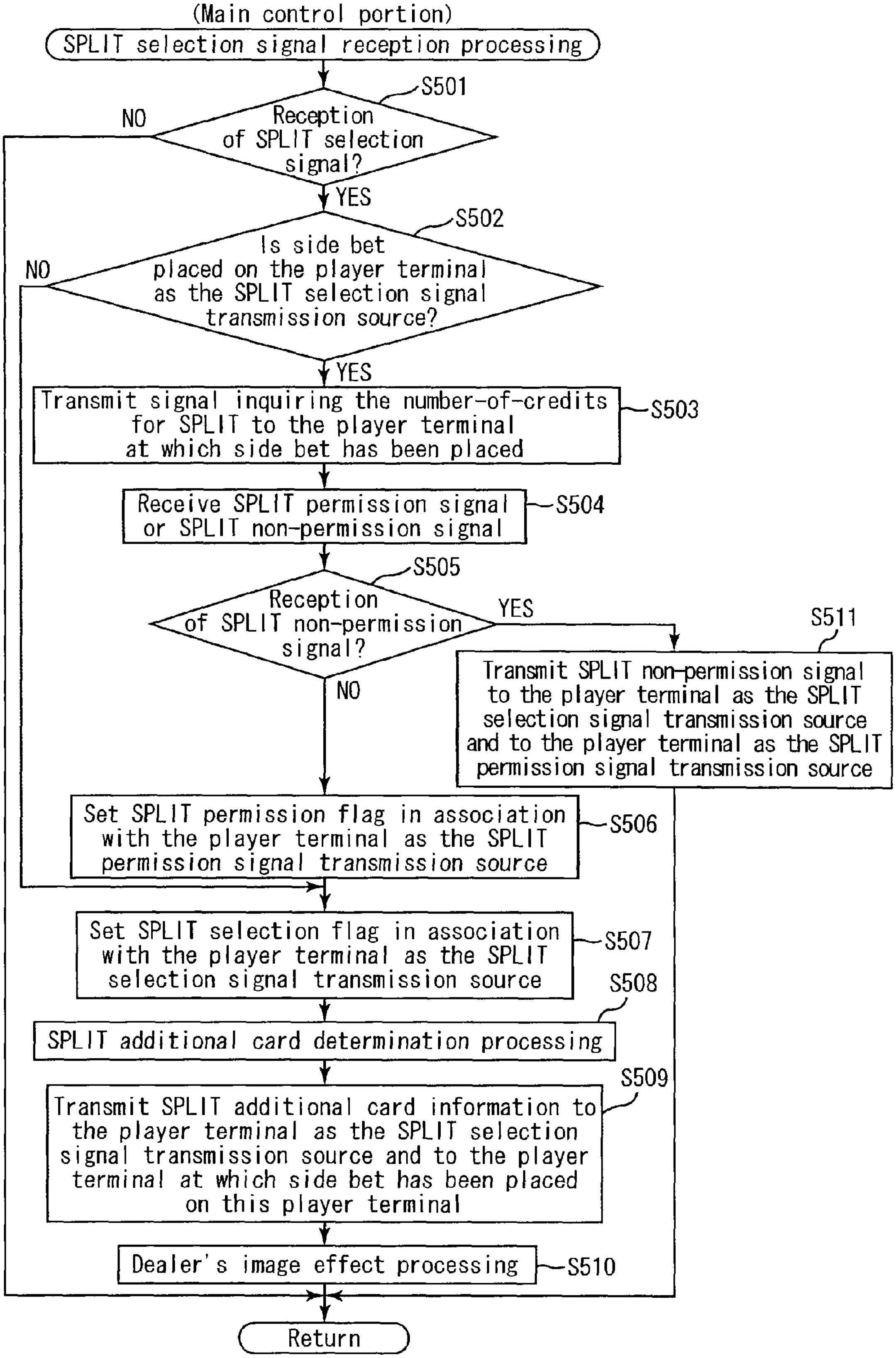
FIG. 28 is a flowchart illustrating a subroutine of SPLIT selection signal reception processing executed in a main control portion according to a second embodiment.

FIG. 28 is a flowchart illustrating a subroutine of SPLIT selection signal reception processing executed in the main control portion.

First, the CPU 41 executes the processing of step S501 to step S504. The processing is the same as the processing of step S421 to step S424 of FIG. 19, and thus the descriptions thereof are omitted here.

Then, the CPU 41 determines whether or not it has received the SPLIT non-permission signal in step S504 (step S505).

When the CPU 41 determines that it has not received the SPLIT non-permission signal, the CPU 41 executes the processing of step S506 to step S510. The processing is the same as the processing of step S425 to step S429 of FIG. 19, and thus descriptions thereof are omitted here.

When the CPU 41 determines that it has received the SPLIT non-permission signal, the CPU 41 transmits a SPLIT non-permission signal to the player terminal 4 as the transmission source of the SPLIT selection signal received in step S501 and to any player terminal 4 as the transmission source of the SPLIT permission signal received in step S504 (step S511).

The CPU 41 then ends the present subroutine.

Figure 29:
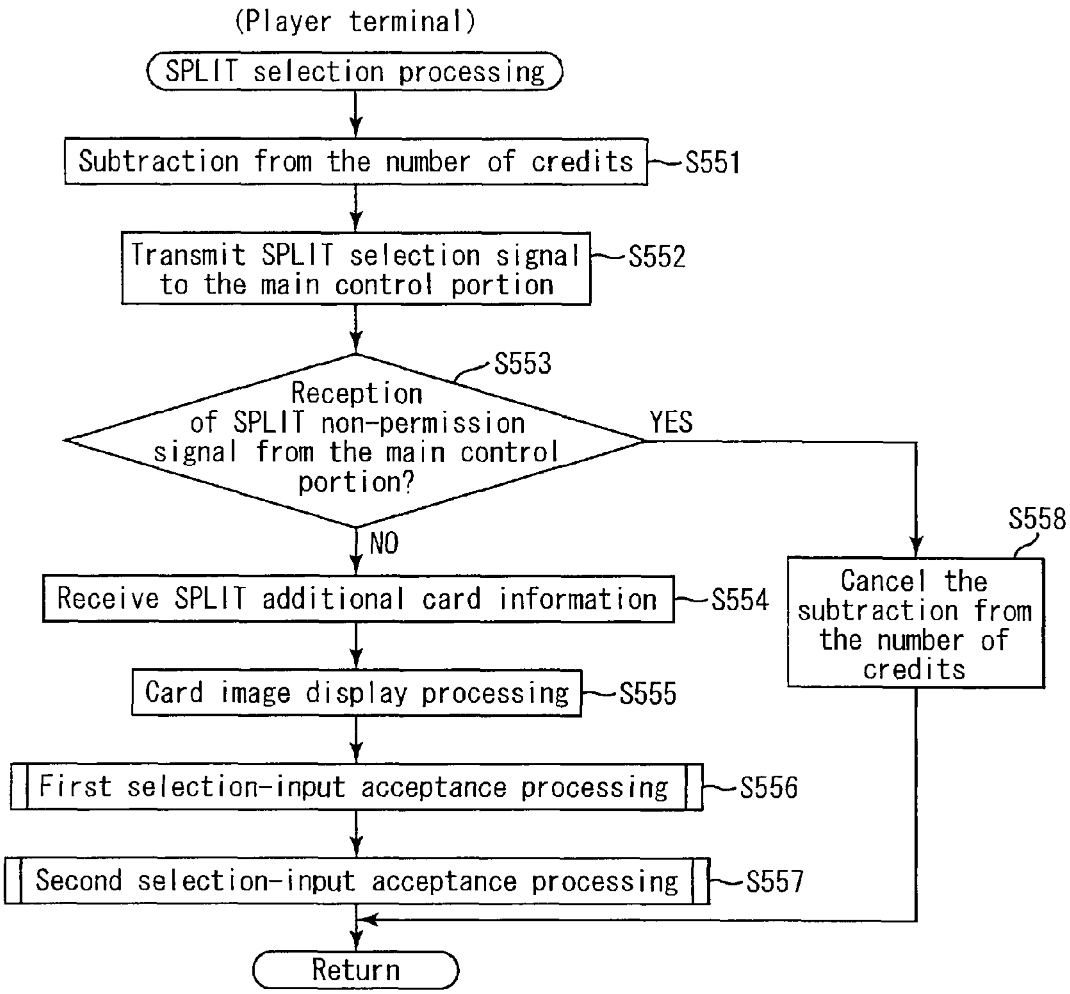
FIG. 29 is a flowchart illustrating a subroutine of SPLIT selection processing executed in each player terminal according to the second embodiment.

FIG. 29 is a flowchart illustrating a subroutine of the SPLIT selection processing executed in each player terminal.

First, the CPU 51 executes the processing of step S551 to step S552. The processing is the same as the processing of step S361 to step S362 of FIG. 13, and thus the descriptions thereof are omitted here.

Subsequently, the CPU 51 determines whether or not it has received the SPLIT non-permission signal (see step S511 of FIG. 28) from the main control portion 31 (step S553).

When the CPU 51 determines that it has not received the SPLIT non-permission signal, the CPU 51 executes the processing of step S554 to step S557. The processing is the same as the processing of step S363 to step S366 of FIG. 13, and thus descriptions thereof are omitted here.

On the other hand, when the CPU 51 determines that it has received the SPLIT non-permission signal, the CPU 51 executes the processing of canceling the subtraction from the number of credits (step S558). In the processing, the CPU 51 adds the number of credits corresponding to the normal bet amount stored in the RAM 52, to the number of credits stored in the RAM 52.

The CPU 51 then ends the present subroutine.

Figure 30:
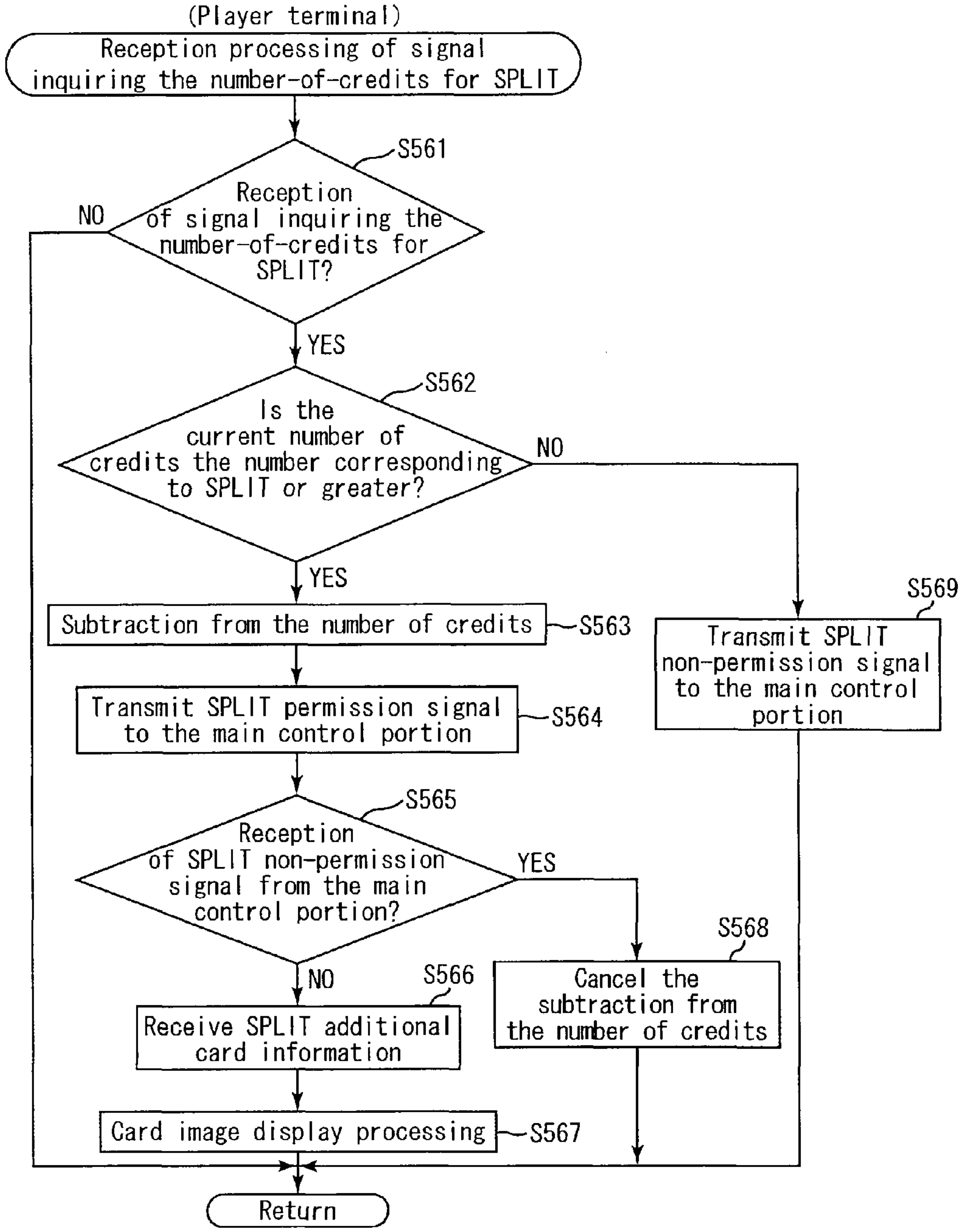
FIG. 30 is a flowchart illustrating a subroutine of reception processing of a signal inquiring the number of credits for SPLIT, executed in each player terminal according to the second embodiment.

FIG. 30 is a flowchart illustrating a subroutine of the reception processing of a signal inquiring the number-of-credits for SPLIT.

First, the CPU 51 executes the processing of step S561 to step S564. The processing is the same as the processing of step S431 to step S434 of FIG. 20, and thus the descriptions thereof are omitted here.

Next, the CPU 51 determines whether or not it has received the SPLIT non-permission signal (see step S511 of FIG. 28) from the main control portion 31 (step S565).

When the CPU 51 determines that it has not received the SPLIT non-permission signal, the CPU 51 executes the processing of step S566 to step S567. The processing is the same as the processing of step S436 to step S437 of FIG. 20, and thus descriptions thereof are omitted here.

On the other hand, when the CPU 51 determines that it has received the SPLIT non-permission signal, the CPU 51 executes the processing of canceling the subtraction from the number of credits (step S568). In this processing, the CPU 51 adds the number of credits corresponding to the side bet amount on the player terminal 4 shown by the identification information carried by the signal inquiring the number-of-credits for SPLIT, to the number of credits stored in the RAM 52.

The CPU 51 then ends the present subroutine.

After transmitting the SPLIT non-permission signal to the main control portion 31 in step S569, the CPU 51 ends the present subroutine.

Next, Double Down according to the second embodiment is described with reference to FIG. 31 to FIG. 33.

Figure 31:
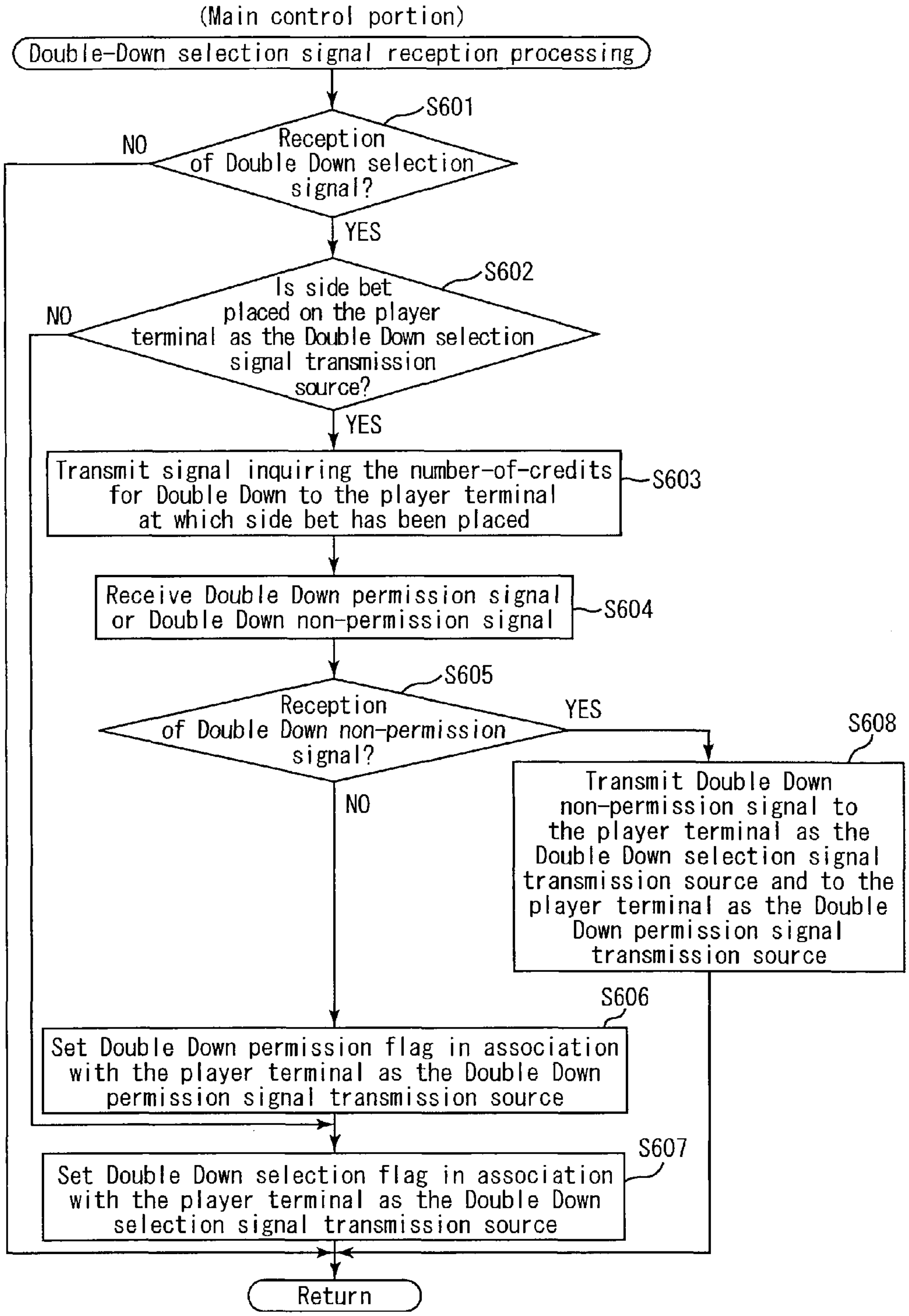
FIG. 31 is a flowchart illustrating a subroutine of Double Down selection signal reception processing executed in the main control portion according to the second embodiment.

FIG. 31 is a flowchart illustrating a subroutine of the Double Down selection signal reception processing executed in the main control portion.

First, the CPU 41 executes the processing of step S601 to step S604. The processing is the same as the processing of step S441 to step S444 of FIG. 21, and thus descriptions thereof are omitted here.

Then, the CPU 41 determines whether or not it has received the Double Down non-permission signal in step S604 (step S605).

When the CPU 41 determines that it has not received the Double Down non-permission signal, the CPU 41 executes the processing of step S606 to step S607. The processing is the same as the processing of step S445 to step S446 of FIG. 21, and thus descriptions thereof are omitted here.

On the other hand, when the CPU 41 determines that it has received the Double Down non-permission signal, the CPU 41 transmits a Double Down non-permission signal to the player terminal 4 as the transmission source of the Double Down selection signal received in step S601 and to any player terminal 4 as the transmission source of the Double Down permission signal received in step S604 (step S608).

The CPU 41 then ends the present subroutine.

Figure 32:
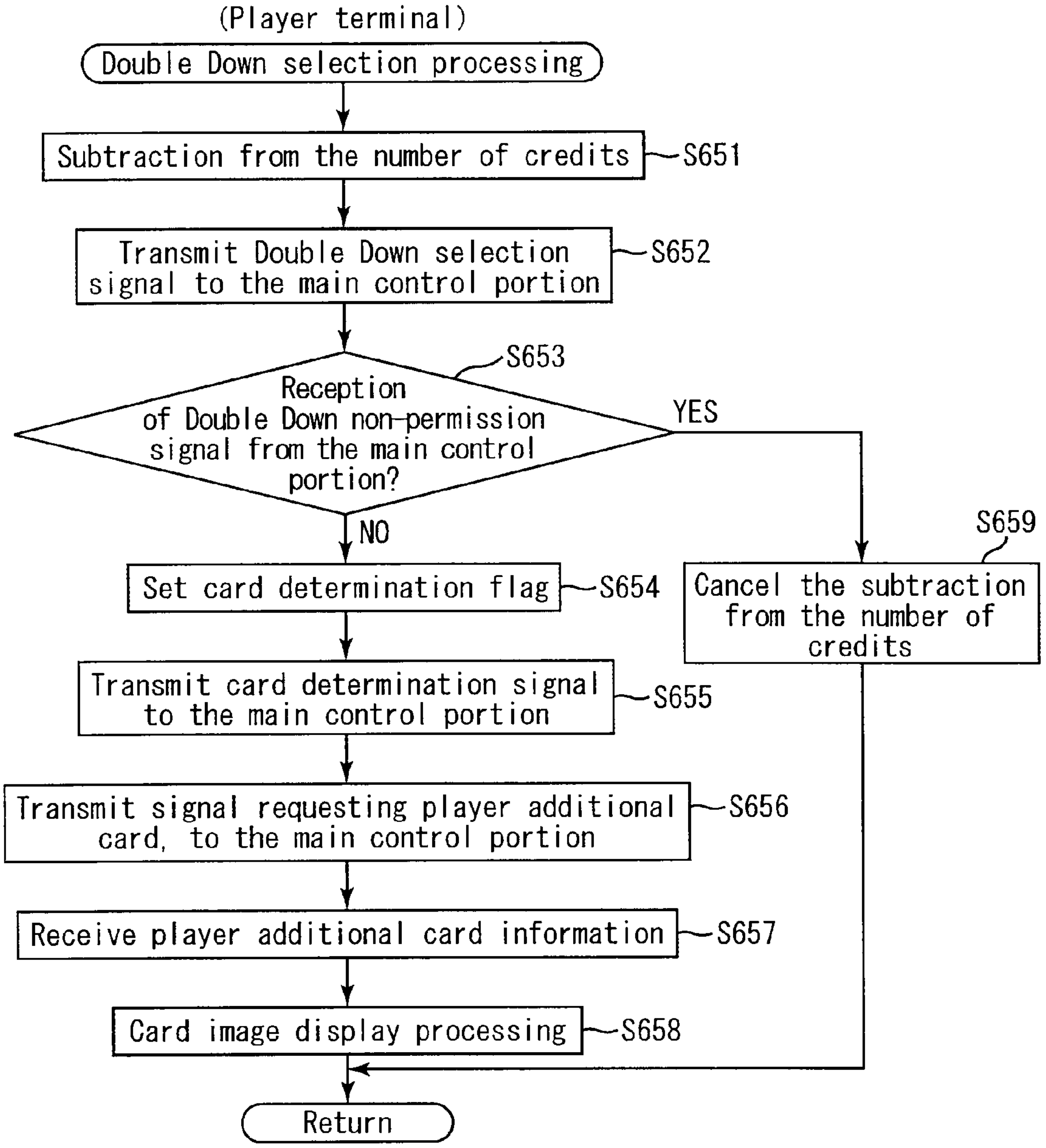
FIG. 32 is a flowchart illustrating a subroutine of Double Down selection processing executed in each player terminal according to the second embodiment.

FIG. 32 is a flowchart illustrating a subroutine of the Double Down selection processing executed in each player terminal.

First, the CPU 51 executes the processing of step S651 to step S652. The processing is the same as the processing of step S371 to step S372 of FIG. 14, and thus the descriptions thereof are omitted here.

Next, the CPU 51 determines whether or not it has received the Double Down non-permission signal (see step S608 of FIG. 31) from the main control portion 31 (step S653).

When the CPU 51 determines that it has not received the Double Down non-permission signal, the CPU 51 executes the processing of step S654 to step S658. The processing is the same as the processing of step S373 to step S377, and thus the descriptions thereof are omitted here.

On the other hand, when the CPU 51 determines that it has received the Double Down non-permission signal, the CPU 51 executes the processing of canceling the subtraction from the number of credits (step S659). In the processing, the CPU 51 adds the number of credits corresponding to the normal bet amount stored in the RAM 52 to the number of credits stored in the RAM 52.

The CPU 51 then ends the present subroutine.

Figure 33:
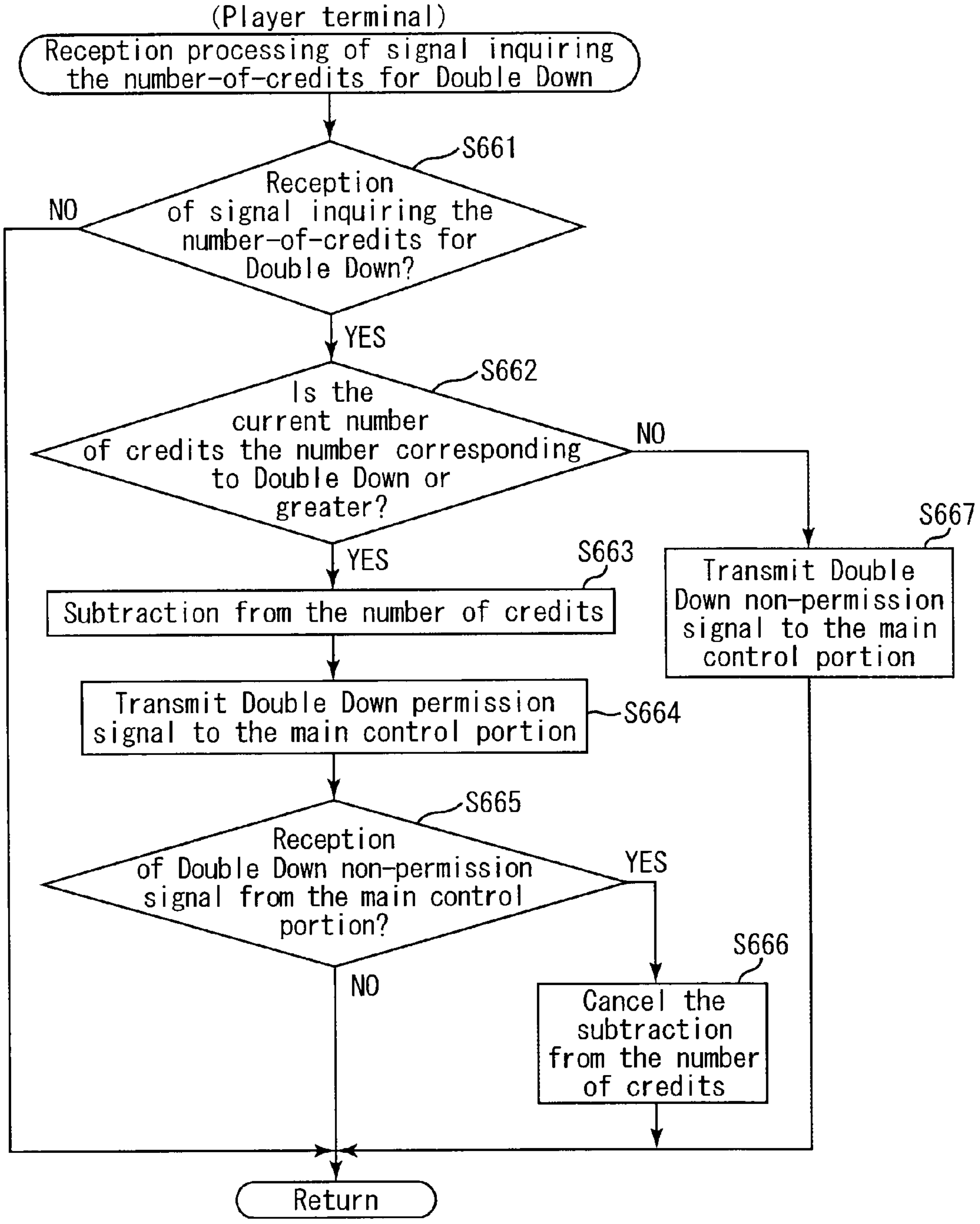
FIG. 33 is a flowchart illustrating a subroutine of reception processing of a signal inquiring the number of credits for Double Down, executed in each player terminal according to the second embodiment.

FIG. 33 is a flowchart illustrating a subroutine of the reception processing of a signal inquiring the number-of-credits for Double Down, which is executed in each player terminal.

First, the CPU 51 executes the processing of step S661 to step S664. The processing is the same as the processing of step S451 to step S454 of FIG. 22, and thus the descriptions thereof are omitted here.

Then, the CPU 51 determines whether or not it has received the Double Down non-permission signal (see step S608 of FIG. 31) from the main control portion 31 (step S665).

When the CPU 51 determines that it has not received the Double Down non-permission signal, the CPU 51 ends the present subroutine.

On the other hand, when the CPU 51 determines that it has received the Double Down non-permission signal, the CPU 51 executes the processing of canceling the subtraction from the number of credits (step S666). In this processing, the CPU 51 adds the number of credits corresponding to the side bet amount on the player terminal 4 shown by the identification information carried by the signal inquiring the number-of-credits for Double Down, to the number of credits stored in the RAM 52.

The CPU 51 then ends the present subroutine.

After transmitting the Double Down non-permission signal to the main control portion 31 in step S667, the CPU 51 ends the present subroutine.

Next, INSURANCE according to the second embodiment is described with reference to FIG. 34 to FIG. 36.

Figure 34:
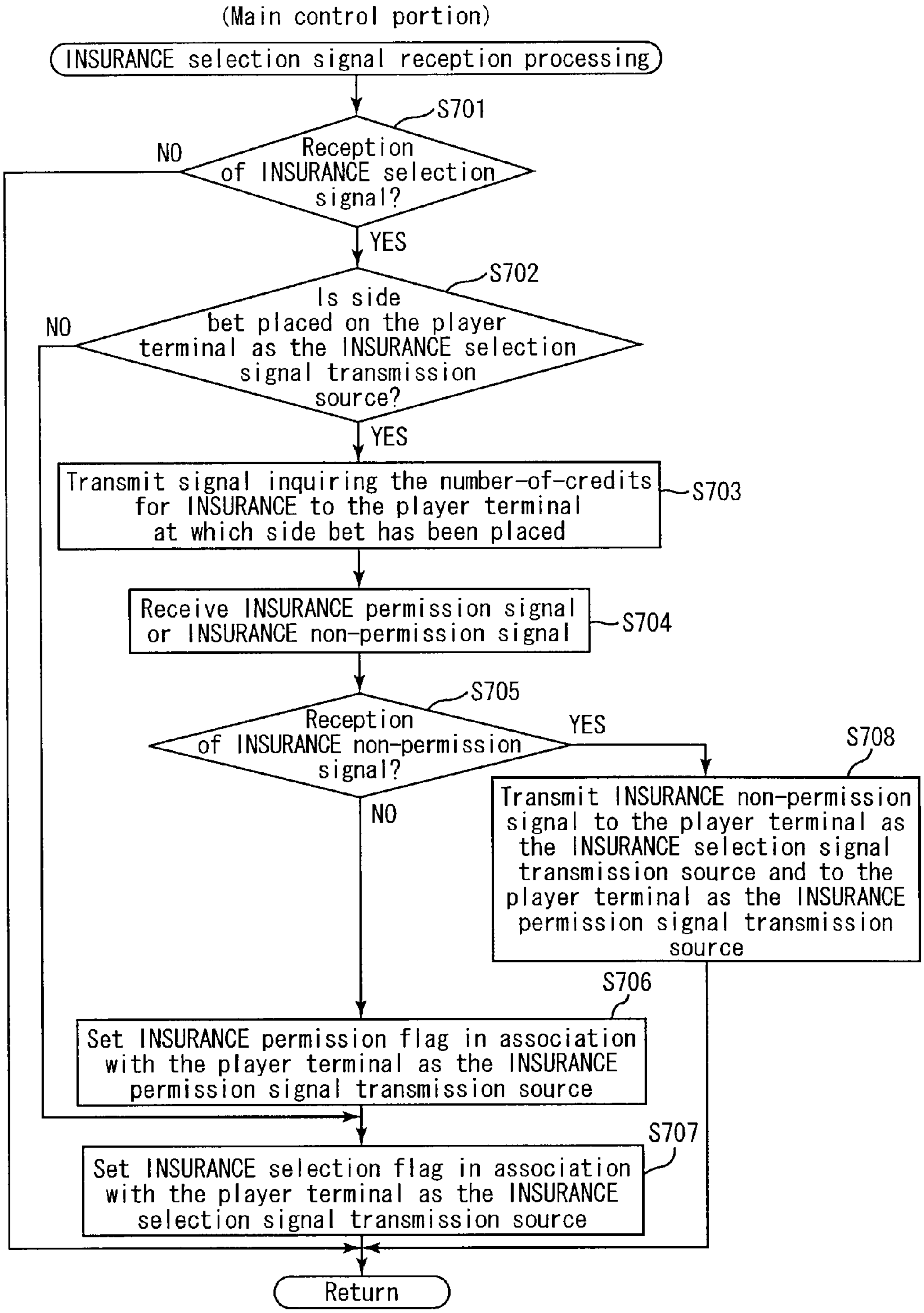
FIG. 34 is a flowchart illustrating a subroutine of INSURANCE selection signal reception processing executed in the main control portion according to the second embodiment.

FIG. 34 is a flowchart illustrating a subroutine of INSURANCE selection signal reception processing executed in the main control portion.

First, the CPU 41 executes the processing of step S701 to step S704. The processing is the same as the processing of step S461 to step S464 of FIG. 23, and thus descriptions thereof are omitted here.

Then, the CPU 41 determines whether or not it has received the INSURANCE non-permission signal in step S704 (step S705).

When the CPU 41 determines that it has not received the INSURANCE non-permission signal, the CPU 41 executes the processing of step S706 to step S707. The processing is the same as the processing of step S465 to step S466 of FIG. 23, and thus descriptions thereof are omitted here.

On the other hand, when the CPU 41 determines that it has received the INSURANCE non-permission signal, the CPU 41 transmits the INSURANCE non-permission signal to the player terminal 4 as the transmission source of the INSURANCE selection signal received in step S701 and to any player terminal 4 as the transmission source of the INSURANCE permission signal received in step S704 (step S708).

The CPU 41 then ends the present subroutine.

Figure 35:
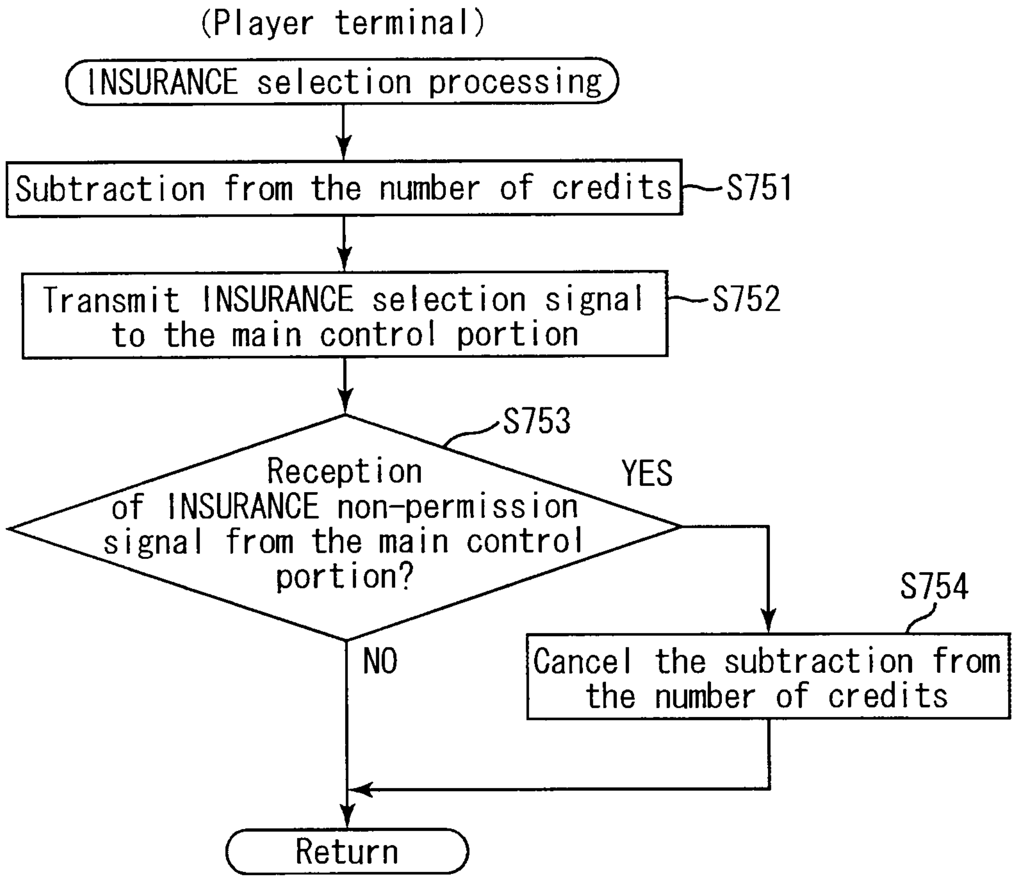
FIG. 35 is a flowchart illustrating a subroutine of INSURANCE selection processing executed in each player terminal according to the second embodiment.

FIG. 35 is a flowchart illustrating a subroutine of the INSURANCE selection processing executed in each player terminal.

First, the CPU 51 executes the processing of step S751 to step S752. The processing is the same as the processing of step S381 to step S382 of FIG. 15, and thus the descriptions thereof are omitted here.

Then, the CPU 51 determines whether or not it has received the INSURANCE non-permission signal (see step S708 of FIG. 34) from the main control portion 31 (step S753).

When the CPU 51 determines that it has not received the INSURANCE non-permission signal, the CPU 51 ends the present subroutine.

On the other hand, when the CPU 51 determines that it has received the INSURANCE non-permission signal, the CPU 51 executes the processing of canceling the subtraction from the number of credits (step S754). In the processing, the CPU 51 adds the number of credits corresponding to half the normal bet amount stored in the RAM 52, to the number of credits stored in the RAM 52.

The CPU 51 then ends the present subroutine.

Figure 36:
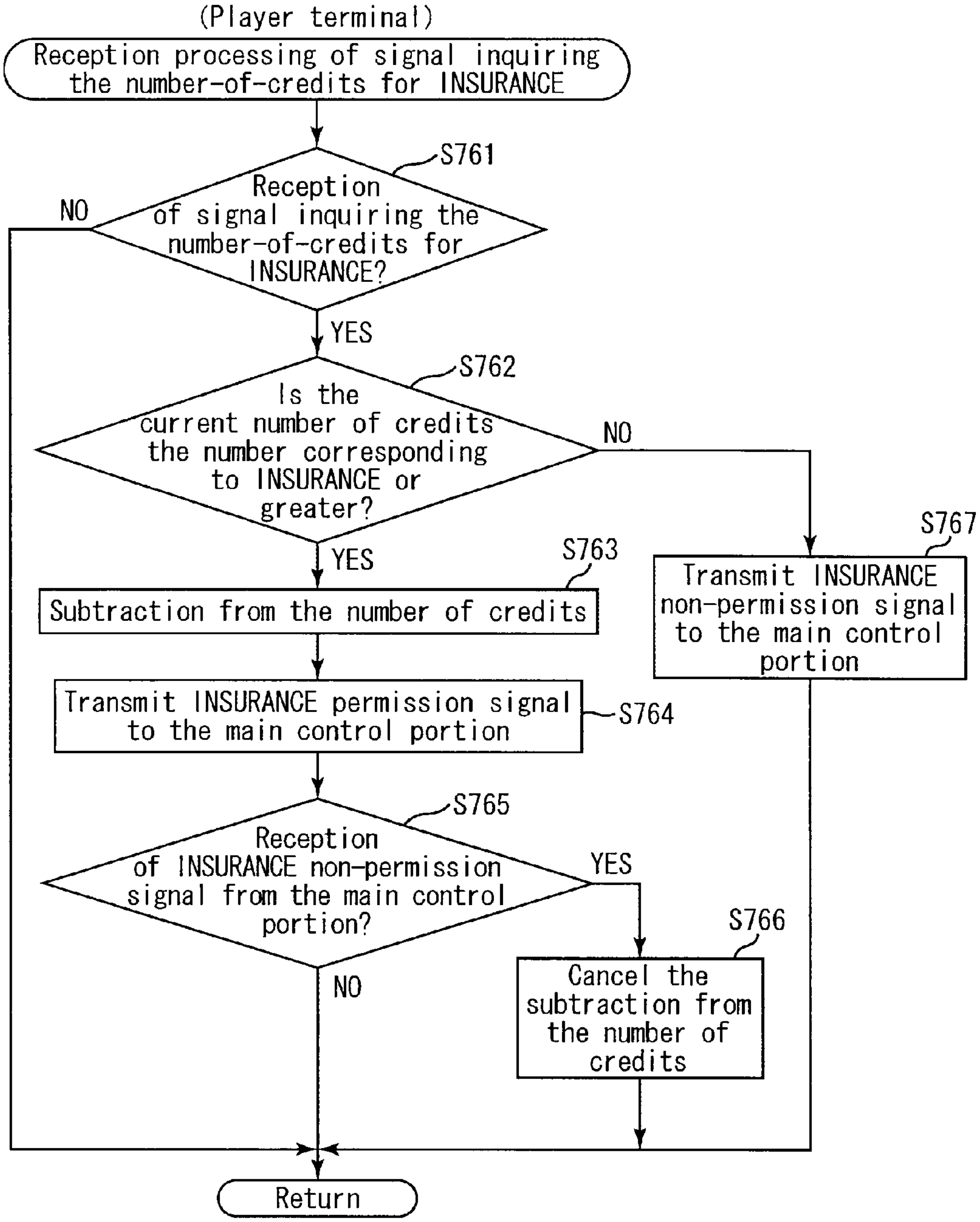
FIG. 36 is a flowchart illustrating a subroutine of reception processing of a signal inquiring the number of credits for INSURANCE, executed in each player terminal according to the second embodiment.

FIG. 36 is a flowchart illustrating a subroutine of the reception processing of a signal inquiring the number-of-credits for INSURANCE.

First, the CPU 51 executes the processing of step S761 to step S764. The processing is the same as the processing of step S471 to step S474 of FIG. 24, and thus the descriptions thereof are omitted here.

Then, the CPU 51 determines whether or not it has received the INSURANCE non-permission signal (see step S708 of FIG. 34) from the main control portion 31 (step S765).

When the CPU 51 determines that it has not received the INSURANCE non-permission signal, the CPU 51 ends the present subroutine.

On the other hand, when the CPU 51 determines that it has received the INSURANCE non-permission signal, the CPU 51 executes the processing of canceling the subtraction from the number of credits (step S766). In this processing, the CPU 51 adds the number of credits corresponding to half the side bet amount on the player terminal 4 shown by the identification information carried by the signal inquiring the number-of-credits for INSURANCE, to the number of credits stored in the RAM 52.

The CPU 51 then ends the present subroutine.

After transmitting the INSURANCE non-permission signal to the main control portion 31 in step S767, the CPU 51 ends the present subroutine.

Next, SURRENDER according to the second embodiment is described with reference to FIG. 37 to FIG. 39.

Figure 37:
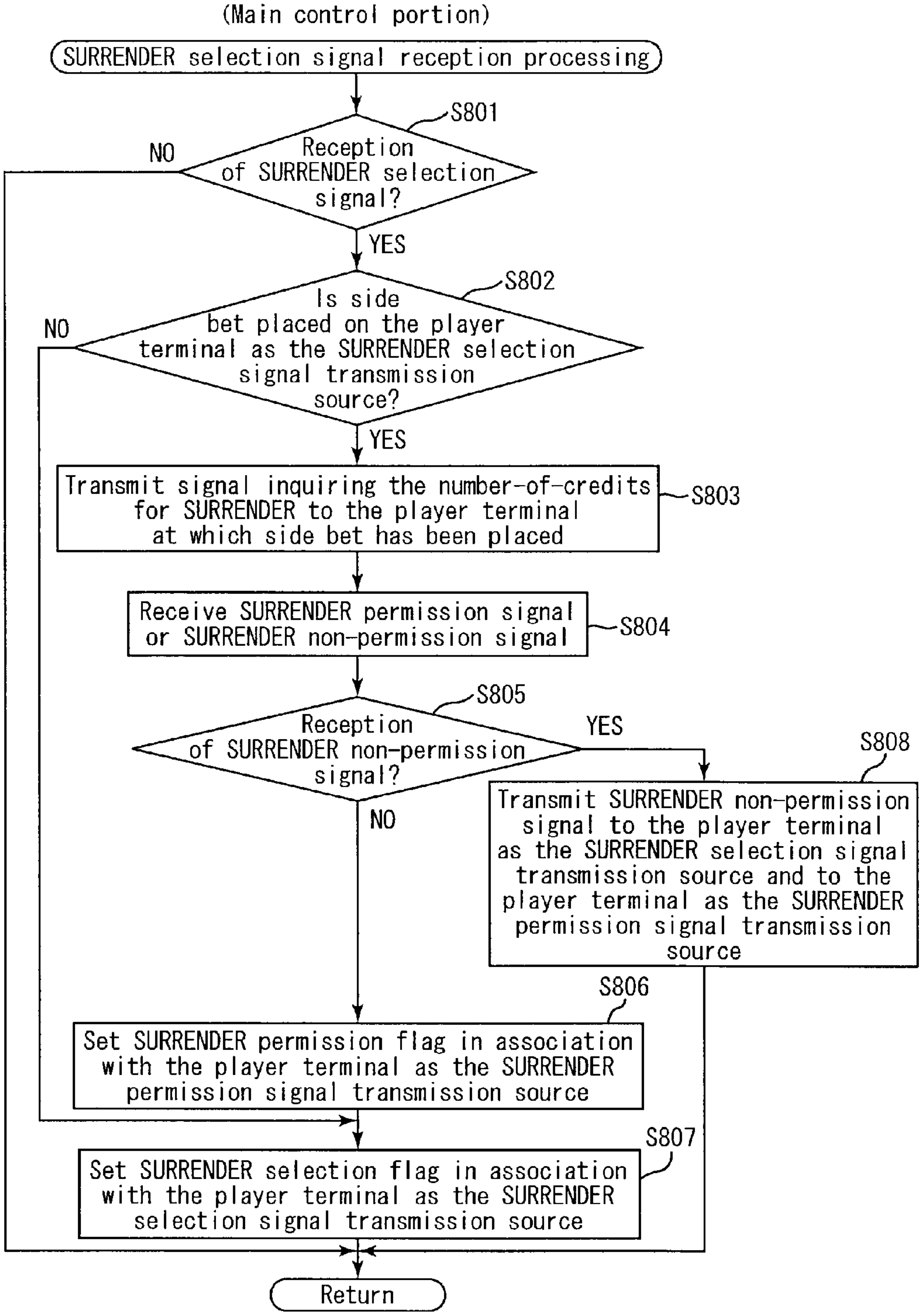
FIG. 37 is a flowchart illustrating a subroutine of SURRENDER selection signal reception processing executed in the main control portion according to the second embodiment.

FIG. 37 is a flowchart illustrating a subroutine of SURRENDER selection signal reception processing executed in the main control portion.

First, the CPU 41 executes the processing of step S801 to step S804. The processing is the same as the processing of step S481 to step S484 of FIG. 25, and thus descriptions thereof are omitted here.

Then, the CPU 41 determines whether or not it has received the SURRENDER non-permission signal in step S804 (step S805).

When the CPU 41 determines that it has not received the SURRENDER non-permission signal, the CPU 41 executes the processing of step S806 to step S807. The processing is the same as the processing of step S485 to step S486 of FIG. 25, and thus descriptions thereof are omitted here.

On the other hand, when the CPU 41 determines that it has received the SURRENDER non-permission signal, the CPU 41 transmits the SURRENDER non-permission signal to the player terminal 4 as the transmission source of the SURRENDER selection signal received in step S801 and to any player terminal 4 as the transmission source of the SURRENDER permission signal received in step S804 (step S808).

The CPU 41 then ends the present subroutine.

Figure 38:
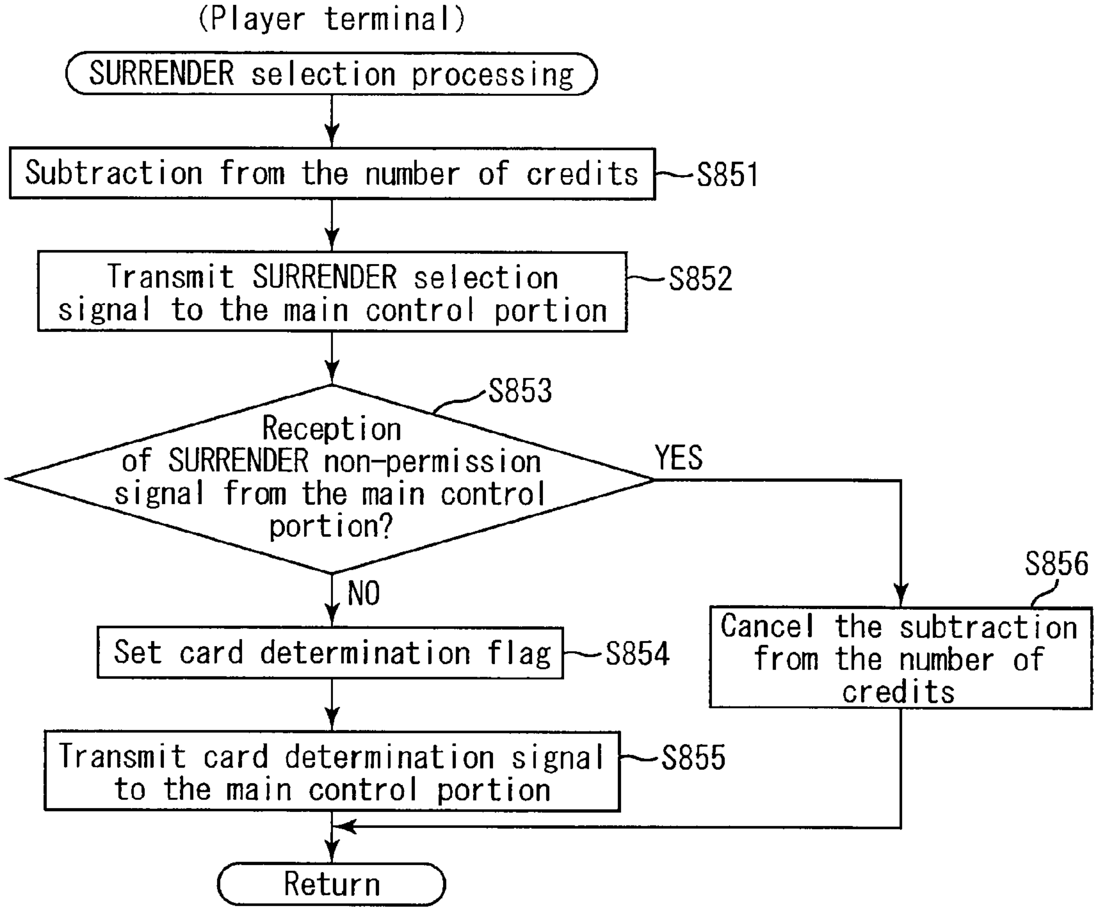
FIG. 38 is a flowchart illustrating a subroutine of SURRENDER selection processing executed in each player terminal according to the second embodiment.

FIG. 38 is a flowchart illustrating a subroutine of the SURRENDER selection processing executed in each player terminal.

First, the CPU 51 executes the processing of step S851 to step S852. The processing is the same as the processing of step S391 to step S392 of FIG. 16, and thus the descriptions thereof are omitted here.

Then, the CPU 51 determines whether or not it has received the SURRENDER non-permission signal (see step S808 of FIG. 37) from the main control portion 31 (step S853).

When the CPU 51 determines that it has not received the SURRENDER non-permission signal, the CPU 51 executes the processing of step S854 to step S855. The processing is the same as the processing of step S393 to step S394 of FIG. 16, and thus descriptions thereof are omitted here.

The CPU 51 then ends the present subroutine.

On the other hand, when the CPU 51 determines that it has received the SURRENDER non-permission signal, the CPU 51 executes the processing of canceling the subtraction from the number of credits (step S856). In the processing, the CPU 51 adds the number of credits corresponding to half the normal-bet amount stored in the RAM 52, to the number of credits stored in the RAM 52.

The CPU 51 then ends the present subroutine.

Figure 39:
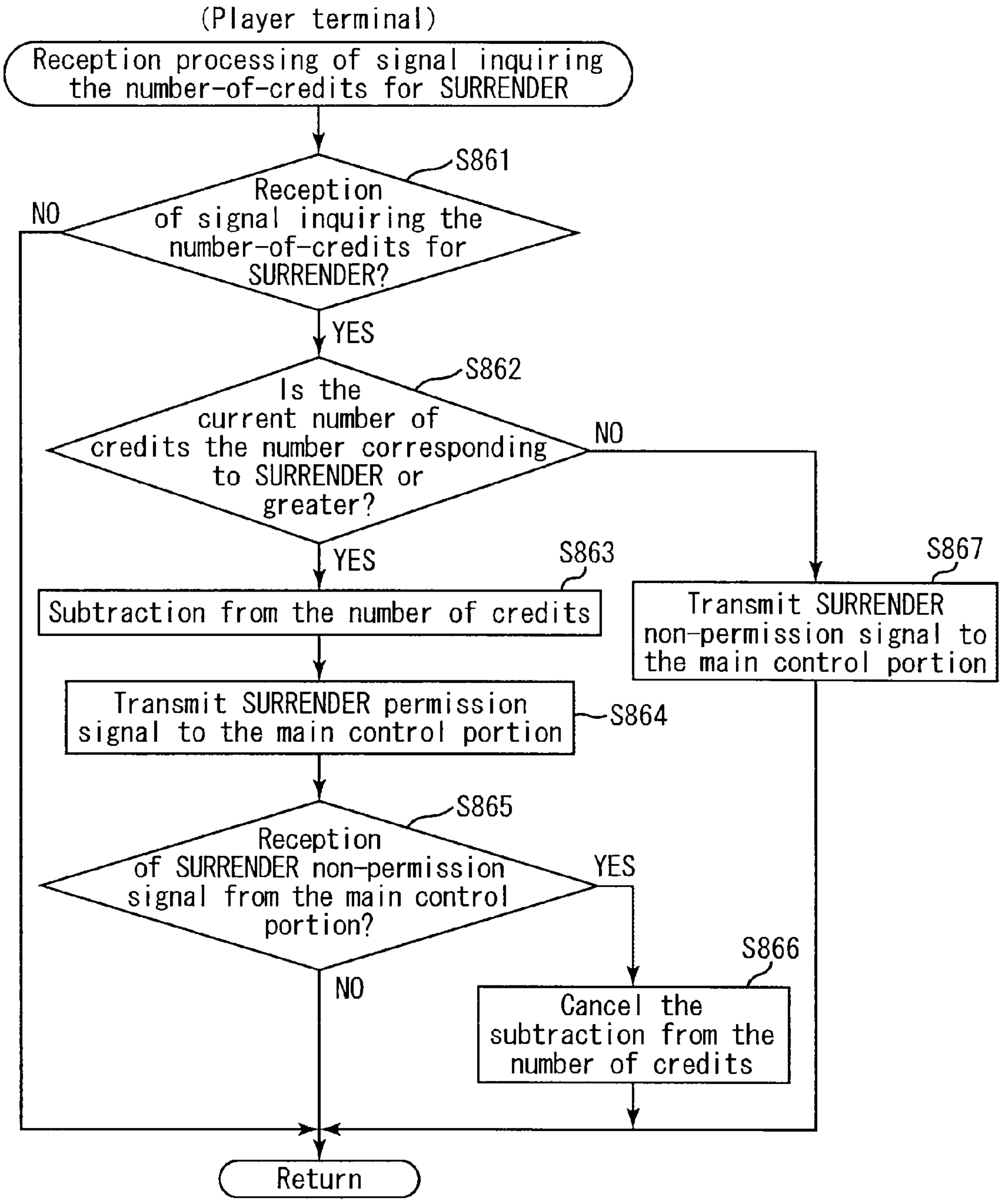
FIG. 39 is a flowchart illustrating a subroutine of reception processing of a signal inquiring the number of credits for SURRENDER, executed in each player terminal according to the second embodiment.

FIG. 39 is a flowchart illustrating a subroutine of the reception processing of a signal inquiring the number-of-credits for SURRENDER.

First, the CPU 51 executes the processing of step S861 to step S864. The processing is the same as the processing of step S491 to step S494 of FIG. 26, and thus the descriptions thereof are omitted here.

Then, the CPU 51 determines whether or not it has received the SURRENDER non-permission signal (see step S808 of FIG. 37) from the main control portion 31 (step S865).

When the CPU 51 determines that it has not received the SURRENDER non-permission signal, the CPU 51 ends the present subroutine.

On the other hand, when the CPU 51 determines that it has received the SURRENDER non-permission signal, the CPU 51 executes the processing of canceling the subtraction from the number of credits (step S866). In this processing, the CPU 51 adds the number of credits corresponding to half the side bet amount on the player terminal 4 shown by the identification information carried by the signal inquiring the number-of-credits for SURRENDER, to the number of credits stored in the RAM 52.

The CPU 51 then ends the present subroutine.

After transmitting the SURRENDER non-permission signal to the main control portion 31 in step S867, the CPU 51 ends the present subroutine.

In the above, the second embodiment has been described.

According to the gaming machine 1 relating to the second embodiment and the control method thereof, when SPLIT, Double Down, INSURANCE, or SURRENDER is selected in one player terminal 4 as the side bet target, the normal game result of the one player terminal 4 is determined based on SPLIT, Double Down, INSURANCE, or SURRENDER, on condition that the number of credits of the player terminal 4 at which the side bet has been placed is equal to or more than the number of credits corresponding to SPLIT, Double Down, INSURANCE, or SURRENDER. That is, when the number of credits of the player terminal 4 at which the side bet has been placed is less than the number of credits corresponding to SPLIT, Double Down, INSURANCE, or SURRENDER, selection of SPLIT, Double Down, INSURANCE, or SURRENDER is made invalid.

As above, since selection of SPLIT, Double Down, INSURANCE, or SURRENDER may possibly be made invalid, it is possible to surprise players.

Further, players who play games in a gaming machine generally do not wish winning of other players. In view of this, according to the gaming machine 1 relating to the second embodiment and the control method thereof, a player can prevent another player from receiving a payout based on SPLIT, Double Down, INSURANCE, or SURRENDER by decreasing the player's own credits before placing a side bet on the other player so that selection of SPLIT, Double Down, INSURANCE, or SURRENDER by the other player is made invalid. Therefore, it is possible to provide a game that stimulates the player's feelings of not wishing winning of other players.

Meanwhile, when decreasing the credits, the player himself/herself may not be able to receive a payout based on SPLIT, Double Down, INSURANCE, or SURRENDER. This gives the player the conflicting feelings of preventing other players from selecting SPLIT, Double Down, INSURANCE, or SURRENDER, and of selecting SPLIT, Double Down, INSURANCE, or SURRENDER by himself/herself, thereby making the player try various options to find the best way. As a result, the player can be immersed in games.

In the above embodiments (the first embodiment and the second embodiment), the cases have been described in which the player cards are displayed on the liquid crystal display 10 and the front display 21.

The liquid crystal display 10 corresponds to the displays in the inventions (1) and (4).

The liquid crystal display 10 and the front display 21 constitute the displays in the inventions of (2) and (3). As in this case, the displays in the inventions of (2) and (3) each may have two or more displays, or may have one display.

In the above embodiments, the player can input a command in the game such as selection of "hit" or "stand" by using the touch panel 11. The touch panel 11 corresponds to the input device of the present invention. The input device of the present invention is not particularly limited, and a conventionally known input device such as buttons and the like may be used. Further, as an input device with which a player places a normal bet and a side bet, a currency insertion slot through which a currency such as a coin and a bill can be inserted may be used.

In the above embodiments, the processing executed in the gaming machine 1 is conducted by the CPU 41 of the main control portion 31 together with the CPU 51 of each player terminal 4. The CPU 41 and the CPU 51 constitute the controller of the present invention. In this way, the controller of the present invention may have multiple CPUs, or may have one CPU.

In the above embodiments, a Blackjack game is played as a normal game. However, the normal game of the present invention is not limited to a Blackjack game. The normal game of the present invention may be a card game such as poker.

Further, the cards used in the present invention are not limited to playing cards each of which carries a number and a suit, and the cards may be ones used for a game such as hanafuda.

In the above embodiments, the liquid crystal display 10 displays player cards for another player terminal 4 only when a side bet is placed on the other player terminal 4 by the player terminal 4 which has this liquid crystal display 10. However, in the present invention, player cards for all the stations at which a normal bet has been placed may be displayed on the display provided in each station at which a normal bet has been placed.

In the above embodiments, a Blackjack game is executed in the gaming machine 1.

Figure 40:
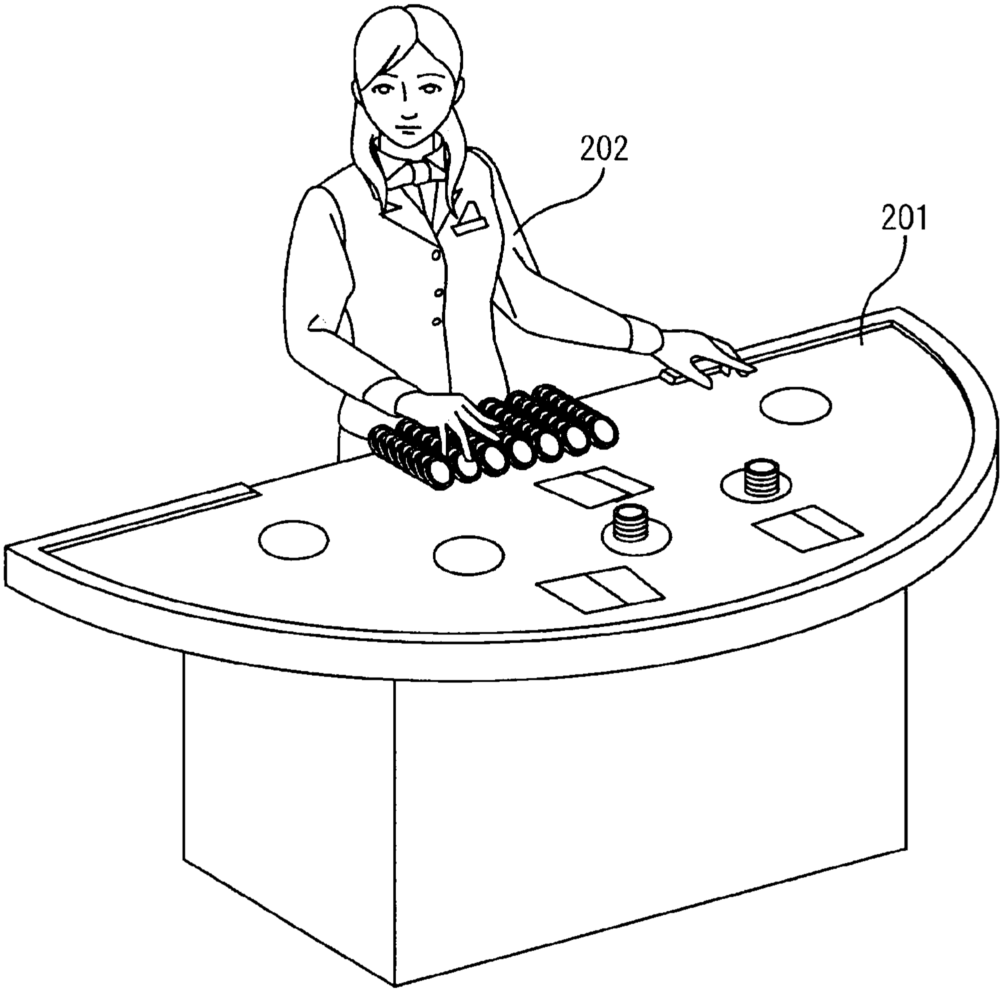
FIG. 40 is a schematic view illustrating an example of a table game in which the present invention is applied.

However, the methods playing a game according to the inventions (2) and (3) can be applied also to a card game (so-called table game) in which a dealer 202 and a player (not illustrated) play on a game table 201, as illustrated in FIG. 40.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step should become apparent from the above descriptions.

What is claimed as new and desired to be secured by Letters Patent of the United States is:

1. A gaming machine comprising:

at least first and second stations each including a display capable of displaying multiple playing cards, and an input device capable of receiving a command on a game; and a controller, the controller programmed to execute the processing of:

(A) accepting via each input device, an input for a normal bet for a normal game at each of the first and second stations;

(B) displaying, on the display of each of the first and second stations at which the normal bet has been placed in the processing (A), a first player card for the first station and a dealer card, as well as a second player card for the second station and the dealer card, the first and second player cards and the dealer card being different from one another;

(C) determining, for each of the first and second stations, a normal game result based on the player card displayed as the player card at each of the first and second stations as well as the dealer card displayed on the first and second stations in the processing (B);

(D) during the normal game at each of the first and second stations for which the normal bet has been placed, accepting via the input device an input for a side bet on the normal game at one of the other of the first and second stations;

(E) determining, when the side bet is placed in the processing (D), a side game result according to the determined normal game result of the station subject to the side bet; and (F) offering a first payout based on the normal game result determined in the processing (C), and a second payout based on the side game result determined in the processing (E).

2. A gaming machine comprising:

a display capable of displaying multiple playing cards;

at least first and second stations each including an input device capable of receiving a command on a game;

a memory capable of storing number-of-credits data showing the number of credits corresponding to a game media amount, for each station; and a controller, the controller programmed to execute the processing of:

(A) accepting via each input device, an input for a normal bet for a normal game at each of the first and second stations;

(B) displaying on the display at each of the first and second stations at which the normal bet has been placed in the processing (A), a first player card for the first station and a dealer card, as well as a second player card for the second station and the dealer card, the first and second player cards and the dealer card being different from one another;

(C) during the normal game, at one of the first and second stations, accepting via the input device, an input for a special command including a command to further bet game media separately from the normal bet placed in the processing (A);

(D) determining, for each of the first and second stations, a normal game result based on the player card displayed at each of the first and second stations as well as the dealer card displayed on the first and second stations in the processing (B);

(E) during the normal game at one of the first and second stations, accepting via the input device, an input for a side bet on the normal game at one of the other of the first and second stations;

(F) when the side bet is placed in the processing (E) at one of the first and second stations and then the special command is inputted via the input device provided at the other of the first and second stations that is a target of the side bet, subtracting the number of credits corresponding to a game media amount according to the special command from the number of credits shown by the number-of-credits data stored in the memory in association with the one of the first and second station at which a side bet is placed;

(G) determining, when the side bet is placed in the processing (E), a side game result according to the determined normal game result of the station that is the target of the side bet; and (H) offering a first payout based on the normal game result determined in the processing (D), and a second payout based on the side game result determined in the processing (G).

3. The gaming machine according to claim 2, wherein the processing (D) includes determining a normal game result of a station at which a special command has been inputted, based on the special command, on condition that the number of credits shown by the number-of-credits data stored in the memory in association with the station at which the side bet has been placed is equal to or more than the number of credits corresponding to a game media amount according to the special command, when the input of the special command has been made via the input device and the station having this input device is the side bet target.

4. A control method of a gaming machine, wherein the gaming machine comprises:

at least first and second stations each including a display capable of displaying multiple playing cards, and an input device capable of receiving a command on a game; and a controller, the control method comprising the steps of:

(A) the controller accepting via each input device an input for a normal bet for a normal game at each of the first and second stations;

(B) the controller displaying, on the display of each of the first and second stations at which the normal bet has been placed in the step (A), a first player card for the first station and a dealer card, as well as a second player card for the second station and the dealer card, the first and second player cards, and the dealer card, being different from one another;

(C) the controller determining, for each of the first and second stations, a normal game result based on the player card displayed as a player card for at each of the first and second stations as well as the dealer card displayed on the first and second stations in the processing (B);

(D) the controller accepting, during the normal game at each of the first and second stations, via at least one input device, an input for a side bet on a normal game at one of the other of the first and second stations;

(E) the controller determining, when a side bet is placed in the step (D), a side game result according to the determined normal game result of the station that is the target of the side bet; and (F) the controller offering a first payout based on the normal game result determined in the step (C), and a second payout based on the side game result determined in the step (E).

5. The gaming machine of claim 1 wherein, the normal game result at the station that is the target of the side bet is determined based on an operation at the station that is the target of the side bet.

* * * * *